US012385745B2

(12) United States Patent
Knapp et al.

(10) Patent No.: US 12,385,745 B2
(45) Date of Patent: Aug. 12, 2025

(54) SYSTEM AND METHODS FOR IMPLEMENTING REGIONAL AIR TRANSIT NETWORK USING HYBRID-ELECTRIC AIRCRAFT

(71) Applicant: Zunum Aero, Inc., Redmond, WA (US)

(72) Inventors: Burton Matthew Knapp, Redmond, WA (US); Ashish Andrew Kumar, Bellevue, WA (US)

(73) Assignee: Zunum Aero, Inc., Redmond, WA (US)

( * ) Notice: Subject to any disclaimer, the term of this patent is extended or adjusted under 35 U.S.C. 154(b) by 0 days.

(21) Appl. No.: 18/535,750

(22) Filed: Dec. 11, 2023

(65) Prior Publication Data

US 2024/0391596 A1 Nov. 28, 2024

Related U.S. Application Data

(63) Continuation of application No. 17/410,741, filed on Aug. 24, 2021, now Pat. No. 11,866,184, which is a
(Continued)

(51) Int. Cl.
*B64D 27/24* (2024.01)
*B64C 11/00* (2006.01)
(Continued)

(52) U.S. Cl.
CPC ............ *B64D 27/24* (2013.01); *B64C 11/001* (2013.01); *B64C 11/44* (2013.01); *B64D 41/007* (2013.01);
(Continued)

(58) Field of Classification Search
CPC .... B64D 27/24; B64D 41/007; B64D 27/026; B64D 2221/00; B64C 11/001;
(Continued)

(56) References Cited

U.S. PATENT DOCUMENTS

| 2,462,201 | A | | 2/1949 | Kilgore et al. |
| 3,566,717 | A | * | 3/1971 | Berman et al. ........... B60L 3/06 |
| | | | | 903/910 |

(Continued)

FOREIGN PATENT DOCUMENTS

| CN | 101725431 A | 6/2010 |
| CN | 102725195 A | 10/2012 |

(Continued)

OTHER PUBLICATIONS

Felder, et al, "Turboelectric Distributed Propulsion Engine Cycle Analysis for Hybrid-Wing-Body Aircraft," AIAA Aerospace Science Meeting, Jan. 5, 2009, 25 pages.
(Continued)

*Primary Examiner* — Gertrude Arthur Jeanglaude
(74) *Attorney, Agent, or Firm* — Berkeley Law & Technology Group, LLP

(57) ABSTRACT

Systems, apparatuses, and methods for overcoming the disadvantages of current air transportation systems that might be used for regional travel by providing a more cost effective and convenient regional air transport system. In some embodiments, the inventive air transport system, operational methods, and associated aircraft include a highly efficient plug-in series hybrid-electric powertrain (specifically optimized for aircraft operating in regional ranges), a forward compatible, range-optimized aircraft design, enabling an earlier impact of electric-based air travel services as the overall transportation system and associated technologies are developed, and platforms for the semi-automated optimization and control of the powertrain, and for the semi-automated optimization of determining the flight path for a regional distance hybrid-electric aircraft flight.

21 Claims, 22 Drawing Sheets

Related U.S. Application Data continuation of application No. 16/707,972, filed on Dec. 9, 2019, now Pat. No. 11,104,444, which is a continuation of application No. 15/385,615, filed on Dec. 20, 2016, now Pat. No. 10,501,194, which is a continuation of application No. 14/838,239, filed on Aug. 27, 2015, now Pat. No. 9,561,860.

(60) Provisional application No. 62/043,990, filed on Aug. 29, 2014.

(51) Int. Cl.
| | | |
|---|---|---|
| *B64C 11/44* | (2006.01) | |
| *B64D 41/00* | (2006.01) | |
| *G01C 21/20* | (2006.01) | |
| *G08G 5/21* | (2025.01) | |
| *G08G 5/32* | (2025.01) | |
| *G08G 5/53* | (2025.01) | |
| *G08G 5/55* | (2025.01) | |
| *G08G 5/74* | (2025.01) | |
| *B64D 27/02* | (2006.01) | |

(52) U.S. Cl.
CPC .............. *G01C 21/20* (2013.01); *G08G 5/21* (2025.01); *G08G 5/32* (2025.01); *G08G 5/53* (2025.01); *G08G 5/55* (2025.01); *G08G 5/74* (2025.01); *B64D 27/026* (2024.01); *B64D 2221/00* (2013.01)

(58) Field of Classification Search
CPC ...... B64C 11/44; G01C 21/20; G08G 5/0021; G08G 5/0034; G08G 5/0052; G08G 5/0086

See application file for complete search history.

(56) References Cited

U.S. PATENT DOCUMENTS

| | | | |
|---|---|---|---|
| 3,747,343 A | 7/1973 | Rosen | |
| 3,987,279 A | 10/1976 | Borelan et al. | |
| 4,005,575 A | 2/1977 | Scott et al. | |
| 4,417,708 A | 11/1983 | Negri | |
| 4,591,313 A | 5/1986 | Miyatake et al. | |
| 4,925,132 A | 5/1990 | Zider | |
| 4,968,216 A | 11/1990 | Anderson et al. | |
| 5,205,712 A | 4/1993 | Hamilton | |
| 5,209,640 A | 5/1993 | Moriya | |
| 5,330,131 A | 7/1994 | Burcham et al. | |
| 5,416,699 A | 5/1995 | DiValentin et al. | |
| 6,070,407 A | 6/2000 | Newton | |
| 6,487,477 B1* | 11/2002 | Woestman | B60W 10/08 340/439 |
| 6,555,928 B1* | 4/2003 | Mizuno | B60L 58/33 290/40 C |
| 6,748,744 B2 | 6/2004 | Peplow et al. | |
| 6,994,360 B2 | 2/2006 | Kuang et al. | |
| 6,998,727 B2* | 2/2006 | Gray, Jr. | B60W 10/08 290/51 |
| 7,032,861 B2 | 4/2006 | Sanders, Jr. et al. | |
| 7,194,353 B1 | 3/2007 | Baldwin et al. | |
| 7,606,641 B2 | 10/2009 | Allen | |
| 7,711,455 B1 | 5/2010 | Cogan | |
| 7,883,051 B2 | 2/2011 | Sammy | |
| 7,933,695 B2* | 4/2011 | Yamaguchi | B60K 6/28 903/903 |
| 8,016,228 B2 | 9/2011 | Fucke et al. | |
| 8,128,019 B2 | 3/2012 | Annati et al. | |
| 8,201,774 B2 | 6/2012 | Gieras et al. | |
| 8,393,564 B2 | 3/2013 | Kroo | |
| 8,425,191 B2 | 4/2013 | Ali | |
| 8,469,306 B2 | 6/2013 | Kuhn, Jr. | |
| 8,500,064 B2 | 8/2013 | Bruno et al. | |
| 8,636,241 B2 | 1/2014 | Lugg et al. | |
| 8,662,445 B2 | 3/2014 | Bruno et al. | |
| 8,681,457 B2* | 3/2014 | Minegishi | B60K 6/365 318/434 |
| 8,684,304 B2 | 4/2014 | Burns et al. | |
| 8,727,270 B2 | 5/2014 | Burns et al. | |
| 8,727,271 B2 | 5/2014 | Salyer | |
| 8,738,268 B2* | 5/2014 | Karimi | H02J 3/38 700/286 |
| 8,757,542 B2 | 6/2014 | Hopdjanian et al. | |
| 8,798,810 B2 | 8/2014 | Delaplace et al. | |
| 8,924,035 B2 | 12/2014 | Greene et al. | |
| 9,008,942 B2 | 4/2015 | Dyrla et al. | |
| 9,045,223 B2 | 6/2015 | Connaulte et al. | |
| 9,081,373 B2 | 7/2015 | Greene et al. | |
| 9,096,314 B2 | 8/2015 | Brotherton-Ratcliffe et al. | |
| 9,102,326 B2 | 8/2015 | Anderson et al. | |
| 9,174,741 B2 | 11/2015 | Suntharalingam et al. | |
| 9,193,451 B2 | 11/2015 | Salyer | |
| 9,194,285 B2 | 11/2015 | Botti et al. | |
| 9,206,710 B2 | 12/2015 | Gurin | |
| 9,212,625 B2 | 12/2015 | Shelley | |
| 9,296,288 B2 | 3/2016 | Galbraith | |
| 9,334,049 B1 | 5/2016 | LeGrand, III et al. | |
| 9,425,670 B2 | 8/2016 | Mariotto | |
| 9,493,245 B2 | 11/2016 | Salyer | |
| 9,561,860 B2 | 2/2017 | Knapp et al. | |
| 9,598,169 B1 | 3/2017 | LeGrand, III et al. | |
| 9,623,978 B2 | 4/2017 | Anton et al. | |
| 12,091,180 B2* | 9/2024 | Mattikalli | B64D 27/24 |
| 2008/0175703 A1 | 7/2008 | Lugg | |
| 2008/0184906 A1 | 8/2008 | Kejha | |
| 2010/0083631 A1 | 4/2010 | Foster et al. | |
| 2010/0131139 A1 | 5/2010 | Sakai et al. | |
| 2011/0071705 A1 | 3/2011 | Matuszeski et al. | |
| 2011/0147533 A1 | 6/2011 | Goossen et al. | |
| 2012/0056040 A1 | 3/2012 | Brotherton-Ratcliffe et al. | |
| 2013/0000273 A1 | 1/2013 | Roberge et al. | |
| 2013/0062455 A1 | 3/2013 | Lugg et al. | |
| 2013/0147204 A1 | 6/2013 | Botti et al. | |
| 2013/0261914 A1 | 10/2013 | Ingram et al. | |
| 2014/0010652 A1 | 1/2014 | Suntharalingam et al. | |
| 2014/0060005 A1 | 3/2014 | Lugg | |
| 2014/0129139 A1 | 5/2014 | Blison et al. | |
| 2014/0176059 A1 | 6/2014 | Lee et al. | |
| 2014/0257599 A1 | 9/2014 | Kobayashi et al. | |
| 2014/0346283 A1 | 11/2014 | Salyer | |
| 2014/0367510 A1 | 12/2014 | Viala et al. | |
| 2015/0050123 A1 | 2/2015 | Lugg | |
| 2015/0151844 A1 | 6/2015 | Anton et al. | |
| 2016/0016670 A1 | 1/2016 | Sautreuil et al. | |
| 2016/0023773 A1 | 1/2016 | Himmelmann et al. | |
| 2016/0325629 A1 | 11/2016 | Siegel et al. | |
| 2016/0375994 A1 | 12/2016 | Rossotto | |
| 2017/0203839 A1 | 7/2017 | Giannini et al. | |
| 2017/0210481 A1 | 7/2017 | Bak et al. | |

FOREIGN PATENT DOCUMENTS

| | | |
|---|---|---|
| CN | 102837822 A | 12/2012 |
| CN | 102971216 A | 3/2013 |
| CN | 103708028 A | 4/2014 |
| EP | 3090951 A1 | 11/2016 |
| JP | 2010-125868 A | 6/2010 |
| JP | 2012-505348 A | 3/2012 |
| JP | 2013-505172 A | 2/2013 |
| JP | 2014031118 A | 2/2014 |
| WO | 2010/042215 A1 | 4/2010 |
| WO | 2013/124300 A1 | 8/2013 |
| WO | 2013/186009 A1 | 12/2013 |
| WO | 2014/158240 A2 | 10/2014 |
| WO | 2016/049027 A1 | 3/2016 |
| WO | 2017/025224 A1 | 2/2017 |
| WO | 2017/098144 A1 | 6/2017 |

OTHER PUBLICATIONS

U.S. Appl. No. 14/838,239 / Notice of Allowance, Sep. 29, 2016, 12 pages.

(56) References Cited

OTHER PUBLICATIONS

U.S. Appl. No. 14/838,239 / Issue Fee, Dec. 23, 2016, 1 page.
U.S. Appl. No. 14/838,239 / Issue Notification, Jan. 18, 2017, 1 page.
U.S. Appl. No. 15/385,615 / Office Action, Mar. 28, 2018, 9 pages.
U.S. Appl. No. 15/385,615 / Response to Office Action, Aug. 28, 2028, 14 pages.
U.S. Appl. No. 15/385,615 / Notice of Allowance, Oct. 18, 2018, 7 pages.
U.S. Appl. No. 15/385,615 / RCE, Jan. 4, 2019, 7 pages.
U.S. Appl. No. 15/385,615 / Office Action, Jan. 29, 2019, 13 pages.
U.S. Appl. No. 15/385,615 / Response to Office Action, Jul. 1, 2019, 15 pages.
U.S. Appl. No. 15/385,615 / Notice of Allowance, Jul. 25, 2019, 5 pages.
U.S. Appl. No. 15/385,615 / Issue Fee, Oct. 23, 2019, 1 page.
U.S. Appl. No. 15/385,615 / Issue Notification, Nov. 20, 2019, 1 page.
U.S. Appl. No. 17/410,741 / Preliminary Amendment, Apr. 18, 2022, 9 pages.
U.S. Appl. No. 17/410,741 / Office Action, Feb. 6, 2023, 7 pages.
U.S. Appl. No. 17/410,741 / Response to Office Action, Aug. 2, 2023, 36 pages.
U.S. Appl. No. 17/410,741 / Notice of Allowance, Aug. 23, 2023, 15 pages.
U.S. Appl. No. 17/410,741 / Issue Fee, Nov. 20, 2023, 13 pages.
U.S. Appl. No. 17/410,741 / Issue Notification, Dec. 20, 2023, 2 pages.
PCT/US2015/047290 / Notification of Transmittal of the International Search Report and the Written Opinion of the International Searching Authority, or the Declaration, Apr. 19, 2016, 18 pages.
AU2015361236 / Direction to Request Examination, Apr. 17, 2018, 1 page.
AU2015361236 / Examination Request, Jun. 14, 2018, 2 pages.
AU2015361236 / Voluntary Amendment, Jun. 14, 2018, 37 pages.
AU2015361236 / Examination Report, Mar. 20, 2019, 3 pages.
BR112017003985-0 / Voluntary Amendment, Aug. 31, 2018, 209 pages.
BR112017003985-0 / Request for Examination, Sep. 6, 2018, 7 pages.
BR112017003985-0 / Preliminary Office Action, Jul. 3, 2019, 5 pages.
BR112017003985-0 / Response to Preliminary Office Action, Nov. 6, 2020, 353 pages.
BR112017003985-0 / Written Opinion, Nov. 7, 2023, 4 pages.
BR112017003985-0 / Response to Written Opinion, Jan. 2, 2024, 216 pages.
BR112017003985-0 / Written Opinion, May 7, 2024, 5 pages.
BR112017003985-0 / Response to Written Opinion, Jul. 29, 2024, 18 pages.
BR112017003985-0 / Decision to Grant, Sep. 10, 2024, 2 pages.
CA2996844 / Office Action, Feb. 28, 2019, 7 pages.
CA2996844 / Reinstatement & Response to Office Action, Aug. 27, 2020, 325 pages.
CA2996844 / Second Office Action, Oct. 13, 2020, 7 pages.
CA2996844 / Response to Second Office Action, Feb. 12, 2021, 17 pages.
CA2996844 / Third Office Action, May 26, 2021, 10 pages.
CN201580058880.0 / Examination Request & Voluntary Amendment, Aug. 29, 2017, 12 pages.
CN201580058880.0 / Office Action, Nov. 28, 2019, 26 pages.
CN201580058880.0 / Response to Office Action, Jun. 15, 2020, 16 pages.
CN201580058880.0 / Second Office Action, Oct. 12, 2020, 23 pages.
CN201580058880.0 / Response to Second Office Action, Feb. 19, 2021, 144 pages.
CN201580058880.0 / Rejection Decision, Jun. 4, 2021, 4 pages.
CN201580058880.0 / Request for Reexamination, Sep. 7, 2021, 19 pages.
CN202310094346.1 / Notification of Entry into Examination Procedure, Apr. 14, 2023, 2 pages.
EP15867751.8 / Communication Pursuant to Rules 161(2) and 162 EPC, Apr. 18, 2017, 2 pages.
EP15867751.8 / Response to Communication Pursuant to Rules 161(2) and 162 EPC, Oct. 24, 2017, 8 pages.
EP15867751.8 / Invitation Pursuant to Rule 63(1) EPC, Apr. 13, 2018, 3 pages.
EP15867751.8 / Response to Invitation Pursuant to Rule 63(1) EPC, Jun. 21, 2018, 4 pages.
EP15867751.8 / Extended EP Search Report, Aug. 27, 2018, 9 pages.
EP15867751.8 / Decision on the Request for Further Processing Under Rule 135(3) EPC, Jul. 10, 2019, 1 page.
EP15867751.8 / Communication Pursuant to Article 94(3) EPC, Nov. 12, 2021, 3 pages.
EP19197134.0 / Extended EP Search Report, Apr. 28, 2020, 10 pages.
EP19197134.0 / Response to Extended EP Search Report, Nov. 27, 2020, 5 pages.
EP19197134.0 / Communication Pursuant to Article 94(3), Jul. 12, 2022, 3 pages.
EP19197134.0 / Communication Pursuant to Article 94(3), Dec. 19, 2024, 4 pages.
GB201705048.5 / Request for Substantive Examination, May 26, 2017, 2 pages.
GB201705048.5 / Voluntary Amendment, Oct. 24, 2017, 17 pages.
GB201705048.5 / Request for Further Search Fee, Apr. 27, 2020, 2 pages.
GB201705048.5 / Response to Official Letter dated Apr. 27, 2020, Oct. 23, 2020, 6 pages.
GB201705048.5 / Examination Report Under Section 18(3), Nov. 11, 2020, 3 pages.
GB201705048.5 / Response to Official Letter dated Nov. 11, 2020, Mar. 8, 2021, 4 pages.
GB201705048.5 / Search Report Under Section 17(6), Mar. 17, 2021, 7 pages.
Under 37 CFR 1.99).
GB201705048.5 / Examination Report Under Section 18(3), Mar. 17, 2021, 7 pages.
GB201705048.5 / Response to Examination Report Under Section 18(3), Mar. 31, 2021, 280 pages.
GB201705048.5 / Examination Report Under Section 18(3), Apr. 8, 2021, 2 pages.
GB201705048.5 / Response to Examination Report Under Section 18(3), Apr. 20, 2021, 20 pages.
GB201705048.5 / Intention to Grant, Apr. 23, 2021, 2 pages.
IN201717010053 / Request/Express Request for Examination of Application for Patent, Aug. 24, 2018, 2 pages.
JP2017-530969 / Notice of Reasons for Rejection, Sep. 18, 2019, 7 pages.
JP2017-530969 / Notice of Reasons for Rejection, Apr. 30, 2021, 17 pages.
JP2017-530969 / Voluntary Amendment & Request for Examination, 6 pages.
JP2017-530969 / Pre-Appeal Examination Notice, 1 page.
JP2017-530969 / Request for Appeal & Amendment, 272 pages.
JP2017-530969 / Appeal Examination Notice, 1 page.
JP2017-530969 / Appeal Decision, 2 pages.
JP2020-173683 / Voluntary Amendment & Request for Examination, 4 pages.
JP2020-173683 / Office Action, 2 pages.
JP2020-173683 / Response to Office Action, 4 pages.
JP2020-173683 / Decision to Grant, 3 pages.
JP2020-173683 / Payment of Registration Fee, 2 pages.
JP2022-090363 / Voluntary Amendment, Jun. 24, 2022, 3 pages.
JP2022-090363 / Voluntary Amendment, Jul. 12, 2022, 5 pages.
JP2022-090363 / Notice of Reasons for Rejection, Aug. 24, 2023, 9 pages.
JP2022-090363 / Response to Notice of Reasons for Rejection, Feb. 29, 2024, 6 pages.
JP2022-090363 / Decision of Rejection, Mar. 7, 2024, 4 pages.

(56) References Cited

OTHER PUBLICATIONS

JP2022-090363 / Request for Appeal and Amendment, Jul. 11, 2024, 6 pages.
JP2022-090363 / Appeal Brief, Aug. 26, 2024, 7 pages.
JP2022-090363 / Decision to Grant, Oct. 10, 2024, 3 pages.

\* cited by examiner

800

SYSTEM AND METHODS FOR IMPLEMENTING REGIONAL AIR TRANSIT NETWORK USING HYBRID-ELECTRIC AIRCRAFT

CROSS REFERENCE TO RELATED APPLICATION

This application is a continuation of U.S. patent application Ser. No. 17/410,741 filed Aug. 24, 2021, now U.S. Pat. No. 11,866,184, which is a continuation of U.S. patent application Ser. No. 16/707,972, filed Dec. 9, 2019, now U.S. Pat. No. 11,104,444, which is a continuation of U.S. patent application Ser. No. 15/385,615, filed Dec. 20, 2016, now U.S. Pat. No. 10,501,194, which is a continuation of U.S. patent application Ser. No. 14/838,239, filed Aug. 27, 2015, now U.S. Pat. No. 9,561,860, which claims the benefit of U.S. Provisional Application No. 62/043,990, filed Aug. 29, 2014. Each of the above-identified U.S. patent application Ser. Nos. 16/707,972, 15/385,615 and 14/838,239, and U.S. Provisional Application No. 62/043,990 is incorporated herein by reference in its entirety (including Appendix) for all purposes.

BACKGROUND

Transportation devices and transportation systems are an important part of the infrastructure used to enable commerce and the movement of people between locations. As such, they are essential services for the growth of an economy, the development of a society, and the effective governance of a region. Transportation devices and systems are used to move goods between distributions points, enable face-to-face meetings and discussions, and in general to facilitate the growth of relationships. Further, as new modes of transportation have developed, travel times and cargo carrying abilities have changed drastically, enabling new and often faster methods of communications and the delivery of goods and services. In this regard, over the years, several primary types of transportation systems have been developed; however, each typically has its own focus, advantages, and drawbacks compared to other modes of transportation.

For example, in the United States today, over 100 years after the first powered flight, the vast majority (>97%) of regional long-distance trips (i.e., 50 to 500 miles) are made by personal auto. Although countries with extensive rail systems may divert 10-15% of trips to rail, this still leaves well over 80% of trips to be made by auto. This is inefficient and may also not be in the best interests of society at large, as it translates to poor mobility (relatively long door-door times), creates pollution, and puts stress on the existing highway infrastructure. However, current commercial air services over this range are often relatively costly and inconvenient. One reason for this inefficiency is that the shorter flight distances mean that a relatively large fraction of the total travel time (>70%) is spent on the ground (where this "ground" time includes traveling to and from airports, traversing terminals, at the gate or taxiing on the tarmac). As a result, in such situations, air transportation is generally not a desirable mode of transport and is currently used for less than 1% of such regional trips.

Aviation transport services for people and cargo have doubled approximately every 15 years, enabling unprecedented global mobility and cargo distribution. In contrast, the relatively poor value proposition (and hence usage) of air travel over regional ranges might be considered a striking failure; even more so, given that almost all (94%) long-distance travel is regional. In this sense there is a demonstrated need for a desirable form of regional distance air transportation, but a lack of a desirable system for satisfying that need.

This failure to develop an effective and efficient form of regional air transportation has led to stagnant door-to-door travel times and has been a significant factor in limiting mobility improvements in the United States for several decades. This is highly undesirable, as limited mobility impacts business and pleasure travel, job development and opportunities, educational choices, and other factors which are beneficial to the growth and prosperity of society. In some regards, the viability of regional air transportation has actually declined steadily since the 1960s as airlines have shifted to larger aircraft and longer ranges in order to respond to competitive pressures and to lower the cost-per-passenger-mile of transportation. Thus, the present economic forces are causing current methods of providing air transportation to move steadily away from the types of systems and methods described herein.

As will be described, conventional approaches to providing air transport services for regional travel are not sufficiently convenient or effective for purposes of encouraging widespread use by potential customers. Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

As recognized by the inventors, the failure of modern aviation services to address the need for regional air transport is a direct outcome of the use of conventional aircraft technology. It is well known by those experienced in the art that optimizing conventional aircraft for regional operations results in design and performance compromises which adversely affect efficiency. For example, gas turbines (jet and turboprop engines) suffer a significant decrease in efficiency at lower altitudes and slower speeds, and a further loss of efficiency when scaled to smaller sizes. In addition, short runway operations impose a penalty in wing and/or engine sizing larger than optimal for efficient cruise performance. As a result, large aircraft over long-ranges offer the lowest operating costs per passenger-mile, with rapidly increasing costs for distances <500 miles, and for aircraft seating fewer than 100 passengers (or an equivalent cargo weight of 25,000 lbs). Note that given a relatively poor efficiency on the ground or in climbing mode, scaled down gas turbines cost more to operate at short-ranges relative to longer ranges (where for shorter ranges, ground or climbing time may represent a significant and relatively larger percentage of the overall travel time).

This inefficient cost relationship shapes many of the aspects of aviation services today. Competitive pressures have driven airlines to migrate to larger aircraft and longer flights. This has led to fewer flights from a smaller number of hub airports that can generate passenger volumes sufficient to support the larger aircraft. For example, the United States has approximately 13,500 airports; yet, 70% of the air traffic is concentrated in 29 hubs and 96% is concentrated in 138 hubs. Fewer flights from a small number of increasingly congested hubs, coupled with long ground transit times have in turn caused the relatively low utility of air transportation for purposes of regional travel. Further, the recent, heavier focus on "capacity discipline" by the airlines has exacerbated the problem as airlines seek to concentrate demand to even fewer hubs.

Embodiments of the invention are directed to systems, apparatuses, and methods for overcoming the disadvantages of current air transportation systems that might be used for regional travel by providing a more cost effective and convenient regional air transport system. In some embodiments, the inventive air transport system, operational methods, and associated aircraft include one or more of the following elements, functionality, or features:

1. A highly efficient plug-in series hybrid-electric powertrain, specifically optimized for aircraft operating in regional ranges;
2. A forward compatible, range-optimized aircraft design, enabling an earlier impact of electric-based air travel services as the overall transportation system and associated technologies are developed; and
3. Platforms for the semi-automated optimization and control of the powertrain, and for the semi-automated optimization of determining the flight path for a regional distance hybrid-electric aircraft flight.

In one embodiment, the invention is directed to a hybrid-electric aircraft, wherein the aircraft includes:
  a source of energy, the source of energy including a source of stored electrical energy and a source of generated energy provided by a generator;
  a powertrain, the powertrain operable to receive as an input energy from the source of energy and in response to operate one or more electrically powered motors;
  one or more propulsors, wherein each propulsor is coupled to at least one of the one or more electrically powered motors;
  an electronic processor programmed with a first set of instructions, which when executed provide one or more functions or processes for managing the operation of the aircraft, wherein these functions or processes include a function or process for
    determining a status of the amount of stored electrical energy and generator fuel presently available to the aircraft;
    determining an amount of stored electrical energy and generator fuel required to enable the aircraft to reach its intended destination;
    determining an amount of energy that could be generated by the source of generated energy presently available to the aircraft;
    determining how to optimally draw energy from the sources of stored electrical energy and generated energy; and
    in event of failure or abnormal operation of a component of the powertrain, determining a reconfiguration of the powertrain and a revised control strategy for continued flight;
  an electronic processor programmed with a second set of instructions, which when executed provide one or more functions or processes for planning a flight for the aircraft, wherein these functions or processes include a function or process for
    accessing data regarding the total amount of stored electrical energy and generator fuel presently available to the aircraft;
    determining if the amount of stored electrical energy and generator fuel presently available to the aircraft is sufficient to enable the aircraft to reach its intended destination, wherein this includes consideration of a first aircraft operating mode wherein stored electrical energy is used exclusively and consideration of a second aircraft operating mode wherein a combination of stored electrical energy and generated energy is used;
    if the amount of stored electrical energy and generator fuel presently available to the aircraft is sufficient to enable the aircraft to reach its intended destination, then planning a route to the intended destination;
    if the amount of stored electrical energy and generator fuel presently available to the aircraft is sufficient to enable the aircraft to reach its intended destination, then planning how to optimally draw energy from the sources of stored electrical energy and generated energy over the planned route to the intended destination;
    if the amount of stored electrical energy and generator fuel presently available to the aircraft is insufficient to enable the aircraft to reach its intended destination, then planning a route to an intermediate destination, wherein planning a route to an intermediate destination further includes
      determining one or more possible energy and/or fuel providers;
      determining if available stored energy and generator fuel are sufficient to reach at least one of the providers;
      generating a route to the at least one provider; and
      planning how to optimally draw energy over the route; and
  a communications element or elements operable to enable data from the aircraft to be transferred to a remote data processing platform or operator and to receive data from the remote data processing platform or operator for exchanging data regarding one or more of route planning or recharge and refuel sources.

In another embodiment, the invention is directed to a regional air transportation system that includes a plurality of the inventive hybrid-electric aircraft, a plurality of aircraft take-off or landing sites, wherein each take-off or landing site includes a recharge and refuel platform operable to provide recharging services for a source of stored electrical energy and fuel for a source of generated energy, and a data processing system or platform, wherein the data processing system or platform is operable to provide route planning data to one or more of the plurality of hybrid-electric powered aircraft.

In yet another embodiment, the invention is directed to a non-transitory computer readable medium on which are contained a set of instructions, wherein when executed by a programmed electronic processing element, the set of instructions cause an apparatus containing the electronic processing element to:

determine a status of the amount of stored electrical energy and generator fuel presently available to a hybrid-electric powered aircraft;

determine an amount of stored electrical energy and generator fuel required to enable the hybrid-electric powered aircraft to reach its intended destination;

determine an amount of energy that could be generated by a source of generated energy presently available to the hybrid-electric powered aircraft;

determine how to optimally draw energy from the sources of stored electrical energy and generated energy; and in event of failure or abnormal operation of a component in the powertrain, determine a reconfiguration of the powertrain, and a revised control strategy for continued flight.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
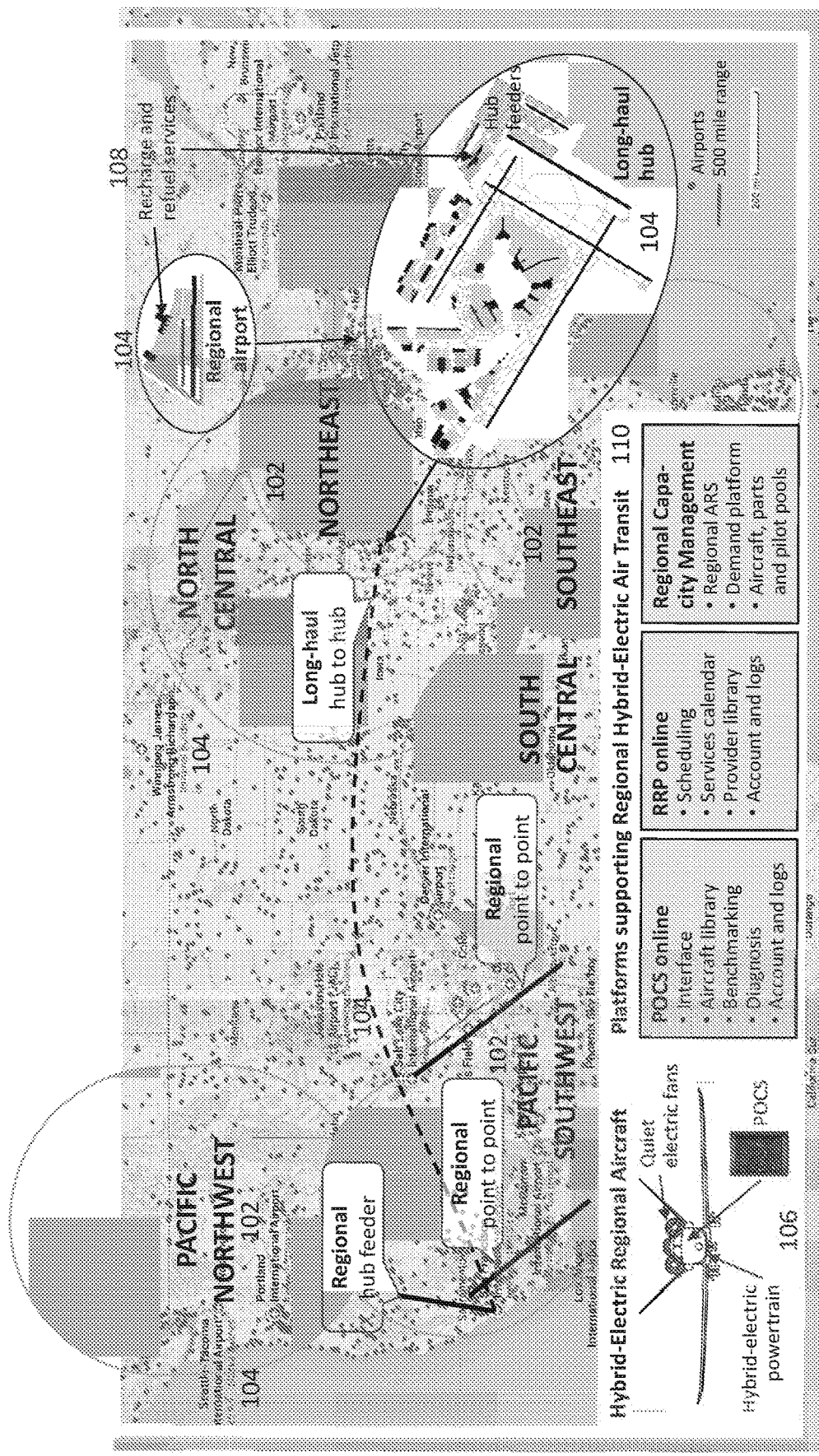
FIG. 1 is a diagram illustrating certain of the primary components, elements, and processes that may be present in an implementation of an embodiment of the inventive transportation system 100.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, as one or more elements of an aircraft or transportation system, as one or more elements or functional modules of an aircraft (flight) control system or regional aircraft transportation system control system, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein for use in the flight control (or other form of control) of an aircraft or of a transportation system may be implemented by one or more suitable processing elements (such as a processor, microprocessor, CPU, controller, etc.) that is part of a client device, server, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Prior to describing multiple embodiments of the inventive aircraft and associated regional air transport network, it is noted that the following acronyms or terms may be used herein, and are meant to have at least the indicated meaning with regards to concepts, processes, or elements:

ADS-B: Automatic Dependent Surveillance-Broadcast—the air-to-air and air-to-ground communication and data which allow NextGen air traffic control.

ATC: Air Traffic Control—refers to both the controller, and the flight path assigned to the aircraft.

BPF: Blade Passage Frequency, in Hz for a ducted fan. Calculated as rotational frequency (Hz) divided by number of blades.

Conventional aircraft engine: combustion engines currently in use to provide aircraft propulsion, including, but not limited to, reciprocating or rotary internal combustion engines, gas turbines, turboprops, turbojets, turbofans, and ram jets.

COT: Cost Of Time—in this context refers to the cost of time for the passengers or payload. For example, a business jet assigns a very high cost of time for their passengers, while cargo has a much lower COT. A measure of the "value" (and hence a factor in the pricing) of an amount of time to a particular passenger, for a piece of cargo, etc.

DOC: Direct Operating Cost, calculated as the sum of energy (fuel, and/or electricity), energy storage unit amortization, and maintenance reserves for airframe and range extending generators or engines.

Ducted Fan: A multi-bladed aerodynamic propulsor located in an axial flow duct. The duct is shaped to maximize the efficiency of the fan.

FMS: Flight Management System, an integrated computer system which controls an aircraft through an auto-pilot and auto-throttle interface. The FMS is typically programmed prior to take off and can fly the aircraft without pilot intervention much, or all, of the way to the destination.

I: Indirect costs of operation on an hourly basis, including airframe depreciation, crew costs, insurance, etc.

Mach number: The fraction of the speed of sound that a vehicle is moving.

Range extending generator: May be comprised of internal combustion engines, each driving one or more motor-generators; alternately, could be comprised of units that convert stored chemical energy directly to electricity, e.g., hydrogen fuel cells.

Rechargeable Energy Storage Unit: comprised of battery packs, supercapacitors, or other media for storing electrical energy (or a combination thereof), coupled with a battery management system(s) that manages operation and safety of the packs. Each pack may comprise of multiple individually removable battery modules, and operate either with some or all of these modules in place. Also referred to as an "Energy storage unit".

Solidity: measure of area of the propeller disk occupied by blades. Defined as the ratio of total blade chord at a given radius to the circumference of the fan disk at that radius.

STOL: Short Take Off and Landing—not a rigid definition, but implies significantly shorter runway lengths, and steeper approach angles than a similarly sized, non-STOL equipped aircraft.

TDI: Turbo Diesel Injection—a compression ignition engine with boosted intake manifold pressure.

In some embodiments, the inventive transportation network may be defined by airports (and associated ground transport options), aircraft, and demand-supply mechanisms optimized for regional electric air transport services. This combination of technologies, processes, devices, and control methods may be used to provide multiple benefits to users. Regional electric air transport offers significantly lower door-door travel times and cost per mile than alternate travel modes: highways, high-speed rail, and conventional air. As a result, the inventive system will drive and support four large-scale applications:

A. Scheduled commercial: Regional electric air will be capable of offering twice the door-to-door speed of conventional air at approximately half the fare, along with convenience and comfort. Unlike the highly concentrated air network of today, large aircraft flying long ranges to a declining set of high-volume hubs, the inventive regional electric air network will be (much) more distributed. Smaller aircraft flying lower will serve a large number of community airports. The greater choice of schedules and destinations, along with low-traffic routes will result in a far more personalized travel experience than obtained from air travel today. Regional electric air will serve two major pools of demand: point-to-point and feeder. Point-to-point flights will serve destination pairs within a region, typically bypassing conventional aircraft and hub airports. Feeder flights will transport passengers from their local regional airports to more distant conventional hubs to connect to a long-haul flight out of the region. Conversely, feeders will transport passengers arriving on long-haul flights to their local regional airport. Both will dramatically reduce door-to-door travel times for regional as well as long-haul travel, by bypassing congested hubs and by reducing ground legs;

B. Business and on-demand: The value proposition of a regional electric air transportation system for business and on-demand travel is also a strong one. Electric aircraft offer comfortable travel over regional ranges at 80 to 90 percent lower costs than business jets. In addition, quiet STOL (short takeoff and landing) capabilities will open up all-hours access to a large pool of smaller airports, offering door-to-door times comparable to faster business jets, which require longer runways and create noise pollution and other problems. Moreover, the disruptively low costs of electric air transportation will expand demand for this form of travel, while sharing technologies will multiply usage options. In addition to air taxi, charter, and fractional ownership modes available today, capacity may also be offered on a shared or on-demand basis. For example, on shared flights, open seats on existing flights will be offered to other passengers often at reduced fares. On-demand flights, on the other hand, will be scheduled based on passenger volumes. These will include an on-demand marketplace that will accept passenger requests for flights, enabling flights to be scheduled based on a combination of requests and historical demand patterns;

C. Cargo: Even as the regional transport infrastructure has stagnated over the past decades, the demand for fast delivery of goods has multiplied, driven by the rapid growth of online commerce. Electric air transportation will offer a disruptive alternative, offering door-door speeds 4 to 5 times faster than ground, at comparable or lower cost. This will be enabled via cargo flights (manned, remotely piloted or autonomous) from airports at or near regional logistics hubs to airports at or near local depots. As example, fast delivery of goods to a home or business will be enabled by electric air transport cargo flights between regional distribution centers and local supply depots. Electric aircraft will be loaded at the distribution centers with packages routed to one or multiple local supply depots. Once loaded, aircraft will take-off from adjacent or nearby airstrips for regional flights to airstrips adjacent to or near each of the local supply depots to which cargo is addressed. Delivery from the local depot to the final destination may use an existing mode, e.g., delivery truck, or one of several emerging platforms, e.g., autonomous vehicle, delivery drone. As another example, fast delivery of goods to point of use will be enabled by electric air transport flights from the corresponding point of production (e.g., manufacturing facility, farm) or logistical hub (e.g., warehouse, transport terminal). Electric aircraft will be loaded at the point of production or logistical hub, take off from nearby airstrips for fast flights to airstrips near the point of use;

D. Military: Despite tremendous advances in military technology over the past decades, development of platforms to transport troops or cargo over regional distances has largely stagnated, and remain limited largely to ground convoys, or the much less cost effective conventional aircraft or rotorcraft. In much the same way as for cargo, electric aircraft could transform regional military logistics, by enabling the shift of a fraction of supply convoys from ground to electric aircraft. Doing so would reduce exposure to enemy action, increase supply chain velocity by a significant factor (estimated to be a factor of 5 or greater), at costs comparable to or below that of ground transport. As an example, fast supply of forward bases could be enabled by electric air transport flights from theatre logistical hubs. Electric aircraft could be loaded at a logistical hub with troops and cargo routed to one or multiple forward bases. Once loaded, aircraft will take off from a nearby airstrip for regional flights to airstrips near each of the forward bases addressed. Delivery could also be made without touchdown at the forward bases, using parachutes or other mechanisms to direct the cargo to the base safely. Other opportunities include replacing conventional aircraft or rotorcraft on tactical transport missions for faster travel, increased stealth, and significantly lower cost; and E. Manned and un-manned: Given the rapid and continued development of autonomous vehicles and remotely piloted drones, the four applications of regional electric air transport services described above may include conventionally piloted aircraft, as well as aircraft that are designed with increasing degrees of autonomy. These will include piloted aircraft equipped for back-up control by a remote pilot, unmanned aircraft controlled by a remote pilot, and semi-autonomous aircraft equipped for back-up control by a remote pilot.

In one embodiment, the inventive regional air transport network may include 4-classes of airports, most with runways >1,500 ft (or pads for VTOL aircraft), and differentiated based on their respective role in the regional network and the degree to which they are equipped to support high-frequency hybrid-electric flights:

Regional tier I, II and III airports. These are the primary nodes of the regional network. Tier I airports are best equipped for high-frequency electric flights, and offer fast recharge and swap stations, and capabilities for all-weather and night operations. Some of the tier I airports may also be served by scheduled flights of conventional aircraft. Tier II airports include fast recharge and swap station, while Tier III have basic recharge capabilities on the tarmac. Unlike conventional hubs, regional airports will offer fewer or a lesser degree of ground services, e.g., baggage, security, given the relatively lower traffic volumes and smaller aircraft. This will enable quick transit through the airport, further reducing door-to-door travel times;

Mainline large hubs in-region. A subset of the large commercial hubs located in-region, with support for flights of small to medium hybrid electric aircraft. These could include dedicated short runways, non-interfering flight corridors, relatively fast recharge and swap stations, quick passenger transfer from regional electric to conventional air flights and vice versa. Given that a significant fraction of the regional electric flights will be "non-sterile", the hubs could also include provisions for this traffic to access sterile areas of the airport, e.g., baggage and security services to "sterilize" arriving regional passengers;

Regional service hubs. Airports in region equipped to service and house the electric aircraft. These are typically a subset of the regional tier I or II airports, and typically will include parking, maintenance facilities, and operations centers; and Cargo airports. Airports that enable regional transport of goods between network hubs or distribution centers and local delivery depots. These are equipped for high-frequency electric flights just like the tier I, II and III airports described above, and could include shared cargo and passenger facilities. These cargo airports are typically located near points of origin of the goods, e.g., network hubs, distribution centers, or points of delivery of the goods, e.g., local delivery depots.

In some embodiments, the inventive hybrid-electric range optimized aircraft and associated regional air transport network may provide a relatively more quiet, cost-effective, energy efficient, and more convenient mode of transportation while also providing multiple related social and economic benefits. Such benefits include a reduction in the need to rely on automobiles for regional transportation, which would be expected to provide a reduction in pollution and traffic congestion. The inventive aircraft and system also may save passenger time, lead to an increase in productivity, encourage greater local development and housing, support decentralized living and working arrangements, and create new markets for connecting transportation services.

To permit realization of the opportunities presented by a more effective and efficient regional air transportation system, the inventors have recognized a need for several enabling devices, systems, data processing methods, and technologies. These include, but are not limited to a highly efficient and quiet short-take off capable hybrid-electric aircraft, and the associated and properly optimized technologies for regional operations "close-in" to communities and urban centers. In addition, there is a need for a regional transit network comprised of such aircraft, supporting airports, and the appropriate demand-supply matching mechanisms. Elements of embodiments of the invention are designed to address these and other needs. In particular, embodiments of the inventive system and methods may include one or more of:

Highly efficient plug-in series hybrid-electric powertrain optimized for regional ranges. The powertrain may be designed to minimize the energy required by sizing the powertrain for fast cruise over a prescribed fraction of the range that represents a majority of the flights, slower for longer ranges. This allows a downsized generator, with power output less than required for standard cruise, so that the energy storage units are used continuously and fully depleted (less FAA required reserve) during a flight. This also enables a relatively high energy storage mass fraction in the range 12-20% of the total weight of the aircraft. This higher ratio of electric storage to generated power relative to conventional hybrid designs (and often with generation optimized for cruise mode) is one key to the 65-80% lower DOC (than conventional aircraft) delivered by the inventive designs. Further reductions are enabled by regenerative braking of the propulsors and all electric ground operations;

Range optimized aircraft design enabling early impact of electric air. Efforts to design commercial electric aircraft to-date have focused on size, speed, and range capabilities comparable to that of conventional aircraft. Given the range times speed squared scaling of energy required for a flight, this leads to designs that are either "mildly electric", and store only a small fraction of the energy onboard, or that are more electric but require advanced electric technologies. This has led to the view that electric air delivers limited savings in the near-term, and that key technologies will take a decade or more to mature. In contrast, by tailoring the inventive aircraft to regional ranges, and lower speeds, altitudes, sizes, the inventive "range optimized" designs can deliver significantly lower DOC based on technologies that will be available within significantly less time. This enables market-entry many years earlier.

Figure 9:
FIG. 9 is a diagram illustrating an example user interface 900 for use by a pilot of an embodiment of the inventive aircraft.

A built-in degree of "future proofing" (such as prevention of relatively rapid technical or business related obsolescence) via a modular, forward-compatible powertrain-propulsion coupled with forward-compatible airframes. As with electric vehicle technologies that are improving rapidly, a key barrier to early adoption of electric aircraft is obsolescence driven by technology evolution. This possible disincentive to adoption of electric aircraft and the associated transportation system is countered by a modular, forward-compatible design of the powertrain, propulsion and airframe to enable technology upgrades via simple module swaps. This enables early entry with hybrid-electric aircraft that deliver continually improving DOC via upgrades to stay abreast of energy storage technology and/or improvements in operational efficiency. Another important enabler is the inventive hybrid aircraft Powertrain Optimization and Control System (referred to herein as "POCS"). This platform adjusts operation of the modular powertrain based on characteristics of the onboard energy storage units and generator to deliver optimal performance. As a result, technology upgrades are readily accommodated: flight objectives, speed, efficiency, noise, payload are translated to control the powertrain in a way that best leverages the modules onboard, without need for extensive operator or pilot intervention;

Quiet operation with short-takeoff-and-landing (STOL) capabilities to enable "close-in" flights and greater community acceptance. Quiet STOL capabilities dramatically improve the ability of an aircraft to fly "close in" to communities and population centers, thereby delivering step-change reduction in door-door travel times. STOL enables operations to smaller community airports (>13,000 in the U.S.), bypassing congested hubs. Quiet operation translates to greater community acceptance, often a limiter for such flights. The inventive system and aircraft leverage quiet electric ducted variable-pitch fans (referred to herein as "eFans") for propulsion to reduce runway requirements and lower noise levels, thereby enabling operations at a vast majority of existing airports. The proposed inventive fan design has aerodynamics and acoustics optimized for the intermediate speeds and altitudes of the range-optimized aircraft. This includes use of a low-pressure ratio variable pitch fan, enabling tailoring of propeller blade pitch to flight mode for greater efficiency, and use of regenerative braking to replace typically noisy spoilers. The fan is powered by one or more high-density electric motors located at the center of the duct and connected to the fan directly, or through an optional elliptical reduction drive. The high torque at low RPM of the electric motors coupled with the high static thrust of the ducted fan leads to good STOL performance. The combination of low fan tip speeds, fan-stator and duct acoustic design and duct acoustic treatments deliver significantly lower noise signatures. As an added benefit, the increased safety and "jet like" appearance of the ducted fan are expected to translate to strong consumer appeal relative to open propeller aircraft often used for regional operation. The aircraft and powertrain also include other features intended to reduce cabin and environmental noise;

A distributed regional hybrid-electric air transit network for passengers and cargo to enable effective large-scale operation of the inventive electric aircraft. Aviation services today require passengers (or transporters of cargo) to mold their travel to the flight patterns of large, cost competitive aircraft. In contrast, and as recognized by the inventors, hybrid-electric technologies enable the opposite, to mold aircraft and flight patterns to passenger travel needs. This is implemented via a distributed regional electric air transport network, operating out of a relatively large number of neighborhood and community airports, and operating smaller electric aircraft that are optimized to individual routes. The form of this network will differ significantly from conventional long-haul air transport networks and systems, leading to distinct requirements for the constituent elements and processes used to implement and operate the network. These are described herein and include requirements for airports (including ground transport options) and aircraft, to demand-supply matching mechanisms. With regards to airports, in one embodiment this includes 4-classes of airports all with runways >1,500 ft (or VTOL pads) and differentiated based on role in the regional network and degree to which they are equipped to enable high-frequency electric flights. In terms of aircraft, in one embodiment this includes hybrid-electric aircraft designed for "lean" operations in-flight and on the ground at lower service community airports. These elements are coordinated and their use optimized using next-generation regional capacity management, to improve aircraft load factors and utilization;

Development and use of a fault-tolerant design of the aircraft powertrain for aviation-grade safety, a critical requirement for large-scale application of hybrid-electric powertrain. In one embodiment, this is addressed by designing the powertrain and supporting optimization and control system (the "POCS" system) for a relatively high-degree of redundancy to ensure continued safe operation when faults occur. This may include features offering redundancy in event of faults of the power sources, converters, sensors or motors, among other elements or processes. Other safety features may include those used to prepare the powertrain ahead of a crash to ensure the platform and modules respond to impact in ways to minimize risk to the aircraft occupants;

Use of a powertrain designed for semi-automated optimization and control, a factor that is critical for pilot acceptance and to enable high-frequency operations at optimal efficiency. A key to pilot acceptance of hybrid-electric aircraft is a control platform with a simple pilot interface that mimics the operation of a conventional aircraft. This platform (an example of which is illustrated in FIG. 9, and described further herein) should optimize the operation of powertrain modules to meet the objectives of the pilot for the flight, across the integrated powertrain (e.g., generator operation over course of a flight), and for each module (e.g., motor RPM and torque for maximum efficiency). In addition, the control platform (i.e., the POCS) should support safe operation of the powertrain, through appropriate fault isolation and recovery mechanisms. Other features of the control platform may include streamlined powertrain preparation and checks pre-flight, assisted diagnostics and maintenance post-flight and simple calibration following power module swaps. Many of these features or requirements are enabled via the noted powertrain optimization and control system (POCS) that serves as a single control platform for the powertrain and its modules; and Automated optimization methods for generating and correcting flight paths for regional hybrid-electric flights. Note that unlike long-haul flights by conventional jets, with well-defined optimal altitudes and speeds, determining an optimal path for one or more regional hybrid-electric flights (typically flying at <30,000 ft altitude) is more complex. For example, the differing operating characteristics of the various power sources lead to varying optimal flight altitudes based on the degree to which the generator is required during the flight. Thus, the operating characteristics of the power sources need to be considered, along with physical conditions during the flight (e.g., terrain, weather and flight distance), and pilot preference for the flight (e.g., high speed or economy) to determine an optimal path. In some embodiments, this is enabled via a Flight Path Optimization Platform (referred to herein as "FPOP", and described with reference to FIGS. 13 and 14) that engages with the flight management system (FMS) and POCS to define optimal flight paths and to refine these as conditions evolve along the flight.

FIG. 1 is a diagram illustrating certain of the primary components, elements, and processes that may be present in an implementation of an embodiment of the inventive transportation system. As described herein, the inventive transportation system and associated apparatuses and processes may include a distributed air transit network for regional transport based on small to mid-sized (6-90 seats) hybrid and electric aircraft (having V/STOL capabilities). These are used to complement the current conventional long-haul air transport systems concentrated at a small number of hub airports.

The air transit network is tailored for high frequency operations of electric aircraft to a large number of regional airports currently not adequately served by conventional air, as well as low-impact operations into major hubs. This enables airlines, transit authorities, air-taxi, charter and cargo operators to offer profitable fixed or variable schedule and on-demand flights across the region at cost structures competitive with long-haul. The inventive transportation network offers significantly lower door-door travel times and lower total costs per mile than alternate regional travel modes: highways, rail or high-speed rail, conventional air. In some embodiments this is accomplished via convenient, high-frequency "close-in" flights to a large number of regional airports near communities and population centers, using the inventive quiet range-optimized hybrid-electric aircraft.

As shown in the figure, an embodiment of the inventive transportation network 100 may include one or more regional sub-networks 102. Each sub-network 102 may be affiliated with a region of a country, state, or other geographical region. Each sub-network 102 will typically include multiple cities and one or more regional or hub airports 104 from which operate one or more of the inventive aircraft 106. Each regional air or hub airport 104 may include elements and services to support the scheduling and "fueling" of aircraft, where here fueling refers to the recharge or swap of the stored energy units, and adding fuel for the range-extending generators (as suggested by "Recharge and refuel services" 108 in the figure). Management of the scheduling, refueling, and other services (such as record keeping) may be performed by one or more service platforms 110. Such platforms may include those used to access and process diagnostic information regarding flights, operate a fueling station, and schedule refueling operations. In some embodiments, service platforms 110 may include processes capable of performing supply-demand matching for scheduling flights, making parts available in an efficient manner, or other desirable matching or optimization processes related to management of the network and its constituent elements.

Figure 2:
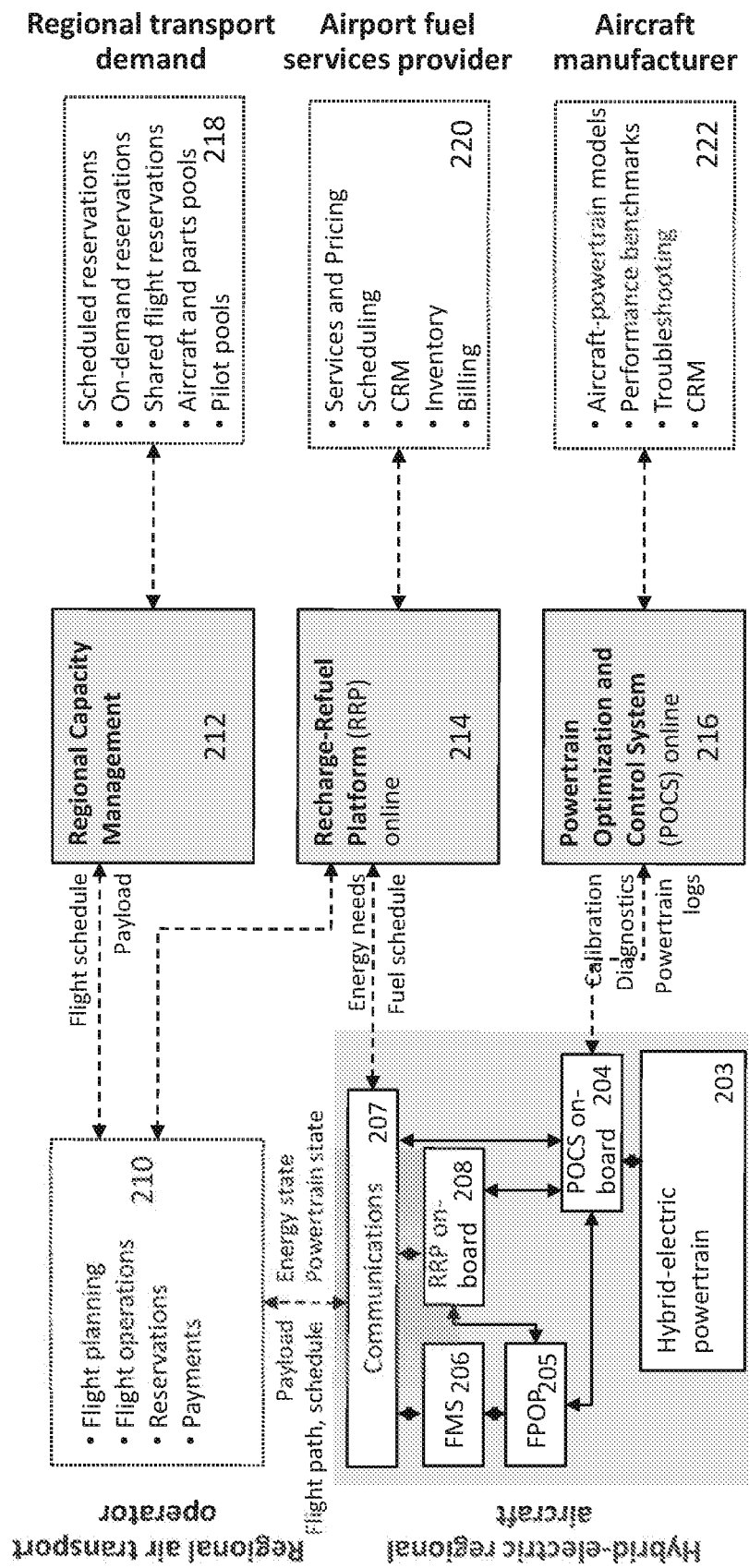
FIG. 2 is a diagram illustrating certain of the primary components, elements, data flows, and processes that may be present in an implementation of an embodiment of the inventive transportation system 200.

FIG. 2 is a diagram illustrating certain of the primary components, elements, data flows, and processes that may be present in an implementation of an embodiment of the inventive transportation system. As shown in the figure, such a system 200 may include an implementation of the inventive hybrid-electric regional aircraft 202. Aircraft 202 includes an embodiment of the hybrid powertrain 203 described herein, a powertrain optimization and control system (POCS) 204, a Flight Path Optimization Platform (FPOP) 205, a flight management system (FMS) 206, and a communications capability 207 for the transfer of messages and data to other components or processes of the system 200. A regional air transport operator 210 may include a set of processes for use in flight planning and other scheduling or administrative tasks related to the operation of one or more airports and their associated aircraft. Communications capability 207 may be used to transfer data related to aircraft payload, flight path, and energy state (among other parameters) to regional air transport operator 210. Data obtained from and/or processed by one or more of the aircraft 202 and transport operator 210 may be used to assist in flight scheduling via a regional capacity management platform or process 212, to assist in the administration and scheduling of the "refueling" processes via Recharge-refuel platform 214, or to assist in monitoring the operation of the aircraft during and post-flight (for purposes of pilot logs and diagnosing any issues) via a POCS online process or platform 216.

As suggested by the figure, demand for the regional air transport services may be driven by reservations of various types, and by the availability of aircraft, parts, and pilots. Such information 218 will typically be used by regional capacity management platform or process 212 to determine the appropriate number and type of fights made available to customers. Similarly, a fuel/energy/power services provider may use information related to flight scheduling, fuel needs, available fuel (such as charged modules), and sales/payments 220 to schedule refueling operations and accept payments for those operations via Recharge-refuel platform 214. An aircraft manufacturer 222 will typically provide information regarding the structure and operation of the aircraft and its systems to POCS online process or platform 216 for use in assisting a pilot or process to operate the aircraft and for diagnosing issues.

Figure 3:
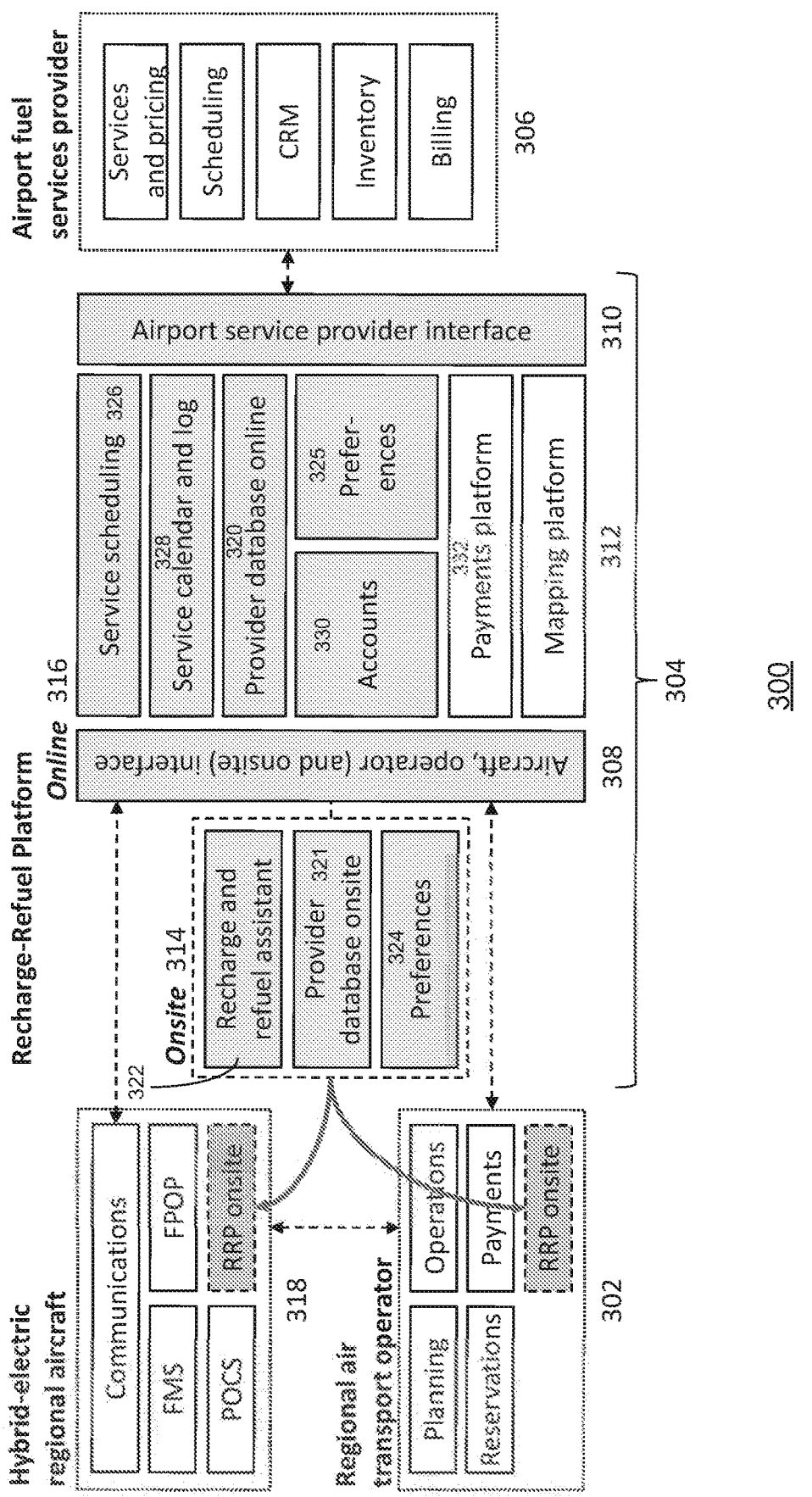
FIG. 3 is a diagram further illustrating certain of the primary components, elements, and processes that may be present in an implementation of an embodiment of the inventive transportation system 300.

FIG. 3 is a diagram further illustrating certain of the primary components, elements, and processes that may be present in an implementation of an embodiment of the inventive transportation system 300. As suggested by the figure, the aircraft and pilot 318 may utilize one or more systems, platforms, modules, or processes (as suggested by "FMS", "FPOP" "POCS", "RRP onsite") as part of scheduling or operating the aircraft. The Recharge-refuel platform onsite 314 ("RRP onsite") assists the pilot with determining optimal recharge and refuel services required en route or at the destination by utilizing one or more systems, platforms, modules, or processes (as suggested by "Recharge and Refuel assistant", "Service Provider database", "Preferences"). Alternately, recharge and refuel decisions may be made by the Regional air transport operator 302 based on information provided to it by the aircraft and pilot 318. The Recharge-refuel platform onsite 314 similarly assists with these as shown. Information on recharge and refuel services requested by the pilot or the operator, and the service providers proposed schedule may be exchanged between the Recharge-refuel platform online 316 and the aircraft and pilot 318 or regional air transport operator 302 via a suitable interface 308. Recharge-refuel platform online 316 may utilize one or more systems, platforms, modules, or processes (as suggested by "service scheduling", "service calendar and log", "provider database", "payment platform, "mapping platform", etc.) as part of providing recharge and refuel scheduling, processing of payments for such services, etc. Similarly, data may be exchanged between the Recharge-refuel platform online 316 and the Airport fuel services provider 306.

As indicated, airports/airfields served by the inventive regional electric air transportation system may provide various levels of quick swap and recharge infrastructure to enable high-frequency electric flights. Recharge stations will operate to enable standard and fast charging of aircraft energy storage units in-situ, while swap stations will operate to exchange discharged or partially discharged energy storage units and replace them with charged ones. The inventive aircraft includes bays to house standard and extended energy storage units, and these may each be modular to enable removal of discrete modules comprising the standard or extended pack. As a result, the swap may involve replacing the existing modules with a smaller or larger number based on operator requirements such as the speed, range, payload and cost of the next flight.

Note that an aircraft's speed, range, payload and operational cost are determined to a large extent by the energy storage capacity onboard. As a result, the ability to add or remove energy supplying modules enables performance to be tailored to the needs of a specific flight. For instance, on a flight with less than design payload, the operator is able to reduce operating cost and/or increase electric range by adding energy storage units of weight up to the design payload minus actual payload, less the reduced fuel required. Conversely, the operator is able to accommodate payloads above design by removing energy storage units of weight greater than the payload overage plus the additional fuel required for the flight. This capability enables an operator to reduce costs on legs where the aircraft is loaded to less than capacity, and to accommodate overloaded flights. Further, in order to enable efficient module swaps and recharges, the transportation network may be supported by a software and communications platform 312 that enables pilots or regional air transport operators to determine energy needs and communicate these to fuel services providers at the destination airport, or at airport(s) on the way to the destination.

Figure 3A:
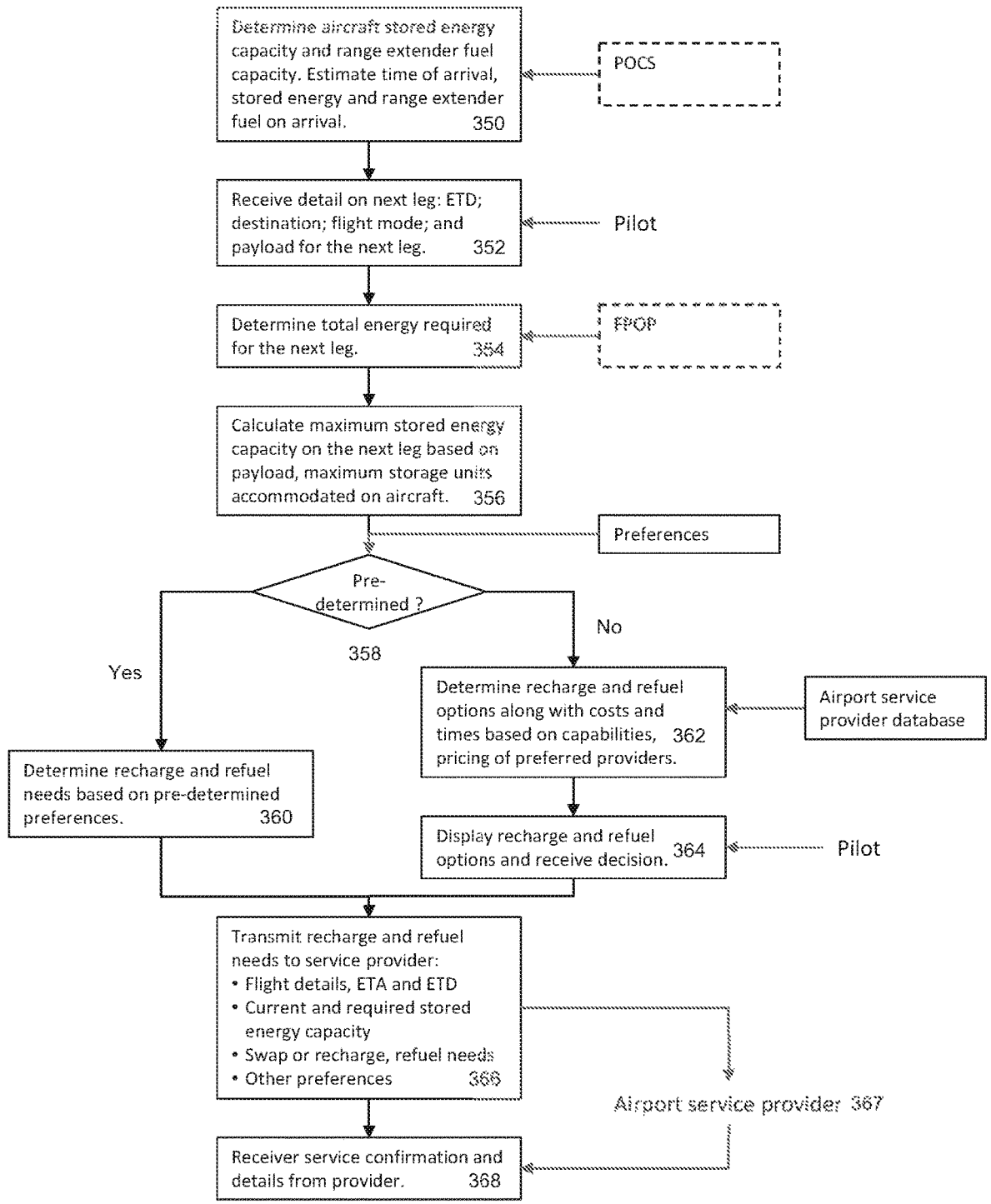
FIG. 3(A) is a flowchart or flow diagram illustrating a process, method, operation, or function to determine recharge and refuel services required at a destination airport, and which may be used in an implementation of an embodiment of the inventive systems and methods.

As noted, a block diagram of an embodiment of Recharge-refuel platform 304 is shown in FIG. 3. An aspect of its operation is illustrated by FIG. 3(A), which is a flowchart or flow diagram of an example process for determining recharge or refuel services required at a destination and in FIG. 3(B) for determining such services on the way to the destination. These processes or operations are executed by the "Recharge and Refuel assistant" module or process of the onsite aspects 314 of platform 304 based on pilot or operator request.

Figure 3B:
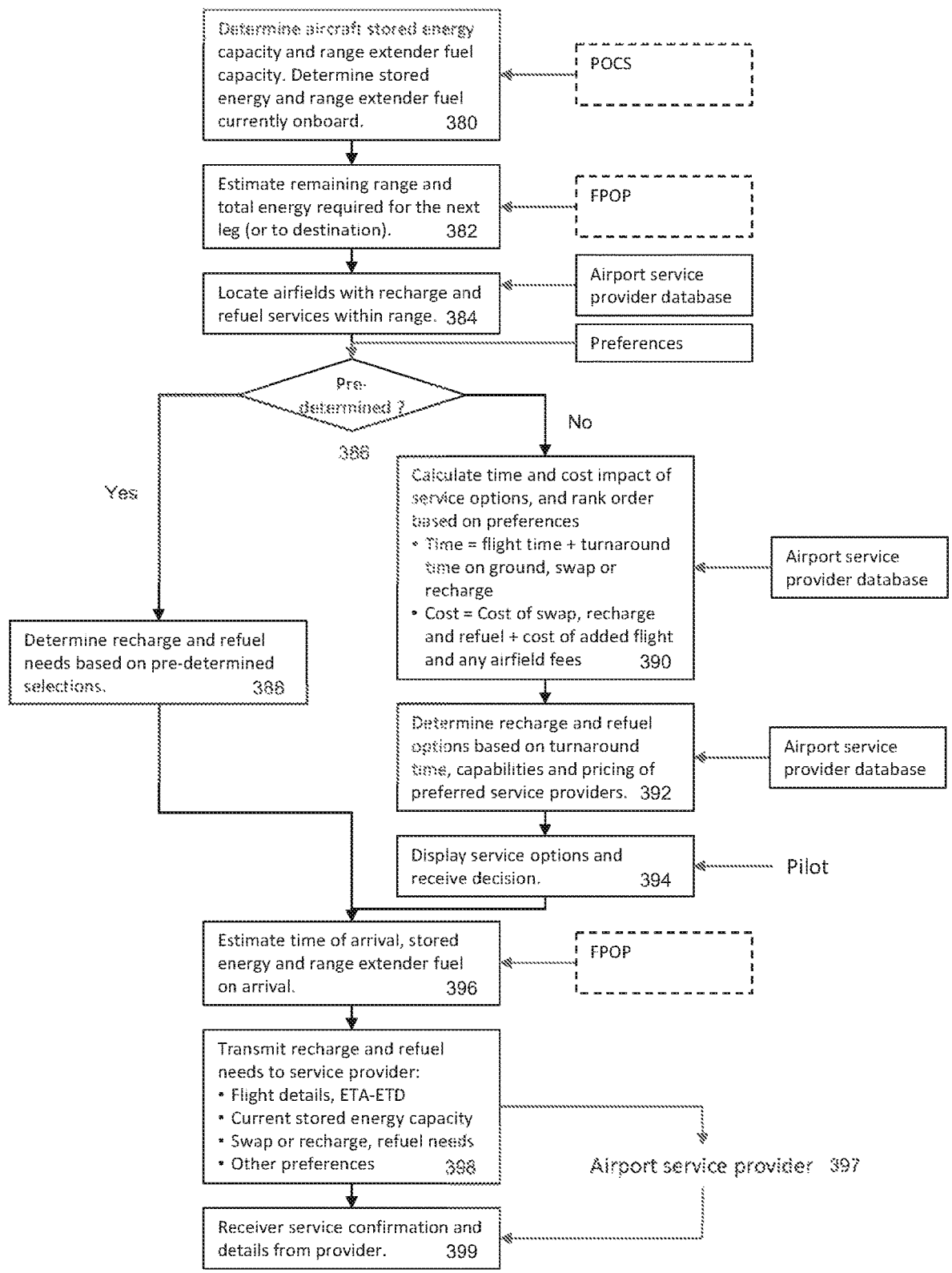
FIG. 3(B) is a flowchart or flow diagram illustrating a process, method, operation, or function to determine recharge and refuel services en route to a destination airport, and which may be used in an implementation of an embodiment of the inventive systems and methods.

The processes or process flows illustrated in FIGS. 3(A) and 3(B) depend on multiple factors; these include payload and energy requirements of the route leg, onboard energy storage capacity and charge remaining, turnaround time and cost to determine swap and recharge requirements. These parameters and data are typically communicated to the Airport fuel services provider 306 together with flight details, ETA and turnaround time, so that provider 306 can schedule service and make preparations so that a swap or recharge is performed quickly and properly. To assist the pilot with recharge and refuel at a destination airport, the platform 304 determines the additional energy required for the next flight (such as a flight segment), and generates feasible options based on capabilities of the preferred service providers at the airport.

Such options may include one or more of tailoring the stored energy capacity to payload, adding stored energy units on low payload flights for improved energy efficiency, or removing units on flights where additional payload is required. Options may also include swap or recharge for the stored energy units based on one or more of cost, turnaround time, or impact on operating life of the stored energy units. The options are presented to the pilot along with the cost and time required, and the pilot's selection of a desired option is transmitted to provider 306 to schedule services. Similarly, to assist the pilot with services en route to a destination, platform 304 determines the range of the aircraft given the remaining energy onboard and the additional energy required for the next leg. This may be done in order to generate feasible pilot options based on service providers within range of the aircraft, along with the cost and time impact of each choice. Note that platform 304 may be used to support recharge and refuel planning for a single flight, for multiple flights in sequence, or for a flight with multiple legs. The sequence of services for a multiple-step trip is selected by the pilot based on guidance from the platform and transmitted to the service providers. During the course of the trip, recharge and refuel needs, and schedule are refreshed periodically based on progress of the flight, and transmitted to service providers whenever these change significantly or satisfy a specific rule or condition.

Recharge-Refuel Platform 304 also provides support for billing, payments and account management so that such transactions occur efficiently and using standard transaction authentication, authorization, and processing techniques. The energy storage units may be owned by the operator of the aircraft, in which case, swap units would be pre-positioned based on flight patterns, much as spare parts are today. The energy storage packs could also be owned by the services provider, or a 3rd party and loaned to the aircraft operator as a service. The services provider stores and recharges the spare packs, and swaps them as needed for discharged packs.

The Recharge-Refuel Platform 304 is comprised of a set of onsite functional modules 314 that are implemented onboard the aircraft or on-premises at the regional air transport operator, and a set of online functional modules 316 accessible via the internet or other suitable communications network. Note that although the services provided by an operator of such a platform will be referred to herein as recharge/refuel, they may also include an exchange of energy sources, and exchange may entail adding more, or reducing the total number of battery packs depending on operational needs. The Recharge-Refuel Platform connects and permits communications between hybrid-electric aircraft, regional air transport operators, and airport fuel services providers to enable highly efficient fueling operations. Elements of the platform may include one or more of the following:

Online service provider database online 320 and onsite 321 is a periodically updated directory of airports, fuel service providers at each airport, services capabilities of each provider, services schedule, pricing and other logistical details, e.g., affiliations, payment methods supported, etc. Typically, the most current and comprehensive version of this database is maintained within online platform 316. Abbreviated (e.g., locally/regionally customized) versions of the database are deployed as part of the onsite aspects 314 of platform 304 so that the onsite Recharge and refuel assistant module/process 322 can function without reliance on or connectivity to online platform 316. However, note that as a backup, one or more of the distributed sites may also maintain a copy of the comprehensive version of the database; this redundancy may be of assistance in providing recharge and refuel data to pilots and regional facilities in the event of an interruption of services provided by the central data repository, or to provide a pilot that is significantly off course with assistance. The abbreviated versions may be updated periodically from the online database, when appropriately secure access is available and the updates can be performed without having an undesirable impact on operations;

Preferences data (elements, processes, or modules 324 and 325) are a record of tailored settings for an aircraft or operator. These may include default units, currencies and time zones, preferred fuel service providers and custom pricing, communication and transaction processes, as well as standard fueling protocols for specific routes. These are stored onsite 324, as well as within the online platform 325;

Recharge and refuel assistant 322 enables the pilot or the operator to determine optimal fueling required to support one or multiple flights, and to select among available providers at an airport or within range of an aircraft. The function or process leverages the Provider database onsite 321 and the Preferences data 324 of the Recharge-Refuel Platform 304, as well as a set of modules or functions accessible on the aircraft or to an operator, such as POCS and FPOP (the functions or operations of which are described in greater detail herein);

Service scheduling module 326 receives specific fuel service requests and attempts to schedule them with the requested provider. If the requested time slot is available, then the module returns with a confirmation and records the reservation on the service calendar 328 for the aircraft. If the time is not available, then the module returns with alternate openings. Providers may give control of their schedules to the Recharge-Refuel Platform, and/or manage schedules themselves. Where the platform has control, module 326 schedules the service on the provider's calendar and sends a notification to the provider. Where the provider has control, module 326 notifies the provider of the service request and waits for a confirmation, or details on alternate openings;

Service calendar and log module 328 maintains a record of all services scheduled by aircraft and by provider. For each past service the module may track disposition, whether the service was performed, an invoice for the service performed, details on payments completed, outstanding feedback from the customer, etc. Module 328 enables service providers to define service slots available in the future, to permit the platform to book on their behalf or retain control, to update their calendars to reflect bookings made outside of the platform, etc.; and Accounts module 330 is a record-keeping and transaction module that enables providers to issue invoices and enables customers to make payments. The module leverages standard payment platforms 332 currently in use by pilots and operators, e.g., EDI, credit cards, EFT.

A further aspect of the inventive system 300 is the airport fuel services provider 306. This represents an operator or manager of an airport or airfield that is part of the inventive transportation system. Such an operator or manager may provide a set of services to enable aircraft to efficiently recharge or swap energy storage units, take on additional fuel for the range-extending generators, process payments for those services, etc. Provider of regional airport or airfield services 306 may interact and transfer data with Recharge-Refuel Platform 304 via a suitable interface 310.

Returning to FIG. 3(*a*), which is a flowchart or flow diagram of an example process for determining recharge or refuel services required at a destination, in one embodiment, the POCS (described in greater detail with reference to FIGS. 11 and 12) may be used to determine the available energy/fuel for the aircraft, the estimated time if arrival, and the energy/fuel status after arrival (step or stage 350). Next, based on inputs from the pilot or flight scheduling processes, information or data concerning the next leg or segment of the flight may be received (step or stage 352). The FPOP process (described in greater detail with reference to FIG. 14) is used to determine the total energy required for the next leg or segment (step or stage 354). Next, the maximum available stored energy capacity for the next leg or segment is determined (step or stage 356).

Preference data (as described with reference to FIG. 3) may then be considered to determine the allocation of total energy required for the next leg or segment between stored (e.g., battery) and generated (e.g., based on the use of fuel). If such preferences exist (as suggested by the "Yes" branch of step or stage 358), then such preferences or conditions/constraints are used to determine the recharge and/or refuel requirements (stage or step 360). If such preferences do not exist (or are for some reason inapplicable, as suggested by the "No" branch of stage or step 358), then the recharge and/or refuel options may be determined based on availability, pricing, etc. (step or stage 362). As suggested by the figure, this determination may involve considering data contained in an airport service provider database. The determined recharge and/or refuel options may be presented to the pilot, and the pilot's decision(s) received (stage or step 364).

Based on the preferences and/or the pilot's decision(s), the recharge and/or refueling requirements are communicated to an appropriate service provider 367 (stage or step 366). This may include information regarding the flight, the aircraft, energy available and needed, the configuration of the energy sources, etc. After receipt and processing, the service provider 367 may provide a confirmation of the recharge and/or refuel order and any associated information to the pilot (stage or step 368).

Returning to FIG. 3(*b*), which is a flowchart or flow diagram of an example process for determining recharge or refuel services en route to a destination, in one embodiment, the POCS (described in greater detail with reference to FIGS. 11 and 12) may be used to determine the available energy/fuel for the aircraft, the estimated time if arrival, and the energy/fuel status after arrival (step or stage 380). Next, the FPOP process (described in greater detail with reference to FIG. 14) is used to estimate the remaining range of the aircraft and determine the total energy required for the next leg or segment (step or stage 382). An airport service provider database may be used as a source of information and data regarding airfields having suitable recharge and/or refuel facilities (stage or step 384).

Preference data (as described with reference to FIG. 3) may then be considered to determine the allocation of total energy required for the next leg or segment between stored (e.g., battery) and generated (e.g., based on the use of fuel). If such preferences exist (as suggested by the "Yes" branch of step or stage 386), then such preferences or conditions/constraints are used to determine the recharge and/or refuel requirements (stage or step 388). If such preferences do not exist (or are for some reason inapplicable, as suggested by the "No" branch of stage or step 386), then the recharge and/or refuel options may be determined based on consideration of the impact of one or more recharge/refuel service options on the flight (as suggested by stage or step 390). This may involve considerations of turnaround time required and any expected delays to the flight, costs, airfield fees, etc. Based on the determined options and the application of any relevant rules, conditions, or constraints, a subset of the possible options may be determined and presented to the pilot (as suggested by stages or steps 392 and 394), and the pilot's decision(s) received.

Using the FPOP module or process, the aircraft's estimated time of arrival, stored energy, and available fuel may be determined (stage or step 396). Based on the preferences and/or the pilot's decision(s), the recharge and/or refueling requirements are communicated to an appropriate service provider 397 (stage or step 398). This may include information regarding the flight, the aircraft, energy available and needed, the configuration of the energy sources, etc. After receipt and processing, the service provider 397 may provide a confirmation of the recharge and/or refuel order and any associated information to the pilot (stage or step 399).

Figure 4:
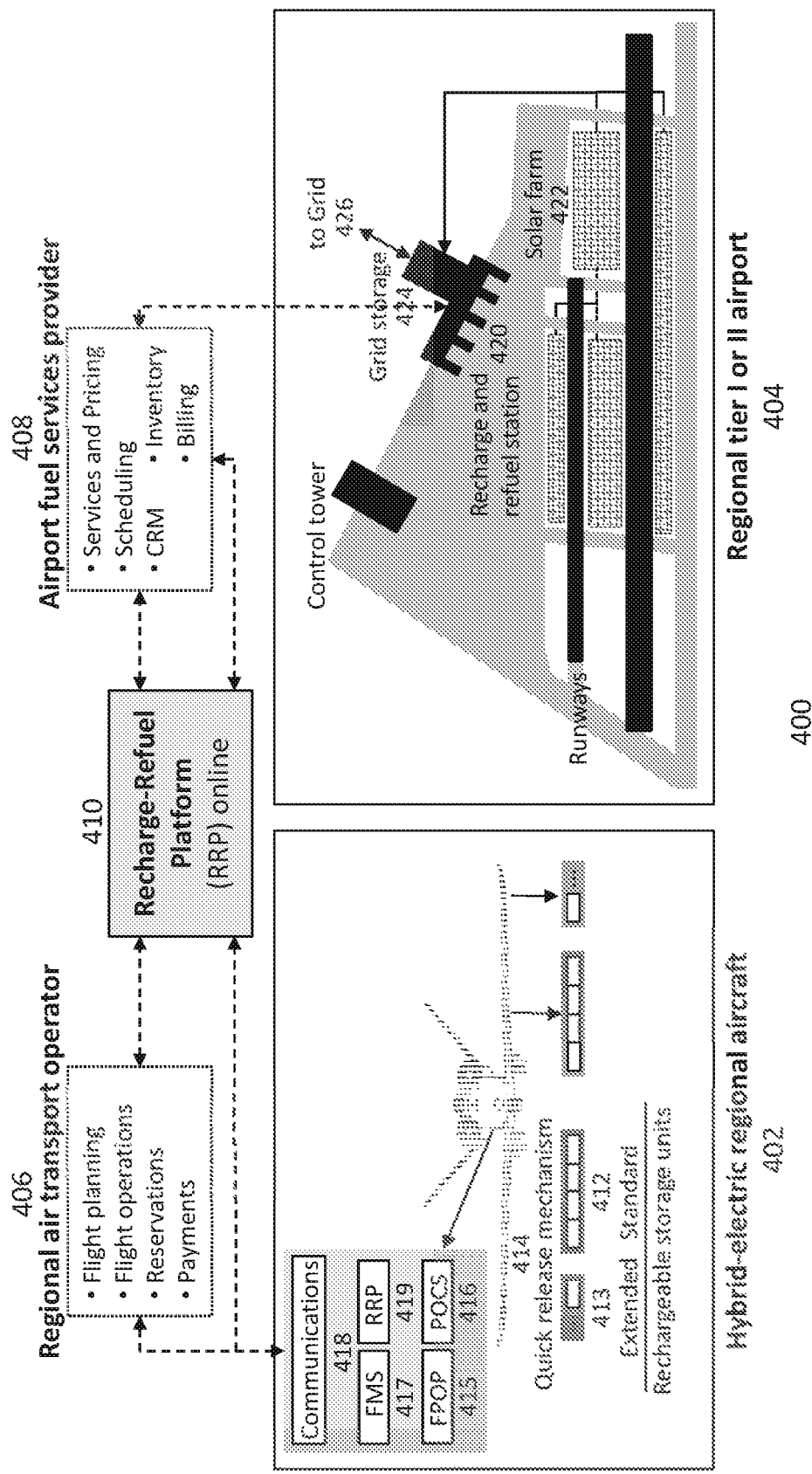
FIG. 4 is a diagram further illustrating certain of the primary components, elements, and processes that may be present in an implementation of an embodiment of the inventive transportation system 400.

FIG. 4 is a diagram further illustrating certain of the primary components, elements, and processes that may be present in an implementation of an embodiment of the inventive transportation system 400. Referring to FIG. 4, in some embodiments, the inventive transportation system includes hybrid-electric regional aircraft 402, regional tier I or II airports 404, regional air transport operators 406, airport fuel services providers 408 and a Recharge-Refuel Platform 410.

As suggested by the figure, an embodiment of the inventive aircraft 402 may be equipped with a number of modular energy storage units: standard units 412 sized for use on flights at design payload, and extended units 413 for increased electric range on flights at less than design payload. These packs may be positioned for easy swap when on the ground using quick release mechanisms 414, in locations such as the wings, in pods suspended from the wings, under the fuselage. Aircraft 402 controls include a Powertrain Optimization and Control System ("POCS", described in greater detail herein) 416, a Flight Management System (FMS) 417, and a secure datalink 418. The POCS 416 and FMS 417 may be implemented in form of a set of computer/software instructions executed by an electronic processing element, CPU, state machine, etc. Among other functions, POCS 416 tracks energy storage capacity onboard and energy remaining, FMS 417 estimates arrival times at the destination airport, and the datalink is used for communicating with the operator and fuel services providers.

The regional tier I or tier II airport 404 is equipped with a swap, refuel and recharge station 420 to enable quick turnaround of hybrid-electric flights. This includes equipment for automated or semi-automated removal and replacement of energy storage units, transport of the packs to and from storage, and a storage and recharge facility for energy storage units. Airport 404 may include a solar farm 422 for onsite electricity generation, and onsite grid storage 424 that is connected to the electric grid 426. Power to recharge energy storage units may be drawn in an optimal way across the solar farm, the grid storage and the grid, depending on requirements, cost, availability, etc.

Recharge-refuel platform 410 may connect entities across the air network to help orchestrate efficient recharges and swaps. The platform is engaged by pilots or air transport operators to identify/select providers and services based on operational needs. These requests are relayed to the providers who confirm and schedule service, and ensure stations are prepared for the arrival of the aircraft. Certain of the operations or functions that may be performed by platform 410 have been described herein with reference to FIGS. 2 and 3. Regional air transport operator 406 may operate to schedule and administer services for passengers, pilots, and aircraft. Certain of the operations or functions that may be performed by platform 406 have been described herein with reference to FIGS. 2 and 3. Airport fuel services provider 408 may operate to schedule and administer the provision of recharge and swap operations for the stored energy units (such as elements 412 and 413 in the figure) or adding fuel for the range-extending generators onboard the aircraft. Certain of the operations or functions that may be performed by platform 406 have been described herein with reference to FIGS. 2 and 3.

Figure 5:
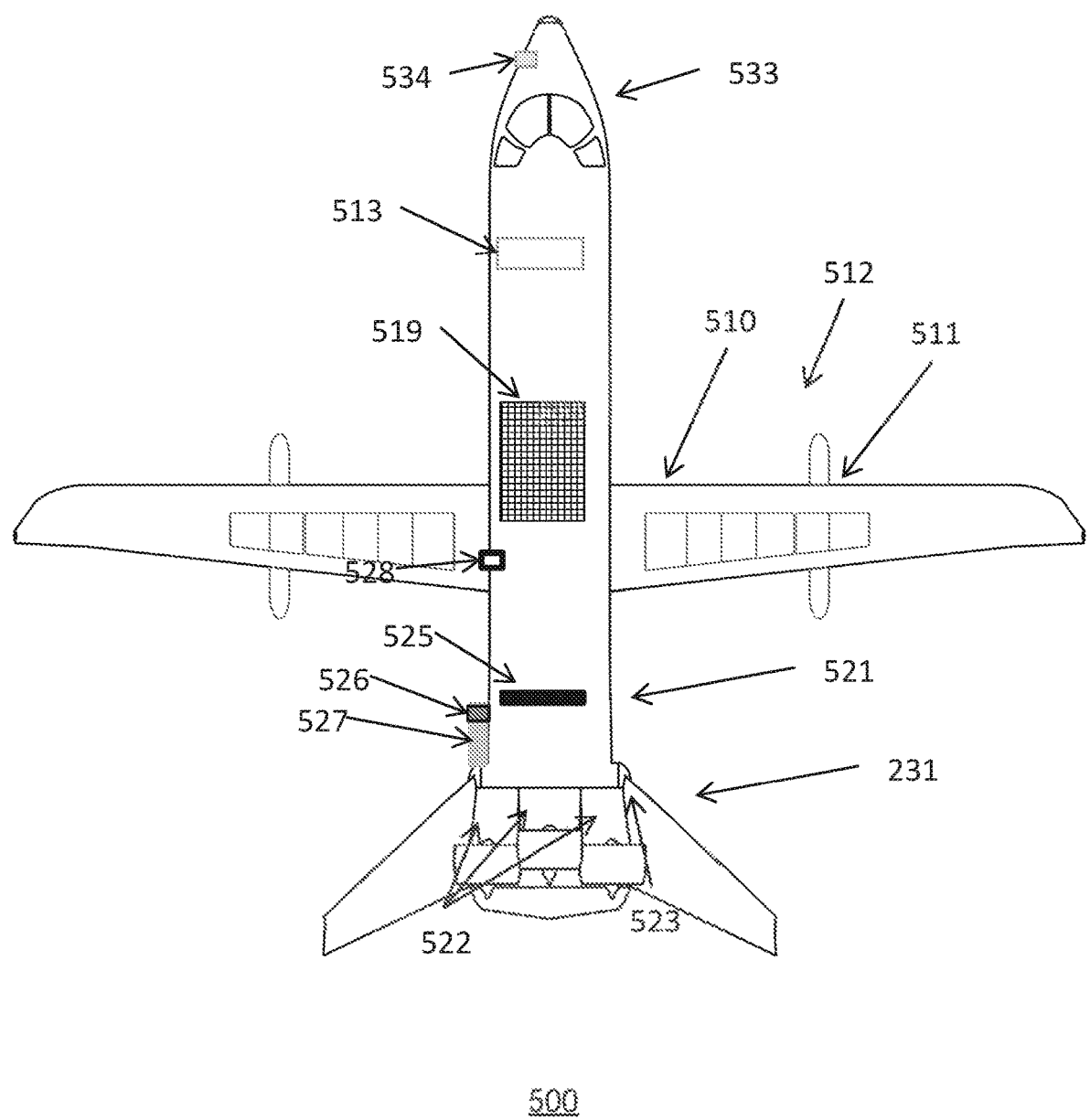
FIG. 5 is a diagram illustrating an example of the inventive range-optimized hybrid-electric aircraft 500 that may be used in an implementation of the inventive regional air transport system.

FIG. 5 is a diagram illustrating an example of the inventive range-optimized hybrid-electric aircraft 500 that may be used in an implementation of the inventive regional air transport system. In some embodiments, such aircraft and/or air transport system may have one or more of the following characteristics or qualities, where regional hybrid-electric aircraft are designed for optimal transport of passengers or cargo over regional ranges, typically up to between 500 and 1000 miles:

Aircraft are designed for "lean" operations in-flight and on the ground, with one or more of the elements or processes described herein, to enable air operations to small, limited service airports;

This "lean" operation in-flight is enabled by one or more of the following features of the aircraft:

Lower energy and cost: Aircraft and powertrain are optimized for regional flights, e.g., lower speed, range and ceiling than long-haul airliners. A powertrain optimization and control (POCS or similar) platform is used to optimize energy use during flights across the one or multiple energy/power sources;

Lower ATC load: Onboard ADS-B, including optional datalink to air traffic control;

Fewer pilots: Fly-by-wire capabilities, including (if desired) auto-land. Comprehensive FMS with operator upload. High levels of automation including facilities for remote piloting or fully-autonomous flight;

All weather operation: Pressurization for mid-altitude flights (e.g., 25,000 ft) to enable weather and terrain avoidance; and Minimal runway needs. Balanced field take-off <5,000 ft. Soft-surface landing capabilities;

In addition, "lean" ground operations are enabled by the following features on the aircraft, and at the airport:

Fast refuel and repair: Air-side quick recharge or swap capability for onboard energy storage units (e.g., batteries). Automated or manual transmission of refuel, recharge and maintenance requirements via datalink ahead of landing;

Fast check-in and load: Cabins designed with storage racks near doors to allow passengers to board with airline standard carry-on baggage, making up for the low overhead space typical of small to medium aircraft. Simultaneously, re-configurable barriers may be used to separate passengers from a secure hold for storing oversize and checked-in baggage. A simple plane-side check-in platform (e.g. smartphone, tablet, PC) may enable quick identity and ticket checks, and fee collection. Design will support operation even in offline mode without network access, via prior download of passenger and cargo manifests, and execution of payments delayed till next covered by a network;

Flight prep: Comprehensive FMS with optional operator upload. Automated system checks performed by POCS or other system. Onboard aircraft monitoring platform with datalink; and The regional air transport network may be supported by next-generation capacity management capabilities to help maximize aircraft load factors and utilization, such as:

Higher load factors: Regional reservations platforms, including links to the GDS for conventional air. The reservations platform operates to match customer demand in real-time with available flights, including provisions for fixed and demand-based scheduling (including near real-time capabilities), on-demand and charter operations. Operators engage with the platform via their private ARS (larger operators) or via a variety of hosted, private labelled ARS offerings (typically used by smaller operators); and higher aircraft utilization: Virtual "pools" of electric aircraft may be created, enabling owners and operators to offer and rent aircraft for short (hours) or medium (days-weeks) periods of time. Platform enables listing of pooled aircraft, including availability and rental terms. Platform includes streamlined processes for locating available aircraft based on requirements, for negotiating terms and contracting, payment processing and transfer payments, and to receive or return aircraft. Similar virtual pools for spare parts and pilots/crew enable quick turnaround, schedule flexibility.

Returning to FIG. 5, the table(s) below provide a description of the primary elements of the aircraft illustrated in the figure, and also note the difference in construction, materials, and requirements between the inventive aircraft and conventional aircraft.

| FIG. Element | Description | Required operational characteristics | Difference from conventional |
|---|---|---|---|
| 510 | Standard energy storage bays with access through the lower wing skin. These bays are fully utilized in normal operation | Bays allow for rapid energy storage module swap (<5 minutes for full aircraft). | The modules may occupy the same location as a traditional chemical fuel tank in the main wing. However, a tank is a fully sealed, built-in unit which is neither accessed nor removable without wing disassembly. |
| 511 | Extended energy storage bays; utilization is optional allowing operators to trade payload against storage capacity, as is traditionally done with fuel | Same as 210 | Same as 210 |
| 512 | Energy storage pods: One or more energy storage units enclosed by an aerodynamic fairing, mounted externally to the aircraft, most likely in an under-wing location. | Pod is designed for quick swap capability (<5 minutes for full aircraft). Pod is self-contained, for cooling and safety requirements, e.g., BMS. | Pod is similar to external fuel tanks which have been used extensively by military fighter aircraft to extend range but very rarely used on commercial aircraft. |
| 513 | Energy storage bay located in the fuselage. Bay may be at multiple locations fore and aft along the fuselage to aid in balancing the CG of the aircraft. Bay may also be integrated with tracks to slide the energy storage unit fore and aft to modify CG of the aircraft. | Access same as 510. | Conventional aircraft may utilize fuselage fuel tanks; however, the use of such tanks for variable CG location is largely lost since fuel is burned off in flight. |
| 519 | Chemical fuel tank which may be located in the fuselage, the wing-body fairing, or may also be located in wing mounted fuel tanks | | Likely none |
| 521 | Aerodynamic fairing which encloses the range extending generator (527, 526), and also accommodates air intake requirements for combustion and cooling. | Minimize drag of the generator installation while allowing fast access for maintenance. Support modular powertrain capability by allowing different fairings for different generators. Provide inlet and exhaust for cooling and combustion air. Inlet openings must be when generation is not in use to reduce cooling drag. | The requirement to cover (fair over) the air intakes and/or exhaust for flight segments without generator running is novel to the hybrid-electric system. Conventional engine nacelles have fixed inlets, sometimes variable exhaust, and engine is always running in flight. |
| 522 | Electric propulsion motors integrated within the propulsor, in this case a ducted fan. | High efficiency (>95%), high power density (>5 kW/kg) electric motor with maximum continuous power at 2000-3000 rpm to match low noise propulsor. Motor capable of peak power rating up to 2× the continuous rating for limited time duration. | Conventional aircraft propulsors designed to match engine while the electric motor may be integrated with any suitable propulsor for the aircraft design requirements. |

-continued

| FIG. Element | Description | Required operational characteristics | Difference from conventional |
|---|---|---|---|
| 523 | Quiet ducted fan—this is described in greater detail with reference to FIG. 6. | | |
| 525 | Electrical distribution system—this is described in greater detail with reference to FIGS. 7 and 8. | | |
| 526 | Generator and controller | Generator operates at >95% and optimized for the output RPM of the generation engine 527. Engine may be connected to the generator directly or through a gearbox. inverter-controller is solid state operating at better than 98% efficiency | Conventional aircraft engines include a starter-generator combination which starts the engine, and then absorbs a small fraction of the engine power to run aircraft electrical systems. The hybrid generator may or may not function as the starter, and utilizes 100% of the engine power to generate electricity for primary propulsion, and aircraft electrical systems. |
| 527 | Range extending generators | High efficiency conversion of chemical potential energy to electrical power. Engine controlled with a full authority digital engine controller (FADEC). | Large commercial aircraft may include a non-propulsion engine, which provides auxiliary power and pressurization air flow for ground operations, and following loss of a primary propulsion engine in flight. This generation engine provides energy for primary propulsion, as well as systems, and operates in combination with stored energy sources. |
| 528 | Ground power charge point: A single access point on the fuselage which distributes grid energy to the energy storage units for recharging | Provide a single connection point into the main power distribution bus to allow simultaneous charging of all energy storage units. May also include a connection to provide active cooling flow to the packs during high-rate charging operations. | No conventional equivalent. |
| 533 | Cockpit, forward compatible for operation by two pilots (or a single pilot with ground backup assist), or unmanned for remotely piloted or autonomous operations. | High level of cockpit automation to allow for single pilot operation without safety compromise. Includes the powertrain interface (POCS) and standard flight controls and navigation avionics. Additional provisions for a single pilot with ground assist, and flight controls which enable remote operation. | Even highly automated aircraft require two pilots, and are not intended for remotely piloted operation. |

| FIG. Element | Description | Required operational characteristics | Difference from conventional |
|---|---|---|---|
| 534 | Powertrain Optimization and Control System (POCS) which serves as the pilot interface to the powertrain and the optimization processes (and which is more fully described with reference FIG. 9). | | |

Note that with regards to the embodiment of the inventive aircraft shown in FIG. 5, this embodiment is a conceptual design of a range optimized, regional passenger aircraft. Electricity for the propulsion motors 522 is provided by a range-optimized series hybrid-electric powertrain (described further herein with reference to FIGS. 7 and 8), comprised of energy storage units 510 and range-extending generators 526-527 (left side only shown):

The energy storage units (in this case battery packs) are located in the wings, including standard packs 510 and extended packs 511 for use on flights with less than design payload. In other embodiments, energy storage units may be positioned in under-wing pods 512, and at various locations within the fuselage. The embodiment shown has battery packs 513 positioned under the passenger cabin in the forward fuselage. Fuel for the range-extending generator is stored in a wing-body fairing tank 519;

Propulsion motors 522 in this embodiment are embedded in a ducted fan 523 for high static thrust to enable short take-off and landing, high climb rates, and quiet operations. Additional noise reduction is achieved by locating the fans between the V-tails 531 and above the fuselage, to shield the ground from nose. The generators 527 are integrated within noise-insulated aerodynamic nacelles 521;

Power to the propulsion motors is delivered by an electric distribution system 525 which sources energy from any combination of the stored energy units 510, 511, 512, 513, and the range-extending generators 526, 527. Optimal sourcing of energy from the storage units and generators is managed by the powertrain optimization and control system 534 (the POCS, described further herein with reference to FIGS. 9 and 10);

The aircraft is "plug-in" hybrid-electric, designed to recharge stored electrical energy via ground-based charging stations via a plug-in point 528, or by swapping fully or partially discharged storage units for charged ones. Charging mechanisms that connect to the mains or fast charge stations are included onboard, enabling low or high-rate recharge in-situ. Storage units are also equipped with quick release mechanisms to enable fast swaps of storage units or modules thereof. Limited recharging of storage units by the onboard generators is also enabled, during low power operations in flight or on the ground;

All or most of the aircraft sub-systems may be electric, and driven by hybrid-electric powertrain. These could include the flight control system, landing gear, environmental control systems, anti-icing, fuel pumps, taxi motors, and lighting; and The aircraft may be equipped for a variety of flight modes, ranging from conventionally piloted, to onboard pilot with remote assistance, to remotely piloted, to fully autonomous with remote assistance. As a result, the cockpit of the aircraft 533 may be configured for zero, one or two pilots, and may include capabilities to enable control of the aircraft by a remote pilot and by an auto-pilot unit.

An embodiment of the inventive range-optimized hybrid-electric regional transport aircraft 500 represents a relatively quieter, forward-compatible hybrid-electric aircraft optimized for regional passenger or cargo operations, either manned or unmanned. In some embodiments, such aircraft use a propulsion system powered by one or more electric motors, delivering thrust via propellers or other suitable mechanism, e.g., ducted fan (such as the inventive "eFan", described in further detail with reference to FIG. 6). The aircraft is designed to operate with high efficiency in regional operations: distances <1,000 miles, cruise speeds and altitudes optimized for this range (<M 0.7, <30,000 ft), fuel burn typically 60-80% lower than equivalent conventional aircraft. The aircraft may be smaller (<100 seats) than conventional jets to match lower passenger volumes on regional routes, designed for shorter runway operations (<5,000 ft) to open up access to large numbers of smaller community airports, and operate with low cabin and environmental noise (<70 EPNdB sideline and cabin) for greater passenger and community acceptance.

Figure 6:
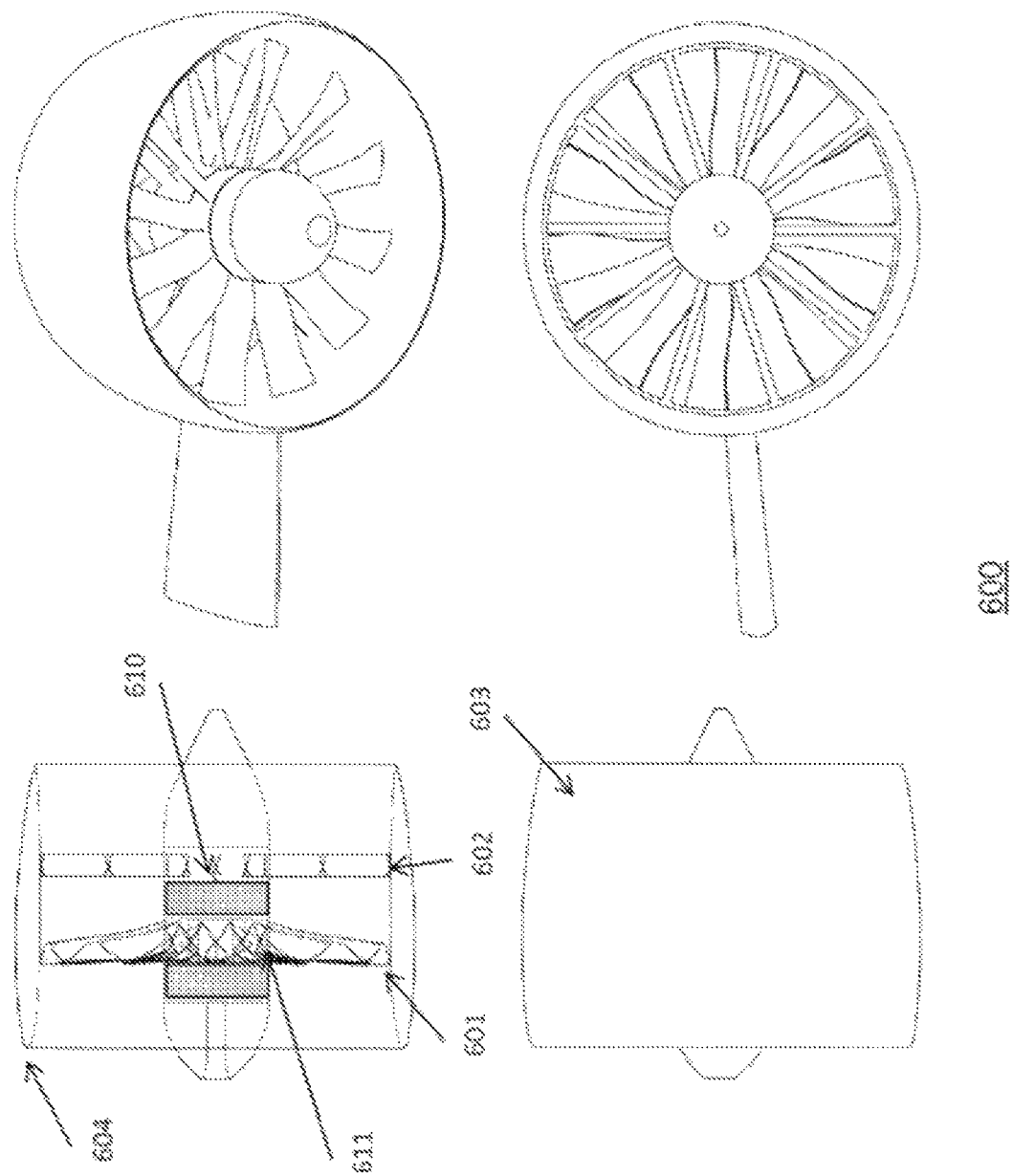
FIG. 6 is a diagram illustrating a variable pitch electric ducted fan integrated propulsion system 600 that may be used in an embodiment of an electric-hybrid aircraft that is part of the inventive air transportation system.

FIG. 6 is a diagram illustrating a variable pitch electric ducted fan integrated propulsion system 600 that may be used in an embodiment of an electric-hybrid aircraft that is part of the inventive air transportation system:

The propulsion system 600 leverages inventive quiet electric ducted fan propulsors (referred to herein as an "eFan") to enable critical quiet STOL capabilities. Quiet STOL dramatically improves the ability of an aircraft to fly "close in" to communities and population centers, thereby delivering a step-change reduction in passenger or cargo door-door travel times. STOL enables operations to smaller community airports (>13,000 in the U.S.), thereby bypassing congested hubs and saving passengers time. Quiet, efficient, reverse thrust may be used for ground maneuvering in place of ground support equipment, reducing the need for personnel and infrastructure, which may be unavailable at smaller airports. Quiet operation translates to greater community acceptance, often a limiter for such flights;

As described herein, the inventors propose a novel range-optimized design with aerodynamics and acoustics optimized for the intermediate speeds and altitudes of the regional hybrid-electric aircraft, emphasizing high efficiency in cruise and high static thrust for STOL.

This is enabled by use of a low-pressure ratio (1.02 to 1.10) variable pitch fan, enabling tailoring of propeller blade pitch to flight mode, including reverse thrust, regenerative braking and feathering;

The eFan is powered by one or more high-power-density electric motors located at the centre of the duct and connected to the fan directly, or through an optional reduction drive. Liquid or air cooling of the motors is fully integrated within the duct. The transmission is fault tolerant, designed for continued safe operation in event of motor, sensor or communication faults, which either preserve, or allow for graceful degradation of thrust output;

In addition to enabling the graceful degradation of thrust, the variable pitch electric fan enables additional safety and efficiency benefits not easily attained with conventional propulsion systems and methods. The available high torque, high response rate of thrust variation may be applied for supplemental flight control, enhancing efficiency, and may augment or replace flight controls completely (for example in case of primary control failure);

In normal operation, control of the propulsor is via pilot or auto-pilot commanding % power, % reverse power or % regenerative braking, which are translated by the POCS system into appropriate Propeller(s) blade pitch angles, Motor(s) RPM and torque (or regenerative RPM and torque), and transmitted to the motor and variable pitch controllers. In backup mode POCS automation is bypassed, and the pilot commands the motor and variable pitch controllers directly:

The POCS system translates % full-power to RPM, torque and Propeller blade pitch angle based on the Power plan, % power, Flight Mode, altitude and speed. For multiple propulsors, commands may be synchronized, so all coupled propulsors operate with the same settings;

Similarly, the POCS system translates % regenerative braking or % reverse power to matching Propeller blade pitch angles with motor set to appropriate levels of regenerative RPM and torque; and In case of emergency shutdown, the POCS system (or pilot directly via the backup mode) commands the propeller blades to feather position and halts motor motion.

The high torque at low RPM of the electric motors coupled with the high static thrust of the ducted fan leads to good STOL performance while the combination of low fan tip speeds, fan-stator and duct acoustic design and duct acoustic treatments deliver significantly lower noise signatures. As an added benefit, the increased safety and "jet like" appearance of the ducted fan are expected to translate to strong consumer appeal relative to open propeller aircraft often used for regional flights;

The propulsor is designed for forward-compatibility targeting optimal efficiencies over a 30% higher speed band, with structures designed to accommodate the higher torque and gyroscopic loads of future motors;

Range-optimized design tailored for high cruise efficiency at intermediate speeds and altitudes typical of regional operations (Mach <0.7, Altitude <30,000 ft);

Forward-compatible design by selection of mass flow design points over a cruise range that includes future maximum speed and altitudes. This range extends from 30 to 250 mph in equivalent airspeed, at Mach numbers <0.7. Fan cruise pressure ratio is much lower, 1.02-1.10 relative to high-speed jet engines for high net installed efficiency, especially in climbs and lower altitude, lower speed cruise operations. Inlet and exhaust areas are selected to avoid separation and distortion over this range of mass flow conditions; and Variable pitch fan disk and blades 601 to enable high efficiency over the targeted speed range.

In some embodiments, the eFan design consists of:

A fan disk with a plurality of fan blades (6-20 blades), and a disk solidity in excess of 60%;

Fan blades designed for high efficiency at low pressure ratios and operation at 3000-4000 RPM. This entails an increasing aerodynamic loading with span, and corresponding increase in chord;

Fan tips may be a spherical cross section to allow variation of pitch within the matching duct wall contour while maintaining the small tip clearance required for high efficiency; and Fan blades designed for optimal efficiency over the targeted cruise speeds, extending to future maximum speeds and altitudes. Including design for static thrust, reverse thrust and regenerative braking via the variable pitch capability;

Fan blades are mechanically pitched over a wide range of angles. Fan pitch angle is measured such that 0° aligns the blade tip chord plane with the plane of rotation;

Fan blades are variable pitch with angle change at speeds >100°/sec;

At minimum, the variable pitch mechanism will accommodate the normal operating range between 15° for fine pitch on takeoff, up to 50° in high speed, low RPM cruise;

Maximum positive angle may be up to 80° for the "feathered" position of minimum drag, as blades are aligned with incoming flow; and Minimum angle may be up to −40° to enable reverse thrust while maintaining continuous motor and fan rotation.

As shown in FIG. 6, fan blades 601 are attached at the root 611 to a mechanical hub with a mechanism 610 for electromechanical variation of blade angle (pitch) from a negative angle providing reverse thrust for enhanced runway braking, to a fully streamlined angle for minimum drag in case of propulsor shut-down in flight. The entire mechanism rotates with the fan disk and electric drive motor. Blade pitch change signal is passed across the rotating boundary. A mechanism drives all of the blades simultaneously through a mechanical linkage. The design includes a no-back, directional brake to lock out feedback torque from the mechanism during periods of no pitch change.

The eFan may be installed in an aerodynamically contoured flow duct 603 to deliver the noise reduction and static thrust required for quiet STOL operations. In one embodiment, the duct axial length is 50-125% of diameter, with the fan located at 40-60% of duct length. The duct is supported by a plurality of stators 602 located behind the fan disk. The duct inlet lip contour 604 is of continuously variable radius designed for high efficiency in cruise, no separation at low speeds and high power, and reduced propagation of forward fan tones. The duct inlet lip contour 604 ahead of the fan promotes laminar flow while minimizing separation. The duct contour aft of fan is sufficiently gradual to avoid flow separation in the normal operating envelope. The duct exit area minimizes jet noise by expanding flow aft of fan, reducing flow to near free stream levels. The duct outer contour 603 is designed to maximize natural laminar flow for low drag. The duct internal cross-section may include a radial recess or other mechanism aligned with the fan to enable the small tip clearance required for high efficiency.

The inventive eFan 600 may be characterized by one or more of the following:
- It is designed for low-noise operation, with 15-25 EPNdB lower noise than conventional aircraft, as enabled by one or more of the following features:
  - Shorter blades in ducted fan relative to an equivalent thrust open propeller translate to quieter operation due to reduced tip speeds, target 500-600 fps, upper limit of 800 fps, and attenuation of radial noise components by the duct and duct insulation. In addition, blades are optimized for low noise including leading edge sweep angle, trailing edge shape, blade tip and root shapes, and blade tip to duct clearance shape with varying pitch;
  - Rotor-stator noise reduction via stator design and placement for low noise
  - The number of stators is optimized for noise and determined by number of fan blades and blade rpm to ensure primary, and secondary BPF fall below 2500 Hz. (BPF=blade passage frequency);
  - The stator spacing behind blades is optimized for noise reduction, 1.5 to 2.5 blade chords aft of the fan. The stator twist and platform is designed to remove flow swirl to reduce turbulent eddy noise;
  - Use of variable pitch blades reduces wake intensity, the main driver in rotor-stator noise, especially at take-off;
  - The duct is designed to attenuate noise, including optimized axial location of the fan in duct, design of duct lateral profile, inlet lip contour and exit profile to minimize propagation of fan tones, acoustic treatments of critical areas of the duct inlet, central fairing, and outlet; and
  - The duct may be used as a variable drag air brake, replacing conventional spoilers which are a significant source of airframe noise;
- It is designed for energy recovery and aircraft speed control via regenerative braking to improve overall efficiency, and to eliminate the need for a typically noisy air brake mechanism. Regeneration, and hence airspeed control, is fully variable, and is enabled by adjustment of variable pitch propellers and the electrical load applied to the motors. A pilot may request % regenerative braking using the standard power lever angle, moving into a guarded range below standard flight idle. The POCS system delivers % regenerative braking by controlling propeller blade pitch angles and motor regenerative power output to deliver target levels of aerodynamic drag measured via motor power output;
- It is designed for reverse thrust for reduced stopping distances, especially on surfaces with reduced braking action, and also for ground operations requiring reverse (e.g., standard gate "push-back"), reducing need for airport operations infrastructure. Reverse thrust may be enabled though a variable pitch fan with the blades pitched to a negative angle, or may be enabled by reversing the motor direction of rotation. Reversed rotation is a capability unique to the electric fan, not available with a conventional aircraft engine without complicated gearing;
- It is designed for aircraft supplemental or primary control. The high constant torque, millisecond fast motor response, and high speed fan pitch rate response enable the ducted fan to quickly change thrust output. This differential or vectored thrust produces moments around the aircraft center of gravity which may be utilized to provide primary or supplemental aircraft control. In case of primary control failure, control system may be reconfigured to utilize thrust moments to restore some degree of lost control authority:
  - Differential thrust. In one implementation, the thrust from one or more propulsors may be varied to provide a moment around the center of gravity. Depending on motor location, and number of propulsors, this may produce a pitch or yawing moment;
  - Vectored thrust. In a more active implementation, thrust from one or more propulsors may be vectored through use of exhaust louvers, propulsor gimbals, or other means to produce a pitch, yaw, or rolling moment;
- Ducted fan may be designed for lift augmentation either directly, in which thrust from one or more propulsors is vectored through louvers, gimbaled mounting or other means in order to generate a thrust vector which directly offsets aircraft weight (i.e. lift), or indirectly, by channeling exhaust flow over aerodynamic surfaces to produce suction (lift), and/or flow deflection (e.g., Coanda surfaces such as a "blown flap");
- It is designed for integrated cooling. Electric motors and the related controller-inverter electronics produce a significant amount of waste heat. It is highly desirable that heat rejection be accomplished with minimal added weight and drag. This may be implemented directly into the ducted fan design in the following manner;
  - Heat exchanger surfaces may be incorporated into the stators, and/or the inner, aft surface of the duct. In this way, there is no additional radiator and no additional surface area for drag, especially important since heat flow varies directly with power output, and may drop to zero in flight during descent, at which time cooling penalty is desired to be negligible;
  - Motor heat may be rejected to a heat exchanger in the leading edge of the nacelle to prevent ice buildup when flying in freezing precipitation; substantially more energy efficient than providing power to an electro-thermal hot leading edge;
- Note that the eFan design is a fault-tolerant architecture, as exemplified by the following features:
  - The assembly is designed to ensure continued safe operation with graceful degradation of thrust in the event of a fault in any one motor system (including motor inverter, controller, power bus etc.), as enabled by POCS (element 1042 of FIG. 10 and/or element 1160 of FIG. 11). Hardware designed to support graceful thrust degradation, including multiple electric motors may power a single shaft, electrical isolation ensures that a fault in one does not affect safe operation of the other(s), and individual motors may be designed for peak performance 60-80% above continuous for recovery periods of 5-10 minutes, so that surviving motors are able to power up to partially or fully accommodate faults elsewhere. This may include designing the motor for higher power ratings and introducing mechanisms for aggressive cooling of hot spots, so that extended peaking does not damage the motor. In the event of a loss of motor power due to a motor fault, the POCS alerts the pilot and redistributes power to the healthy units to preserve thrust for sufficient time durations to allow the pilot to manoeuvre to safety (element 1144 of FIG. 11);

In case of the total failure of a propulsor, including failure due to physical damage, blades may automatically be set to "pinwheel" (blades continue to rotate, but no energy extracted from the flow for minimum drag), or pitched to a fully streamlined angle ("feathered") and the motor then braked to prevent any rotation. Failure or potential failure may be detected through monitoring of the motor power output vs. commanded output, and by monitoring vibration at the motor to detect mechanical damage/failure; and Fault tolerance in event of communications or sensor failures may be achieved via redundant systems. Standard connection of the motor and variable pitch controllers to POCS is supplemented by back-up wiring, including capability for direct access to the controllers without POCS intervention. Similarly, motor and pitch sensors are supplemented by back-up sensors or a sensor-less control capability. The sensor fault detection capability within POCS switches across these as required.

Returning to FIG. 6, the table below provides a description of the primary elements of the eFan illustrated in the figure, and also note the difference in construction, materials, and requirements between the inventive eFan and conventional fans/propulsers.

| FIG. | Description | Required operational characteristics | Difference from conventional |
|---|---|---|---|
| 601 | Low pressure, variable pitch fan with 6-20 blades, a disk solidity of >60%, and pressure ratio of 1.02 to 1.10 | Fan blade pitch range from 15 to 50 degrees (normal operations), up to 80 degrees (feather), and −40 degrees (reverse thrust), cruise efficiency >95%, cruise pressure ratio <1.10 | Conventional turbofan blades are fixed pitch, high pressure ratio (1.4 to 1.8) and disk solidity >1 |
| 602 | Stators aft of the fan remove the swirl from the flow, reducing turbulence losses, and support the duct allowing a very small fan tip clearance. Stators may also function as a radiator with embedded cooling fluid coils. | Low noise operation; fundamental blade passage frequency <2500 Hz, External noise <70 EPNdB at 500 ft sideline takeoff measurement. | Fan: stator noise interaction is significantly different (and less dominant) with conventional high pressure fan |
| 603 | Ducted fan nacelle which minimizes external and internal drag. Nacelle length optimized to meet requirements in performance, noise attenuation, weight, and drag, and may range from 50% to 125% of diameter | Outer surface designed for minimum aerodynamic drag, with up to 50% laminar flow, at Mach numbers <0.7 Internal contour to minimize drag, attenuate fan tonal noise, and maximize thrust generation efficiency. Internal contour may preserve free stream velocity or allow flow acceleration. | Conventional jet nacelles provide a substantially different flow contours, both internal and external |
| 604 | Nacelle leading edge | Leading edge radius sufficient to prevent separation at high power, low speed operations (high static thrust) while providing low drag in cruise, including pressure gradients favorable to natural laminar flow. Leading edge thermally heated for ice protection. | Conventional turbofan nacelles compromise static thrust for cruise at high Mach number. Ice protection uses hot bleed air from the high pressure turbine. |
| 610 | One or more electric motors | Energy density >5 kW/kg continuous rating, with peak power at <4000 rpm | n/a |
| 611 | Variable pitch hub | Fast (>100 deg/sec) simultaneous adjustment of blade pitch angle from extreme negative to extreme positive. | Conventional turbofans are fixed pitch. |

Figure 7:
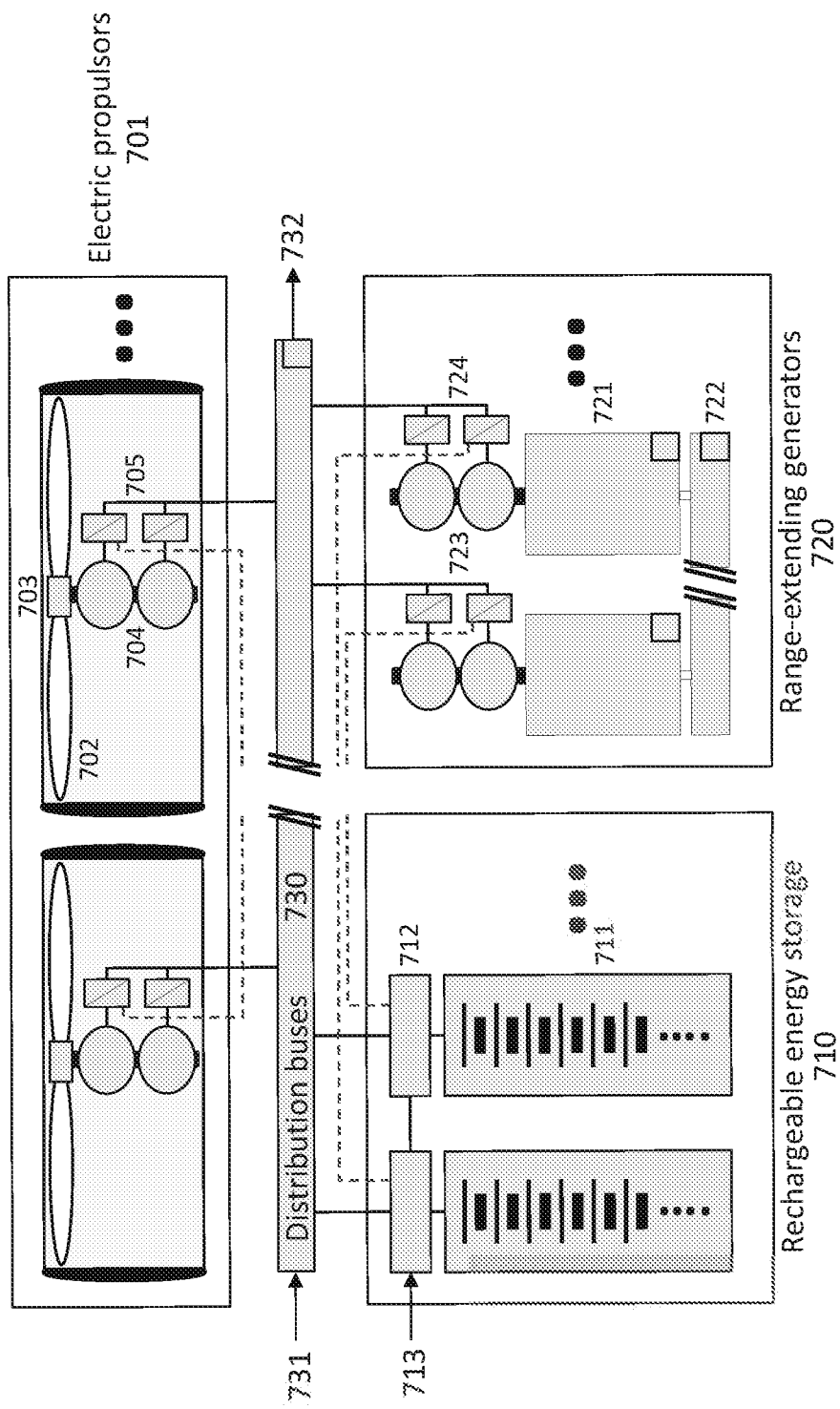
FIG. 7 is a diagram illustrating a powertrain 700 and its associated elements that may be used in an embodiment of an electric-hybrid aircraft used as part of the inventive air transportation system.

FIG. 7 is a diagram illustrating a powertrain 700 and its associated elements that may be used in an embodiment of an electric-hybrid aircraft used as part of the inventive air transportation system. As shown in the figure, in one embodiment the powertrain 700 and associated elements may include or be characterized by one or more of the following features, elements, processes, or aspects:

A series hybrid-electric powertrain delivering power via one or more electric motors, combining batteries (or other method(s) for storing electrical energy) with a chemical fuel based engine and generator combination as an optional range extender. The engine could be piston, turbine or other form of heat engine to convert stored chemical energy to electricity. The powertrain also delivers power to other electric sub-systems of the aircraft which could include the flight control system with electric actuators, electrically actuated landing gear, environmental control systems, taxi motors, anti-ice, fuel pumps, and lighting;

The powertrain comprises a set of modules, e.g., battery packs, engine, generator, power inverters DC/DC converters, fuel system, electric motors, etc. integrated via a powertrain platform comprising power and control circuits. Each module is connected via a control circuit to the powertrain optimization and control system (POCS). Module controllers are queried or directed by the POCS platform, and transmit a range of state and performance information to POCS on-demand or continuously. POCS to module controller communication is enabled by APIs, defining protocols by which POCS and modules communicate;

The operation of the powertrain is controlled by POCS based on pilot direction, in semi-automated or fully-automated mode(s). To enable this, individual powertrain modules are equipped with controllers that communicate with POCS across the module interface via APIs, on-demand and/or periodically. Key metrics communicated to POCS may include the following: on-off, RPM, power, status for each motor; battery capacity, power, status for each battery pack; fuel level and flow rate; engine on-off, power, status; and status for each converter. Key control directives received from POCS include the following: on-off, RPM and torque for each motor; power for each battery pack; on-off and power for the engine; and The powertrain is "plug-in" and designed to recharge stored electrical energy via ground-based charging stations. Limited recharging in flight may also be enabled: by the engine during low power operations; and/or by means of regenerative braking of wind-milling propulsors during descent and of landing gear following touchdown. As noted, energy storage units may be contained in multiple modules, installed internal or external to the aircraft, for example in the wings, with an optional quick release mechanism to enable fast swap or jettisoning. Included onboard are charging and cooling mechanisms that connect to the mains or fast charge station for low or high-rate recharge in-situ.

Referring to FIG. 7, the powertrain 700 includes one or more electric propulsors 701, one or multiple distribution buses 730, one or more rechargeable energy storage units 710 and if desired, one or more optional range-extending generators 720. The powertrain 700 may also include element 731 to power the distribution buses 730 from an external source, element 713 to charge the rechargeable storage units 710 from an external source, and element 732 to distribute power to other electric systems of the aircraft. Note that elements 713, 731, and 732 may take any suitable form, such as (but not limited to) an electrical interface, a cable, a coupling, or a controller. Whatever its form, element 732 typically includes one or more DC-to-DC converters to convert power to the lower voltage levels typically required by the other electric systems, e.g., environmental control systems, fuel pumps, anti-icing, lighting, as well as back-up/fail-safe distribution for vital systems, e.g., flight controls and avionics.

Powertrain 700 is a plug-in series hybrid designed to power the electric propulsors 701 with energy drawn optimally from the rechargeable energy storage 710 and the range-extending generators 720. Given the typically lower total cost of energy from rechargeable energy storage 710, power is drawn from the range-extending generators 720 only if stored energy is insufficient to complete the flight, or if maneuvering requires power beyond that available from the rechargeable storage 710. The total cost of energy from the rechargeable energy storage units equals the cost of the energy used to charge the units, the efficiency of charge and discharge of the units, and the cost of the units amortized over their usable life, defined as number of charge-discharge cycles before performance degrades below a threshold. Cost effective battery packs, for instance, can be charged using low-cost electricity from the grid, and offer very high efficiency charges and discharges, with a usable life of >1,000 cycles.

Electric propulsors 701 are either ducted fans as shown (such as those described with reference to FIG. 6), or open propellers. The propulsors are designed for operation in multiple modes through the variable pitch mechanism 703 shown, or by other means such as an adjustable exhaust plug. The operational modes enabled could include take-off, cruise, regenerative braking, feathering, reverse thrust, for example. Fan 702 is mechanically coupled to one or more electric motors 704, with a mechanism or process to isolate individual motors to enable continued operation in the event of mechanical or electrical faults. In normal operation, fan 703 is driven by electric motors 704, which receive electric energy from the distribution bus 730 via the motor controller and DC-AC inverter-rectifier 705. In regenerative breaking, on the other hand, fan 703 drives the electric motors 704 to generate electric energy that is delivered to the distribution bus 730 via the DC-AC inverter-rectifier 705.

Rechargeable energy storage units 710 are comprised of battery packs 711 shown, supercapacitors, or other media for storing electrical energy (or a combination thereof), coupled with a battery management system(s) 712 that manages operation and safety of the packs. Each pack may comprise of multiple individually removable battery modules, and operate either with some or all of these modules in place. Storage units 711 are charged primarily by external sources via 713, but also enable limited charging in flight, by the electric propulsors 701 during regenerative braking, or by the range-extending generators 720 during low-power flights. The rechargeable storage units 710 deliver power to the distribution buses 730 when discharging, or receive power from the distribution buses 730 or external source 713 when recharging.

Storage units 711 are equipped for fast charge in-situ via external sources 713, and also equipped for fast swap with quick release mechanisms. These enable a manual or automated swap of on-board storage units with pre-charged replacements positioned on the ground.

The optional range-extending generators 720 may be comprised of internal combustion engines 721, each driving one or more generators 723. Alternately, these could be comprised of units that convert stored chemical energy directly to electricity, e.g., hydrogen fuel cells. The internal combustion engine 721 may be a conventional one, using one of a range of fuels, e.g., diesel, gasoline, jet-A, for initiating and sustaining combustion in one or more combustion chambers. The fuel is stored in one or more fuel tanks 722, and pumped to the generators as needed. The engine 721 is mechanically connected to the generators 723, typically with a mechanism or process for isolating individual generators in the event of a fault. When operating, engine 721 drives the generators 723 to deliver electric energy to the distribution bus 730 via AC-DC rectifiers or inverters acting as active rectifiers 724.

Figure 8:
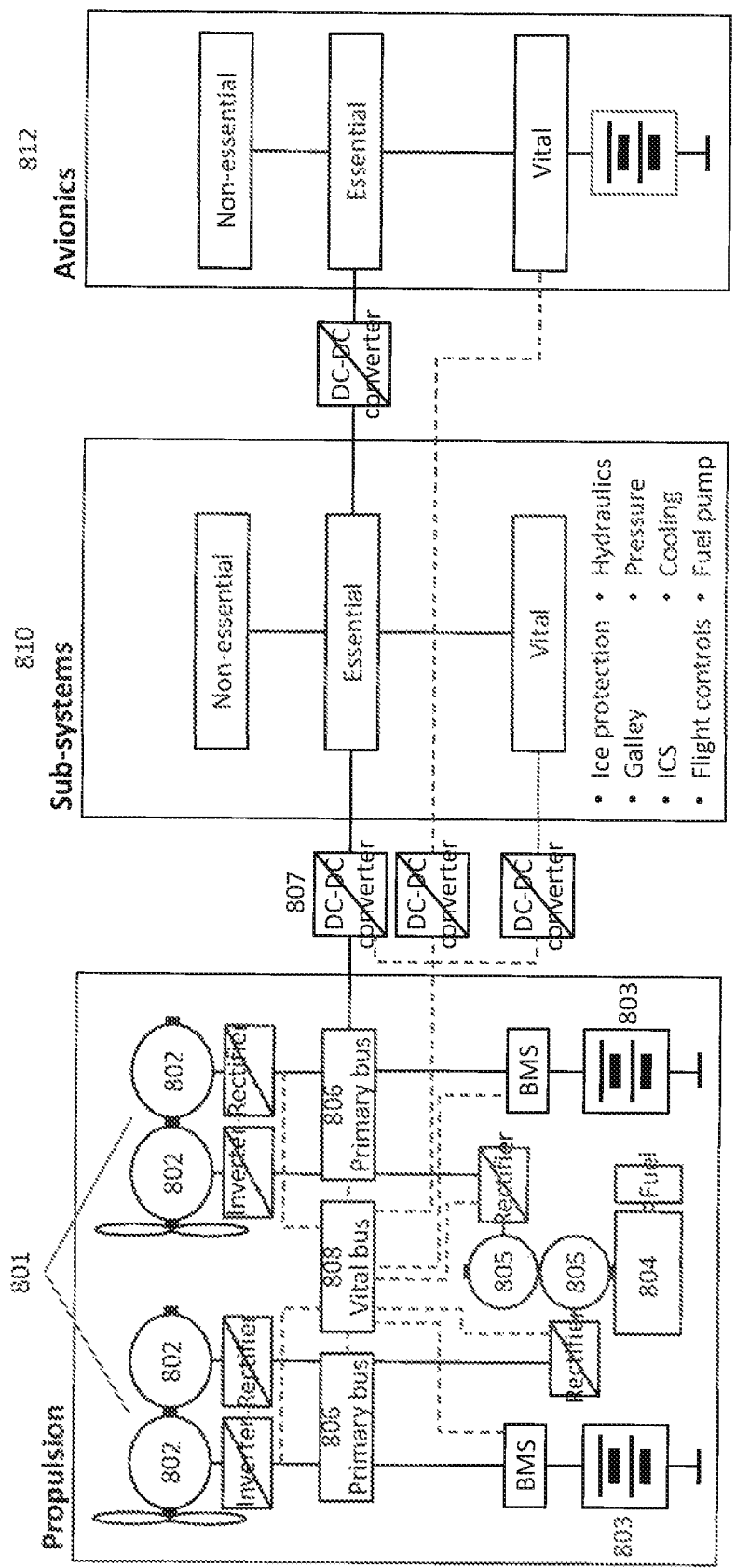
FIG. 8 is a schematic of a series hybrid drive configuration 800 for a representative aircraft that may be used in implementing an embodiment of the inventive transportation system.

FIG. 8 is a schematic of a series hybrid drive configuration 800 for a representative aircraft that may be used in implementing an embodiment of the inventive transportation system. Note the following features, elements, processes, or aspects:

- The powertrain includes two electric propulsors 801, each powered by two electric motors 802, two battery packs as rechargeable storage units 803, and a single range-extending generator. In this example, the generator couples a single internal combustion engine 804 coupled with two motor generators 805;
- In some embodiments the electric motors 802 are >90% efficiency brushless, electronically controlled axial-flux drive motors, with specific power density >5 kW/kg at continuous output power, and peak power output >50% above continuous output. In addition, the motors may be designed for low RPMs, e.g., <4,000 to enable direct drive. The motor generators 805 are of the same architecture as the drive motors, able to operate at peak for a recovery period, e.g., failure of a battery pack. Each motor 802 and generator 805 is coupled to a solid state convertor-controller (such as a rectifier), to provide precise motor control with minimal loss and to protect the motors from voltage fluctuations;
- In one embodiment, the internal combustion engine 804 is a turbo-diesel piston engine, tuned to operate with maximum efficiency at a fixed RPM that may align with the design RPM of the electric motors to enable direct drive. The turbo-charging allows the engine to deliver relatively uniform power from sea level up to 10,000 ft;
- Power is delivered to each of the propulsors 801 by one of two primary buses 806, each of which is powered by one of the two battery packs 803, and one of the two motor generators 805. The primary buses 806 also distribute power to the non-propulsion sub-systems of the aircraft 810, via step-down DC-DC convertors 807;
- A third vital bus 808 re-routes power to accommodate failures of any of the electric motors, distribution buses, battery packs or generator. In the event of failure of an electric motor 802, the vital bus 808 re-routes power to the surviving motors, enabling the pilot to request peak thrust for recovery maneuvers. In event of failure of a primary bus 806, the vital bus 808 engages to fully replace the lost functionality. In event of failure of a battery pack 803 or generator 805, the vital bus 808 re-routes power from surviving sources to maintain balanced output from the electric motors; and
- The vital bus 808 also re-routes power to the non-propulsion sub-systems 810 and avionics 812 in the event of failure of a primary bus 806 or one of the step-down DC-DC convertors 807.
- 810 and 812 shown are representative of standard circuits used to power non-propulsion sub-systems and avionics onboard an aircraft. The former includes systems such as Ice protection, the Fuel pump, Pressurization, Cooling, Flight controls, and operates at an intermediate voltage, e.g., 270V. The latter operates at a low voltage, e.g., 28V, and includes the most critical avionics systems on an aircraft. As shown, these circuits typically include redundant paths and additional power sources for fault tolerance in the event of failures.

As described with reference to FIG. 5, the inventive transportation system includes an aircraft design optimized for maximum transport efficiency over regional ranges, in particular, the innovative range-optimized hybrid-electric powertrain. In some embodiments, this design goal contributes to the following features, which collectively enable a 65-80% lower DOC over targeted regional ranges than conventional aircraft:

- A powertrain sized for maximum transport efficiency over regional ranges <1,000 miles, designed via a 3-level or 3-tier objective:
  - (A) Highest efficiency (80+% lower DOC than conventional aircraft) and optimal speed over electric-only range;
  - (B) Intermediate efficiency (60-70% lower DOC than conventional aircraft) and optimal speed over larger hybrid range; and
  - (C) Good efficiency (30-60% lower DOC than conventional aircraft) and lower speeds beyond to maximum range determined by onboard stored energy and fuel less safety reserves;
- A powertrain sized for speeds and altitudes that are optimal for regional sub-range (B), determined by minimizing an objective function, for example "DOC+I+COT" for flights over the sub-range (may also be optimized for lower speeds over the regional sub-range (C) based on the relative frequency of travel over range (C) versus ranges (A) and (B)). This leads to design for slower speeds, lower altitudes and shorter ranges than that of conventional jet aircraft;
- A rechargeable energy storage and range-extending generator combination, sized based on speed and range requirements (A), (B) and (C). Stored energy-first design, whereby rechargeable energy storage is fully depleted for flights in ranges (B) and (C) with required reserve maintained as fuel for the optional range-extending generators, or less required reserve if no range-extending generators are on board. Rechargeable energy storage and range-extending generators sized to enable optimal speeds over hybrid range (B), and rechargeable energy storage sized to enable optimal speeds over electric-only range (A). Range-extending generators sized to enable lower-speed cruise over range (C), and therefore downsized to under 70% of maximum continuous powertrain output (much lower than conventional aircraft) for improved efficiency; and
- Optimized energy storage mass, 12-20% of the aircraft weight, and downsized range-extending generator, with very low power output, typically less than 70% of maximum continuous output of powertrain (lower than a conventional aircraft).

Note that a design process for an embodiment of the inventive range-optimized aircraft and powertrain is described herein, including a process by which the noted 3-tier set of speed and range requirements is used to size elements of the hybrid-electric powertrain. The described designs for the inventive aircraft and associated elements are forward compatible to support anticipated upgrades of operating capabilities or key powertrain modules over the life of the airframe. Given the rapid evolution of EV technologies, this feature ensures that the powertrain remains competitive over time as individual module technologies improve, e.g., batteries, supercapacitors, electric motors, internal combustion engines, fuel cells. In addition, this feature enables the aircraft to transition smoothly from hybrid-electric to all-electric once energy storage technologies improve to the point where range-extending generators are no longer required.

To provide forward compatibility, the powertrain is designed by sizing the energy storage units and generator combination for the speed and range requirements (A), (B) and (C) mentioned, based on technologies available at aircraft launch and forecast to be available over the 15 year period beyond (including planning for transition from hybrid-electric to all-electric). This leads to a forecast for onboard rechargeable storage and range-extending generators, and in turn, determines performance characteristics over time: speeds, electric and hybrid-ranges and operating costs; with electric-ranges increasing and operating costs decreasing as technologies improve.

Forward compatibility may require limiting the weight of the rechargeable energy storage units to 12-20% of the aircraft weight so that payload capacity is roughly uniform as EV technologies improve. Higher weight fractions would lead to designs that are larger and heavier than aircraft of similar payload in the initial years, with payload increasing over time. Lower fractions lead to suboptimal efficiencies given much higher use of range-extending generators.

To achieve forward compatibility, the powertrain platform is designed to support module technologies over the design life of the airframe (typically 15-20 years). This can be realized by designing the platform based on powertrain operation with future modules where appropriate, and ensuring upgrades required to accommodate future technologies are relatively simple and cost effective. For instance, wiring to the electric motors may be rated up to 30% higher peak power, to support more powerful motors and higher aircraft speeds in the future. Wiring of the platform may be designed to allow upsizing and redistribution of the rechargeable storage units, downsizing or removal of the range-extending generators. Wiring from the energy storage units may be designed to support higher capacity packs in the future, and space used for the range-extending generators may be wired for use with rechargeable storage units when the generators are removed. In addition, modules and elements of the powertrain e.g., wiring, harnesses, switches, converters, that will likely require upgrade are designed and positioned for simple replacement and easy access.

The powertrain platform and the powertrain optimization and control system (POCS, described with reference to FIGS. 9-11 and the example powertrain configurations illustrated in FIG. 7-8) are designed to enable a staged transition of the powertrain from hybrid to all-electric as storage technologies improve. This includes design for operation with or without the optional range-extending generators, fuel or rechargeable storage based reserves, and a platform designed to allow the swap of generators with storage units over time. In addition, the powertrain may be characterized by the following:

Modularity—a set of swappable nearly "plug and play" capable modules connected by a hardware and software platform. This enables the powertrain to accommodate rapidly improving technologies via relatively simple upgrades of the modules. Powertrain modules may include the rechargeable storage units, range-extending generators and electric motors. The powertrain platform includes the powertrain optimization and control system (POCS), electrical wiring, distribution buses, convertors, fuel system, sensors, cooling, shielding, and any additional processes or structure that operate to enable the modules to cooperate to form the powertrain;

Modularity is facilitated by design of the powertrain platform and the interfaces that connect the modules to the platform to be compatible with the range of module technologies that are likely to be available over the life of the airframe (as mentioned previously). This enables compatible modules to be plugged into the powertrain by connecting the module to the interfaces, comprised of electrical and control circuits, and services such as cooling, shielding, fuel, and structure. For instance, range-extending generators plug-in to the platform via electrical connectors to the generator rectifiers, via POCS connectors to the generator controllers, the internal combustion engine controller and the fuel system controller, and via fuel and cooling services to the generators and engine. In areas where upgrades may be required to accommodate a new module, the powertrain is designed to enable relatively simple and cost-effective modification;

Individual module controllers are connected to the powertrain optimization and control system (POCS) to orchestrate operation of the powertrain. Module controllers are queried or directed by the POCS platform, and transmit a range of state and performance information/data to POCS on-demand or continuously. POCS to module controller communication is enabled by APIs, defining protocols by which POCS and modules communicate. The operation of the powertrain is controlled by the POCS based on pilot direction, in semi-automated or fully-automated modes. To enable this, individual powertrain modules are equipped with controllers that communicate with POCS across the module interface via APIs, on-demand and periodically. Key metrics communicated to POCS may include the following: on-off, RPM, power/status for each motor; battery capacity, power/status for each battery pack; fuel level and flow rate; and generator on-off, power/status. Key control directives received from POCS may include the following: on-off, RPM and torque for each motor; power for each battery pack; and on-off and power for the generator;

The powertrain is designed to support relatively simple module exchanges/swaps. The powertrain platform and interfaces to the platform, electrical, control, and services such as cooling, shielding, fuel, structure, are designed to accommodate a wide variety of modules. These include specification of corresponding wiring, control or monitoring and other service capabilities onboard each module to enable a type of "plug and play" pairing. For instance, in the case of battery packs, this would typically include peak and steady-state discharge rates, BMS protocols, socket descriptions. POCS also enables calibration of the powertrain following module changes. This may include FAA certification of the powertrain for use with a range of pre-approved compatible modules. Further, in some cases, the design of the powertrain may include the ability to support relatively simple or cost-effective modification in areas where new modules may require modification;

Powertrain variants may be implemented that have performance tailored to different markets; in some cases this may be done by altering the choice of powertrain modules, to offer different speeds, ranges and operating costs for an aircraft configuration. For example, an "economy" commuter powertrain might couple a highly efficient turbo-diesel range extender with moderate density batteries, offering best-in-class operating costs but long flight times for longer ranges. In contrast, a "performance" business powertrain might couple a less efficient but lighter turbo-shaft range extender with higher density batteries, offering best-in-class regional speeds but at modestly higher operating costs;

The powertrain operation may provide optimal efficiency over regional ranges via maximized use of the rechargeable storage units; this may be implemented by targeting full depletion during a flight (or lower if within electric range (A)), with range-extending generators switched on only if the available stored energy is insufficient to complete the flight. This translates to ultra-efficient stored energy flights within the electric-only range (A), and very efficient hybrid flights over the longer hybrid range (B) or total range (C);

Safety reserves are maintained across the rechargeable storage units and the range-extending generators to maximize use of the rechargeable storage units. For example, if the power output of the onboard range-extending generators enables safe maneuvering of the aircraft, then reserves are maintained as fuel for the generators sufficient for operation for a length of time determined by regulation or by other means. If range-extending generators do not enable safe maneuvering of the aircraft, then the fuel reserves are supplemented by stored energy equivalent to that required to enable maneuvering over the target length of time;

The powertrain is "plug-in" and the rechargeable storage units are designed to be replenished by ground-based charging stations. This is enabled by an onboard charging platform for connecting to the mains or to a fast charge station for low or high-rate recharge in-situ. Also included are fast swap capabilities for the rechargeable storage units via release mechanisms to enable quick replacement of depleted units with charged ones;

Each rechargeable storage unit may be comprised of multiple individually swappable modules. This enables increased efficiency on low payload flights by loading additional modules to extend the electric-only range. Or unloading some modules to increase payload capacity, but at loss of electric-only range. In case of batteries, this is enabled by design of cell modules that plug into bays within a battery pack. Each module may contain one or many cells with wiring, sensors and controllers, along with first-level cooling, structural support and fire protection features. Easy installation is enabled by connectors to the battery pack power, sensor, control and cooling circuits, and by quick release mechanisms; and The powertrain design provides energy recovery via regenerative braking of the propulsors. To enable this, propulsors are equipped for varying degrees of air braking through use of a variable pitch propeller or another mechanism, e.g., adjustable exhaust plug. As a result, the rechargeable energy storage receives energy from electric motors operating as a generator when air braking is engaged. The powertrain is also designed for selective charging by the range-extending generator during low power operations. In this mode, some or all of the electrical energy generated by the range-extending generator is directed to the rechargeable energy storage units.

The inventive powertrain designs and configurations are architected to permit graceful degradation, for safety and fault tolerance exceeding stringent aviation requirements (FAA and EASA). This includes ability to tolerate failures in power sources (energy storage units, generators), motors (propulsion, generator), convertors (inverters, rectifiers, DC-DC convertors), distribution (buses. wiring), controls (sensors, communication), as well as safety in event of moderate or severe impact on the system.

To achieve this, the powertrain is designed for graceful degradation, whereby failure in any area has no more than a fractional impact on the performance of the powertrain, allowing near normal flight to a nearby airport for repair. At least three unique aspects of the inventive hybrid powertrain enable this, with only a modest cost or weight penalty:

Multiple power sources on-board create a simple path to graceful degradation, by the sizing of sources so the aircraft is able to fly on only a subset of these;

The ability to design the powertrain with multiple fractional components, each with high peak-to-continuous performance, limits the impact of failures to less than an equivalent fraction of the function. Electric components, e.g., motors, converters, distribution buses, wiring, switches, allow this with only modest cost or weight penalties, unlike mechanical or hydraulic components. Many of these also come with have high peak to continuous performance capabilities (often heat limited) so that surviving components can compensate to some degree for failures in others during recovery periods; and High-speed solid-state sensors and connectors enable detection and remediation of failures within milliseconds in contrast to microseconds for traditional contactors or even seconds for mechanical devices. As a result, embodiments of the inventive hybrid powertrain are uniquely able to engage redundant components and redistribute power to surviving components, on a timescale comparable to the physical.

In some embodiments, a design for graceful degradation includes sizing the power sources, rechargeable energy storage units and range-extending generators so that the aircraft can maneuver safely in the event of a failure of one or multiple of these elements. For example, the aircraft may be designed to fly on the rechargeable storage units or range-extending generators alone, for tolerance to failure in any one. Moreover, a multiplicity of storage units or generators may be used for further safety to reduce the likelihood of a complete loss of the source. This design of power sources is combined with distribution elements (e.g., buses, switches, and wiring) architected to re-route power in the event of a fault (as illustrated in FIG. 8), so propulsors receive equitable distribution from the surviving sources. This re-routing is managed by the powertrain optimization and control system (POCS). Failures of the storage units or generators are detected by a fault-detection and recovery module of POCS, which then redistributes power optimally to maintain safe flight. In addition, POCS also ensures storage units and the fuel system retain sufficient reserves to independently meet safety requirements.

A design for graceful degradation may also include use of multiple fractional components, propulsors, generators, motors and storage units, for fault tolerance against failure in any one. This may include powering the powertrain with more than one propulsor or generator, and powering each with more than one motor, so failure in any one component does not equate to loss of the entire capability. Individual motors may be designed for peak performance 60-80% above continuous for recovery periods of 5-10 minutes, so surviving motors are able to power up to compensate for motor faults in others. This peak output capability is combined with distribution (buses, switches, wiring) architected to re-route power to surviving motors to enable them to peak safely. Failures of propulsors, generators, motors or storage units are detected by the Fault-detection and recovery module of POCS, which then redistributes power optimally to maintain safe flight.

A design for graceful degradation may also include architecting the distribution elements (e.g., buses, switches, wiring, fault isolating components) with redundancy so that the powertrain is resistant to faults in individual circuits. This may include use of multiple buses, each feeding one or more propulsors, along with back-up buses so that the impact of a bus fault is limited to a subset of the propulsors, and so that power to the impacted propulsors can be re-routed via a redundant bus. This bus architecture is combined with wiring and switches so that power from the sources is distributed equitably to primary and back-up buses, and so that power to propulsors can be routed via the primary or back-up bus. This may also include fault tolerant schemes for converters, e.g., redundant converters, or redundant phase legs, with fault isolation, so functionality of a faulty converter is largely recovered. Failures of the distribution system are detected by the Fault-detection and recovery module of POCS, which then redistributes power optimally to maintain safe flight.

A design for graceful degradation may also include design of the powertrain control system (POCS) so that it is able to operate safely in the event of a failure of one or more sensors. This may include sensor fault detection capability in the fault-detection and recovery module within POCS, and back-up sensors or sensor-less (sensor independent) monitoring to cover critical sensor failure modes. For instance, propulsor motor fault tolerant control is managed by the fault-detection and recovery module within POCS that monitors flight conditions to detect and diagnose issues, and then redistributes power to the healthy motors in an optimal way to restore sufficient flight capabilities.

Also included in the inventive design(s) are procedures for safety in the event of a crash. For example, the fault-detection and recovery module within POCS triggers the emergency isolation of high-voltage circuits, e.g., storage units, generators, convertors, on pilot request or when significant impact is detected. Note that the graceful degradation measures mentioned are coupled with the distribution architecture to reroute power with a minimal impact on performance in the event of a failure. For example, FIG. 8 shows the architecture for a representative twin propulsor aircraft with two rechargeable storage units and a single range-extending generator, implemented using a redundant vital bus.

FIG. 9 is a diagram illustrating an example user interface 900 for use by a pilot of an embodiment of the inventive aircraft. The figure shows various operational and status indicators and may be used in an embodiment of an electric-hybrid aircraft that is part of the inventive air transportation system. In one embodiment, the displays are digital and represent performance parameters in the same or a similar format to those of a conventional aircraft for ease of use. The figure illustrates an example of the pilot interface in the "Inflight optimization and control" mode of operation and contains the following indicators and information:

Color coding is chosen to be industry typical to ease pilot transition. Items in green or white are labels; items in magenta are active indications of system status. Triangle "bugs" show either a current indication, or a labeled target indication. Color coding uses standard green/yellow/red for normal/caution/danger operating zones;

Power indicators (upper left) show the current propulsor power output both in RPM and % maximum power, as commanded by the power lever. These are very similar to conventional gas turbine power output indicators;

Speed tape showing current vs. target airspeed (upper right) utilizes an industry standard vertical airspeed indicator in units of knots indicated airspeed, KIAS. Specific to this innovation, shows "speed bugs" at the calculated speeds to fly for one or more flight modes; in this example, showing "High" at 213 KIAS, "Optimal" at 196 KIAS and ECON is indicated without a bug to show that it's below the current range of the speed tape;

The second row of indicators shows battery, fuel, and power balance. Battery and fuel are shown with the industry typical indicators including color coding for normal, caution, and exhausted energy states. When coupled with an active flight plan through POCS, an "energy bug" is enabled which shows the expected energy state on landing (shown on both battery and fuel). The split pie-chart shows the balance of generation power to battery power; this is a unique indicator to hybrid-electric aircraft;

The lower quadrants show more detailed data on powertrain systems and is configured for the current powertrain components. The example shown here utilizes three discrete packs of batteries, coupled with a turbo-diesel reciprocating generation engine; pertinent information for each is displayed using typical indicator styles. These lower quadrants may display multiple system information pages, with the pilot able to scroll through the information. These displays are specific to the hybrid-electric powertrain implementation; and This cockpit interface to the hybrid-electric powertrain has multiple modes; in this example mode selection is through a three position knob on the bottom right. The "flight" mode is shown here; additional modes could be "Calibration", invoked each time a module changes, "Pre-flight" which would initiate and display status on the internal systems self checks flight, and "diagnostics" which could display more detailed information on all systems monitored and controlled, primarily used for system configuration, maintenance and repair.

In addition to the display shown 900 in the figure and the associated aircraft functions or systems, the underlying powertrain optimization and control system (POCS) platform may permit control of one or more specific powertrain capabilities, including but not limited to the rechargeable energy storage units (e.g., batteries, super-capacitors, and range-extending generators), internal combustion engines, or fuel cells. POCS offers a unified interface to the modules of the powertrain, to simplify installation, flight preparation, flight operation and diagnostics.

The capabilities of POCS are important to the early adoption of hybrid-electric aircraft, by optimizing operation for maximum efficiency over regional flights, via quick and safe remediation of faults, by reducing pilot workload and easing pilot transition to electric powertrain, and by simplifying module changes to alternatives or future technologies. Embodiments of the POCS may assist in the adoption of hybrid-electric aircraft based regional air transportation systems as a result of one or more of the following:

Enables range-optimized regional flights by optimizing sources of energy over a flight path. To maximize efficiency, energy sourcing should prioritize the lower cost source, typically the energy storage units, over the higher cost sources, typically the generators, over the course of a flight. For instance, flights over ranges longer than the electric-only range should deplete the lower cost energy storage units to a minimum permissible level determined by safety or battery life considerations. Moreover, sourcing should be charge blended, utilizing both storage units and generators optimally throughout the journey, while ensuring energy draw promotes safety and operating life. POCS enables this by determining an optimal Energy plan that minimizes the total cost of the flight (operator defined) within system constraints, based on the flight path and Flight mode, the departure and arrival Energy States and characteristics of the aircraft. This defines the Energy state of the hybrid powertrain along the path to the destination, e.g., percent state of charge of the battery packs, percent fuel capacity for the generators, and guides the real time flow of power from the storage units and generators. POCS enables further optimization by identifying opportunities to upsize the energy storage units on low payload flights that are longer than the electric-only range;

Optimally controls the real-time flow of power from the storage units and generators to achieve the targeted Energy plan. Although the Energy plan defines an overall sourcing strategy for the flight, this is inadequate for real-time control given need to accommodate unpredictable, varying flight environments. Further, there is need to direct each of the powertrain modules to deliver the requested power in an optimal way, e.g., generator operating on its optimal working curve. POCS enables this in two stages. First, by determining optimal sourcing for the power requested that aligns with the Energy plan, defining real-time power flows from the energy storage units and the generators. Second, settings of the powertrain modules are optimized to deliver the requested power with maximized efficiency, and these are used to direct the module controllers. For instance, the propulsion power requested is delivered via optimized settings for the propulsion motors (torque, RPM) and the propulsor (e.g., fan pitch angle, exhaust plug position). POCS also manages energy harvesting during the flight, for instance, via regenerative braking of the propulsors, or via the generators during low power operations;

Enables fault-tolerant control of the powertrain: assists the operator with preserving normal or gracefully degraded operation in the event of faults. The hybrid powertrain is designed for graceful degradation, whereby failure in any area has not more than a fractional impact on the performance of the powertrain. This is enabled by multiple power sources onboard, by design with multiple fractional components, by use of redundant components and circuitry, and by use of high-speed solid-state sensors and connectors for quick detection and remediation. POCS builds on this capability by enabling quick assisted response to faults for continued safe flight. This is done by continuous monitoring of the health of the powertrain by the Fault detection and identification function. A combination of signals and models are leveraged to identify and isolate faults as quickly and accurately as possible. If a fault occurs, POCS alerts the operator to trigger remedial response. POCS may also trigger a redesign of the Powertrain for graceful accommodation of the fault, and a redesign of the Controller to adjust to the potentially redesigned powertrain with fault. The redesign of the Powertrain and Controls may also be triggered by the operator. POCS also assists with ensuring safety in event of a crash, by isolating high-voltage circuits on pilot request, or when impact is detected;

Offers a simplified, unified interface to the hybrid powertrain, reducing pilot workload and easing pilot transition from conventional to hybrid aircraft. Key to quick adoption of hybrid propulsion is ensuring pilots can operate the more complex powertrain with minimal incremental training. POCS enables this via optimization and controls that shield the pilot from the added complexity of the powertrain, coupled with an interface that mimics those of conventional aircraft. In addition, POCS offers automation to streamline a range of pilot and maintenance activities, such as powertrain calibration, pre-flight preparations, inflight control, and powertrain diagnostics; and Streamlines installation of new modules to support forward compatibility and modularity. This key differentiation of hybrid powertrain is enabled by POCS in two ways. First, POCS offers standardized control and monitoring interfaces to a range of module alternatives, allowing a switchover of generators, upgrades to advanced technology energy storage units, or the addition or removal or storage modules to compensate for payload. Second, POCS enables simple calibration to new modules via upgrade of aircraft and powertrain models to match, operator input or from online library, coupled with targeted performance testing to fine-tune the model to the unit installed. Similar testing is also performed on a routine basis to ensure models maintain fidelity as modules age via use.

As will be described with reference to FIG. 10, POCS offers two interfaces to the operator, "integrated" and "modular". Integrated is a simplified user interface to the powertrain that mimics the controls of conventional aircraft, reducing pilot workload and easing transition from conventional to hybrid. Modular is a direct user interface to individual modules of the powertrain, enabling lower-level fine control of the operation of the powertrain. These are described in greater detail below:

Integrated. Unified front-end to all POCS capabilities, enabling the operator to toggle to appropriate operating mode: Calibration; Pre-flight; Inflight control; Diagnostics. Displays use performance parameters similar to that used in conventional aircraft to ease pilot transition to the new technologies and capabilities. An example of the pilot interface in the "Flight" mode is shown as display 900 in FIG. 9. The display is coupled with cockpit controls that are similar to those found in conventional aircraft today, and which translate operator input to optimal settings of the underlying hybrid powertrain based on the defined objective function for the flight, such as:

Power levers—one for each propulsor, controlling the power output of the propulsor. The Power lever angle (PLA) determines the power output of each propulsor as a percent of Full power, and enables limited duration surges to Peak power. The Inflight control module converts power requested by the Power levers to optimal settings of each propulsor in real-time, and sources this power optimally from onboard generators and stored energy units to meet the operator defined objectives for the flights, within constraints of the aircraft and powertrain. Some embodiments may also offer Fan or propeller control levers to control the RPM of each propulsor, ranging from Maximum to Minimum, with extension to Feathering. Some embodiments may allow controls of multiple propulsors to be synchronized, so all coupled propulsors operate with the same settings, or allow auto-throttle operation, whereby the Inflight control module directs the throttle based on the Flight path. In these situations, a servo motor or similar mechanism is used to move throttles based on the current power setting (standard FAA auto-throttle operation).

Regenerative braking controls—one for each propulsor, controlling the regenerating power output of the propulsor. This is done via dedicated Regenerative braking levers, or by extending the range of the Power levers to negative power levels, extending from zero power to full regenerative power. In both cases, the lever angle determines the regenerative power output of each propulsor as a percent of full regenerative power. The Inflight control module converts regenerative power requested by the levers to optimal settings of each propulsor in real-time.

Reverse power controls—one for each propulsor, controlling the reverse power output of the propulsor. This may be done via dedicated Reverse power levers, or by extending the range of the Power levers to negative power levels, extending from zero power to full reverse power. In both cases, the lever angle determines the reverse power output of each propulsor as a percent of full reverse power. The Inflight control module converts reverse power requested by the levers to optimal settings of each propulsor in real-time.

Lower-level controls—offered in some embodiments enable operators to control the Generators, Storage units and Power distribution manually. These could include Generator controls for switching generators on and off, control generator output from idling to peak power. Controls could also include a Power distribution control to redirect power flow from the onboard sources to the propulsor. In a twin propulsor aircraft with left-right propulsors and left-right sources, these could offer a choice of Split flows (left to left, right to right), Directional (Split plus right to left or left to right) and Coupled (left-right to left-right); and Modular. Offers a direct interface to individual modules of the powertrain via their onboard controllers. Intended for situations where there is need to bypass the flight optimization capabilities of POCS to engage the controllers directly, e.g., repair, emergencies, non-standard operations. The range of modules that may be accessible for a sample hybrid powertrain is shown in FIG. 10, and described in greater detail herein.

Figure 10:
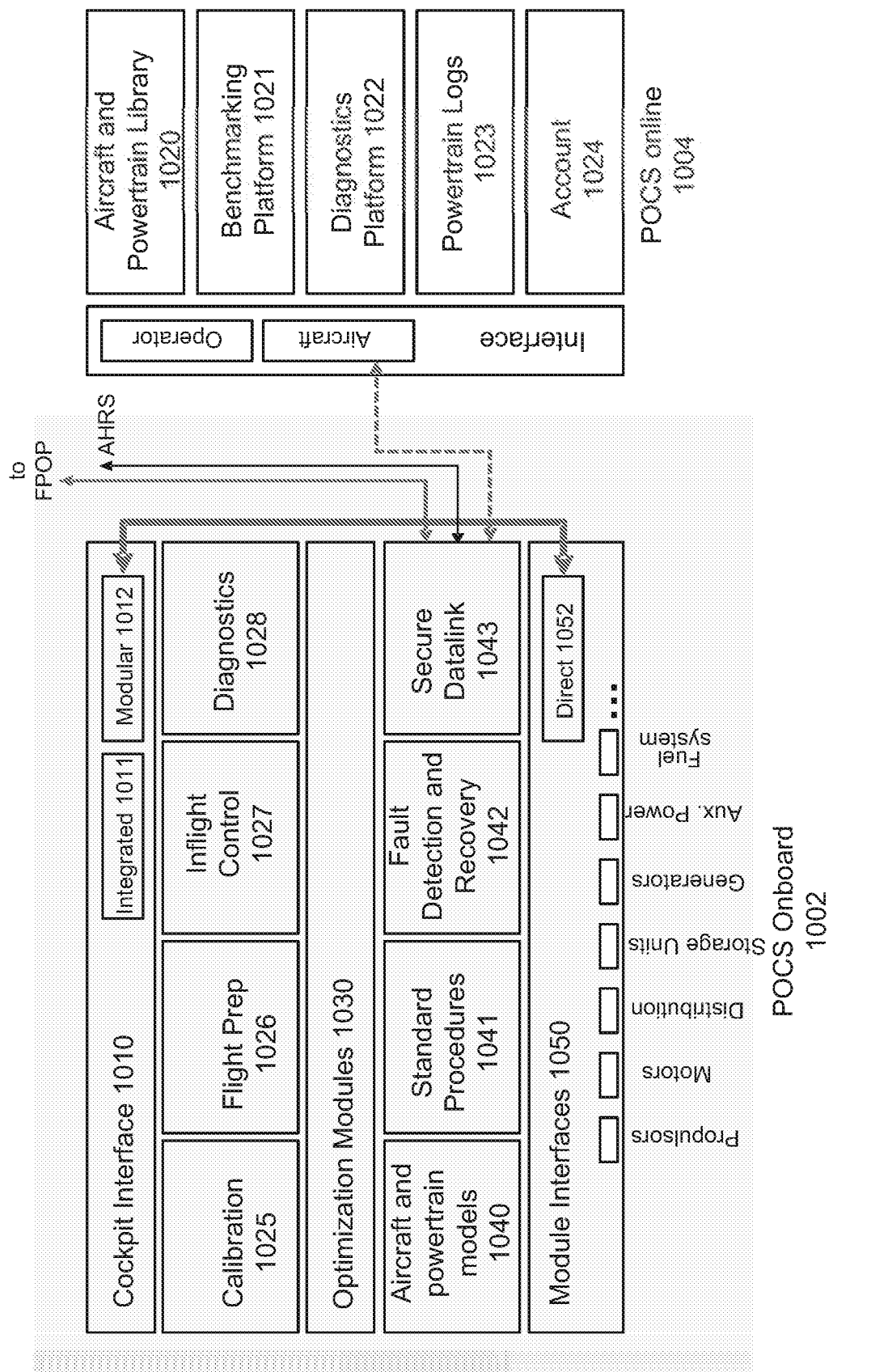
FIG. 10 is a diagram illustrating the primary functional elements or modules of a powertrain optimization and control system (POCS) that may be used in an embodiment of an electric-hybrid aircraft that may be used as part of the inventive air transportation system.

FIG. 10 is a diagram illustrating the primary functional elements or modules of a powertrain optimization and control system (POCS) that may be used in an embodiment of an electric-hybrid aircraft that may be used as part of the inventive air transportation system. Each or a combination of the functions, operations, or processes performed by or under the control of the elements or modules shown in the figure may be performed by the execution of a set of instructions by a properly programmed processing element (such as a controller, state system, microcontroller, CPU, microprocessor, etc.).

As shown in the figure, the elements or functional modules of an embodiment of a POCS platform 1000 may include an "onboard" component 1002 and an "online" component 1004. The onboard components, elements, and processes 1002 are typically resident on the aircraft being controlled, while the online components, elements, and processes 1004 are typically resident on a data processing platform or system that is located remotely from the aircraft (such as in a control center, centralized data processing and scheduling platform, etc.) and which communicates with the onboard component 1002 (when necessary) via a suitable communication channel or combination of communication channels (such as a wireless technology coupled to a server that may be communicated with via the Internet).

In an exemplary embodiment, the POCS platform 1000 functionality is enabled by the following onboard capabilities (components, elements, and processes 1002):

Standard procedures (element/component 1041), which is a library of preset and operator defined standard operating procedures for the powertrain and its modules, and may include:
Flight mode(s): For instance, Optimal, High speed, Economy, Custom;
Scans and diagnostics: For instance, Initialization scan, Energy scan, Pre-flight scan, Inflight scan, Post-flight scan;
Operating rules library: Defines operating priorities for the powertrain, required by safety or based on operator preference. These constrain the Hybrid energy planner and Hybrid power manager, and may include:
Minimum energy state to ensure adequate safety reserves, for instance, stored energy units at 20% of capacity, and generator fuel equivalent to 45 min of flight;
Energy state at arrival, for instance, to deplete stored energy units to minimum levels at 20% of capacity;
Power distribution priorities by flight leg. For instance, taxi on stored energy alone, or approach on stored energy alone, and with generator on idle for high availability; and
Power level settings by flight leg. For instance, climb at 80% full power, or for initial descent to be at neutral thrust.

Onboard logs. A database capturing information on key aspects of the powertrain and its performance. These include: operator details; onboard modules; operator preferences; lifecycle and maintenance records; performance logs; checks and diagnostics logs, access history logs. The database transmits logs to the Online log (element/component 1023) via the secure datalink (element/component 1043) periodically, and only stores limited history onboard.

Secure Datalink (element/component 1043). This enables periodic uploads from Onboard logs to the Online log(s) 1023 for the specific powertrain, remote diagnostics and maintenance of the powertrain, and accessing the aircraft and powertrain library (element/component 1020) for calibration or benchmarking purposes. The datalink may include 2-levels of security, a lower level for communicating log or library data, and a higher level for diagnostics and maintenance data. Access to the datalink is secure and all access history is logged. This also enables two-way data flow between POCS and FPOP/FMS for flight data.

Module interfaces (element/component 1050). These are connector interfaces to lower-level controllers of the range of modules onboard, enabling the controllers to be queried or directed by the POCS platform, and to transmit a range of state and performance information to POCS on-demand or continuously. Typically, API specifications define the protocols by which POCS and modules communicate. Control modules may include variable pitch fan controllers, propulsor motor controllers, battery management systems, engine controllers, fuel system controllers, generator motor controllers, distribution controllers (switches, connectors, and convertors), etc.

Figure 11:
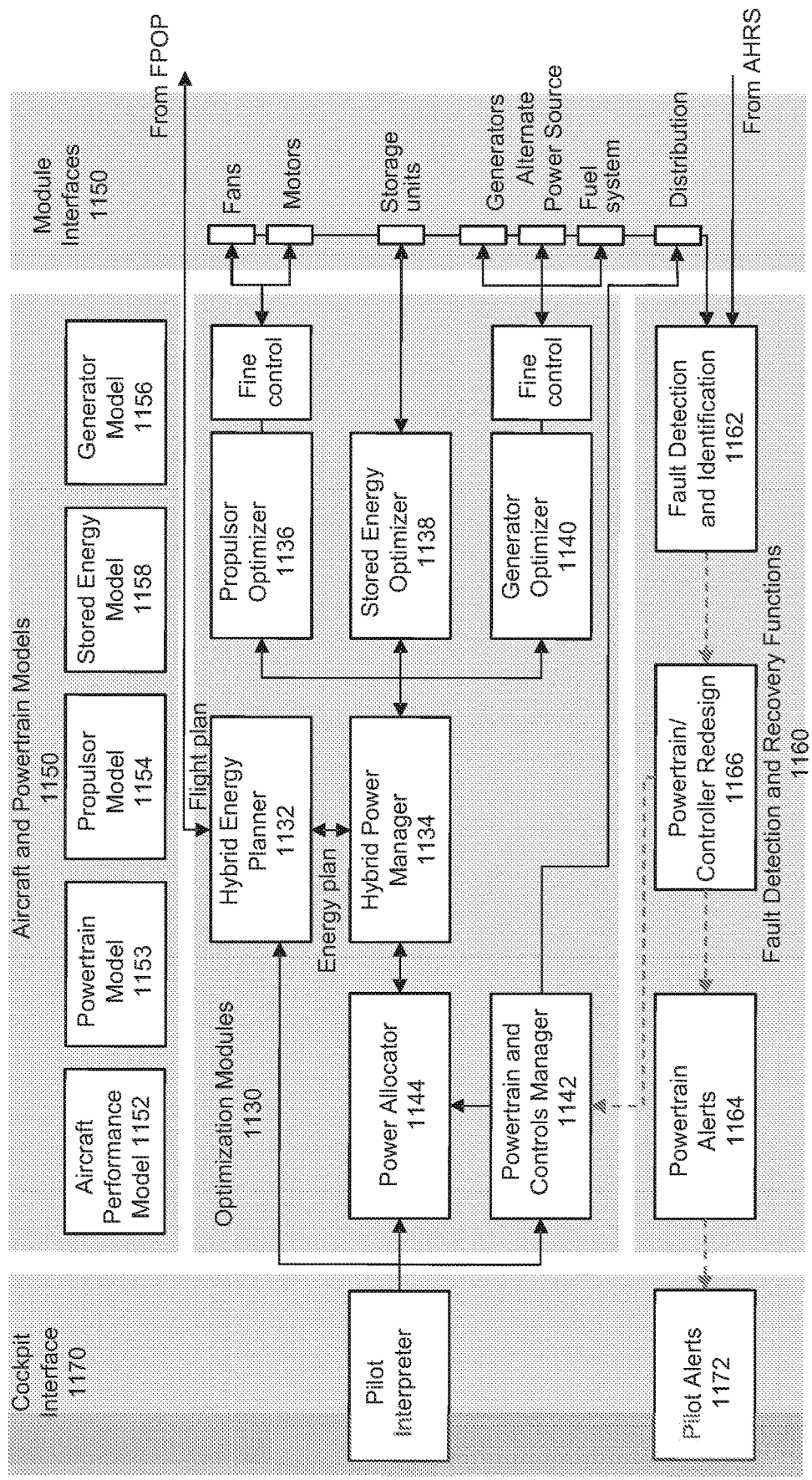
FIG. 11 is a diagram illustrating the primary functional elements or modules of a POCS that may be accessed and used to control or modify on-aircraft processes in an embodiment of the inventive air transportation system.
Figure 12:
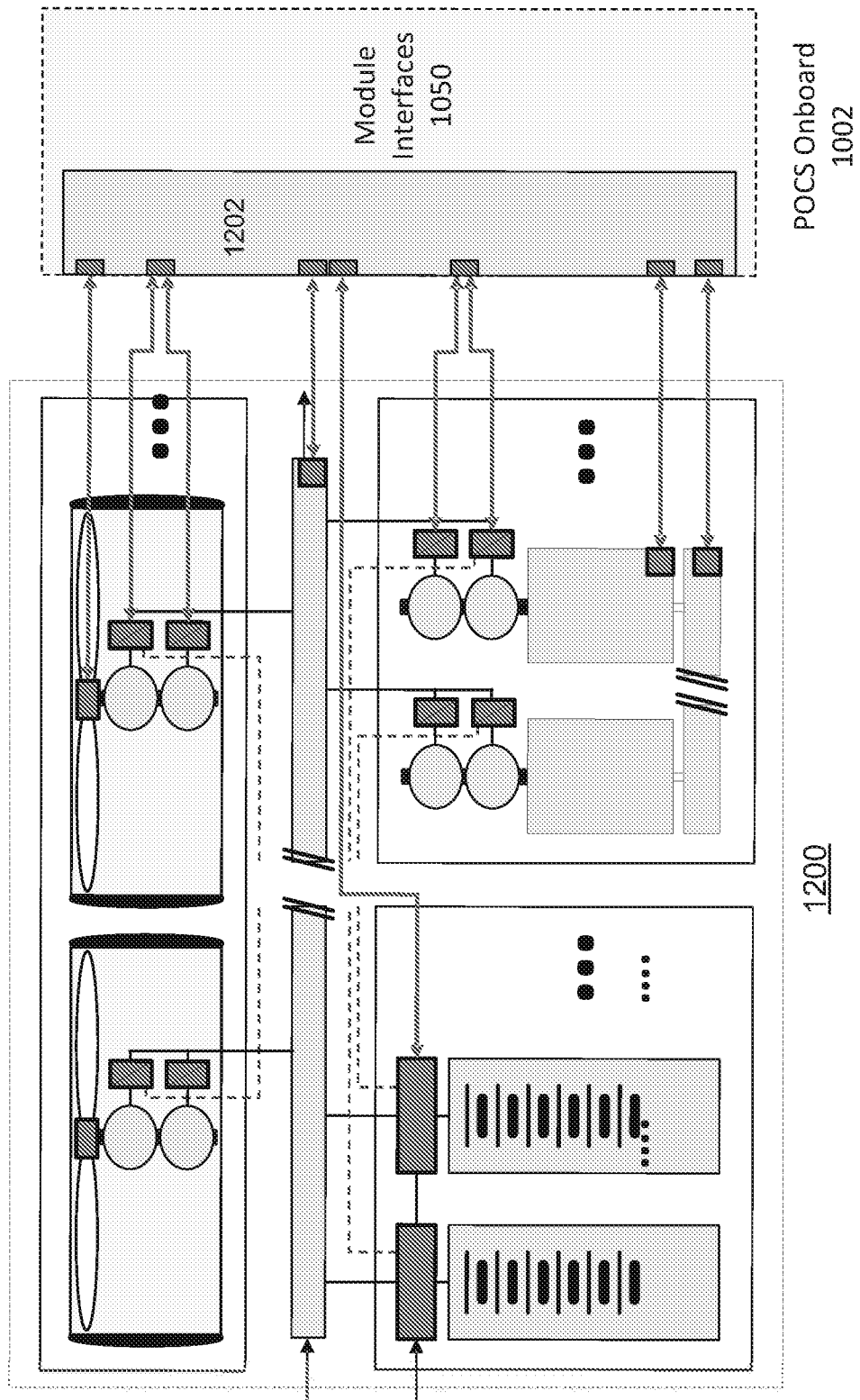
FIG. 12 shows the interface configuration for an example powertrain 1200 coupled to the POCS onboard by several interfaces/connectors 1202 for purposes of sensing a performance parameter and returning a control signal to a component of the powertrain or its control system.

Note that FIG. 12 shows the interface configuration for an example powertrain 1200 coupled to the POCS onboard by several interfaces/connectors 1202 for purposes of sensing a performance parameter and returning a control signal to a component of the powertrain or its control system. Similarly, FIG. 10 and FIG. 11 show the communications and data flow from the POCS Optimization Modules 1130 and Powertrain and Controls Manager 1142 to matching module interfaces (elements 1050 and 1150) of the powertrain. The system offers the pilot a secondary direct path (element 1052) to module controllers via the Modular operator interface (element/component 1012). The system may include back-up connectors to module controllers for redundancy, along with connectors and switches to activate the back-up circuitry.

The POCS platform 1000 may also provide one or more of the following online capabilities via a secure POCS cloud-based data platform (element/component 1004):

Aircraft and powertrain library (element/component 1020). A library of aircraft and module performance models, including operating models for each class, and parameters for each module in a class. The models and parameters are updated periodically via the benchmarking platform (element/component 1021). The database in designed to be queried by onboard POCS when initializing, calibrating a new module, or for periodic refreshes.

Benchmarking platform (element/component 1021). This is a database of performance benchmarks, and may include input capability for external benchmarks, and upload of raw performance data from the online logs for individual powertrains. Also includes statistical or other data analysis procedures that update benchmarks periodically.

Diagnostics platform (element/component 1022). This has the capability of enabling remote diagnostics and maintenance of the powertrain over a highly secure datalink.

Powertrain logs (element/component 1023). This serves as an archive of Onboard logs from individual powertrains uploaded periodically via the secure datalink, coupled with comparative performance statistics drawn from the Benchmarking platform.

In a typical embodiment, an implementation of a POCS platform (such as element 1000 of FIG. 10) may offer the following functionality or capabilities:

Calibration (represented by element/component 1025). This tailors the optimization and control platform to accommodate specific modules onboard, enabling upgrades to future technologies, aircraft variants, up/downsizing energy storage units or generators, and high fidelity modeling of module performance. In some embodiments it may perform or assist in performing the following functions/operations:

Scan powertrain to identify changes to modules onboard relative to most recent scan, validate and record in Onboard log;

Download optimization and control parameters for all changed modules from the Online Aircraft and Powertrain library via the datalink and populate onboard models;

Calibrate models to performance of onboard modules. Step operator through a series of tests on the modules, defined by the Initialization scan procedure to assess actual versus model performance. Identify potential issues and alert. Adjust model parameters to better match actual performance; and Enable operator to define range of preferences around powertrain optimization and control, displays, reporting, monitoring and diagnostics. Includes setting tailored to the specific operating environment, mission profiles and trade-offs. Store preferences in Onboard log.

Flight prep (represented by element/component 1026). This performs automated checks to ensure the powertrain has adequate energy to safely complete the planned flight, and is in flight ready state. In some embodiments it may perform or assist in performing the following functions/operations:

Accept Flight mode or Optimal as default, and flight details: Air path or Flight time (or distance), Payload and an Uncertainty factor. These can be entered manually or via FPOP;

Calculate and display Energy state based on Energy state scan procedure;

Determine if additional generator fuel or stored energy is required by using the Hybrid Energy Planner with prescribed flight details, Flight mode and Energy state. Examine Payload versus design payload to ensure safe flight, and to assess if there is option to increase capacity of stored energy units;

If onboard energy or Payload is changed, via additional stored energy units, increased state of charge or fuel, re-run Hybrid Energy Planner; and Execute pre-flight tests on the powertrain defined by Operating procedures, and identify issues, trigger the Fault detection and recovery module.

Inflight Control (represented by element/component 1027). This enables simplified control of power delivered by the hybrid powertrain, optimizing powertrain and module performance based on operator selected Flight mode and flight details. Control may be semi- or fully-automated, and optimization may be Basic or Integrated. In some embodiments it may perform or assist in performing the following functions/operations:

Calculate the optimal Energy plan, Arrival energy state, Target speeds and ranges (Maximum, Optimal, and Economy) using the Hybrid energy planner based on flight details, Flight mode and Energy state Flight details are either Basic, with Flight time (or distance) as input, or Integrated, with Air path as input. Display Arrival energy state and Target speeds. The Energy plan describes the Energy state along the Air path: Stored energy and Generator fuel at discrete waypoints;

If Arrival energy state is below minimum reserve levels, alert the operator, and offer alternate Flight mode, Target speed settings to make the destination;

Control the powertrain in real-time to achieve the Energy plan, in tandem with operator input, optimally sourcing power from the storage unit and generators, making adjustments as conditions change. FIG. 11 provides an overview of the Inflight control process and the functional modules or subprocesses that may be utilized, and is described in greater detail herein. This control process may include the following functions or operations:

Determine real-time control strategy using the Hybrid power manager, defining optimal energy distribution across the generators and stored energy units;

Pass the energy distribution to the module optimizers which compute optimal settings for the powertrain modules, and transmit these to the lower-level module controllers via Module interfaces within POCS;

Refresh Energy plan periodically based on deviation from prior plan;

Refresh Energy state periodically via the Energy state scan procedure; and

Enable updates to Flight mode and flight details manually or via FPOP (described with reference to FIG. 14), and respond by refreshing the Energy plan.

Enable semi-automated or fully-automated operation: the operator controls the Power levers in the former; the Inflight control module directs all functions in the latter, adjusting requested power levels to deliver the optimal airspeed; and Continuously monitor the performance of the powertrain via the module optimizers, and assess against models, safe limits via Inflight scan procedure. In event of issue, trigger the Fault detection and recovery module to coordinate alerts and action.

Diagnostics (represented by element/component 1028). This performs post-flight mission analysis, powertrain diagnostics and issue resolution. In some embodiments it may perform or assist in performing the following functions/operations:

Run the Mission analysis algorithm on monitored data stored in the Onboard log to calculate and display key flight statistics (e.g., distance, time, average speed), detail on total energy used, fuel and stored energy remaining, key performance statistics (e.g., overall efficiency and by module). Store results in Onboard log;

Update operating history of modules or components that require periodic maintenance or are life-limited; and Monitor health and performance of the powertrain, and assess against models, safe limits via Post-flight scan procedure. In event of issue trigger the Fault detection and recovery module to coordinate alerts and action.

Fault detection and Recovery (represented by element/component 1042). This performs ongoing monitoring of the powertrain to detect and identify faults, alert the operator, and assist with recovery action. In some embodiments it may perform or assist in performing the following functions/operations:

Monitor the health of the powertrain by the Fault detection and identification function, leveraging a combination of signals and models to identify and isolate faults as quickly and accurately as possible;

If a fault occurs, alert the pilot to trigger remedial response via the Powertrain alert function;

If a fault occurs, determine action required and trigger the Powertrain and Controls manager to execute in concert with the pilot; and Remedial action may also be initiated by the pilot engaging the Powertrain and Controls manager to execute.

In some embodiments, the POCS determines an optimal Power plan based on flight details and a prescribed Flight mode. POCS then controls the operation of the powertrain and its modules during flight to match the Power plan by monitoring performance of the powertrain and modules, making adjustments when necessary. POCS is designed for semi-automated or fully-automated operation, with the pilot retaining control of the throttle in the former, while POCS controls all functions in the latter. However, the pilot is able to override POCS settings.

FIG. 11 is a diagram illustrating the primary functional elements or modules of a POCS that may be accessed and used to control or modify on-aircraft processes in an embodiment of the inventive air transportation system. Each or a combination of the functions, operations, or processes performed by or under the control of the elements or modules shown in the figure may be performed by the execution of a set of instructions by a properly programmed processing element (such as a controller, state system, microcontroller, CPU, microprocessor, etc.).

As shown in the figure, the elements or functional modules of the on-aircraft processes of an embodiment of a POCS 1100 may include:

Optimization Modules (element 1030 of FIG. 10 and/or element 1130 of FIG. 11)

Hybrid energy planner (element 1132 of FIG. 11):

Determines the optimal Energy path over an Air/flight path by minimizing a non-linear cost objective (see below) subject to initial and arrival Energy states, Module performance constraints and Operating rules, typically a charge blended strategy that looks to gradually deplete the stored energy units over the course of the flight, enabling each of the power sources onboard to operate with optimal efficiency;

Performed by decomposing the trip into an Air path, composed of segments with roughly uniform operating requirements, e.g., taxi, take-off roll, climb at uniform rate, cruise, power neutral descent (done as part of Flight prep). Optimization is then performed to determine the optimal Energy plan along the provided Air path. If a detailed Air path is not provided, a standard depletion profile is assumed, for instance, linear over the cruise and climb legs, after budgeting for taxi, take-off, descent and landing based on a look-up table of benchmarks;

Optimization is performed via full dynamic programming (or a similar algorithm), or simplified approaches such as using look-up tables or functions to determine optimal power distribution across the generators and the stored energy units based on the flight leg and operating conditions. Power distribution could be described in one of many ways, including the Generator power setting, as fraction of full generator power, or the Power ratio, equal to the ratio of power drawn from stored energy to the total power requested;

The objective function defines the quantity to the minimized over the course of the Air path by the Hybrid energy planner. For example, the objective function may include one or several of the terms below, with parameters defined by the operator: Objective function=Cost of fuel+Cost of stored energy+Cost of engine maintenance and reserves (amortized)+Cost of battery packs (amortized)+Cost of passenger and crew time+Cost of aircraft+Cost of emissions; and The objective function is minimized based on provided departure and arrival Energy states, Operating rules from the Operating rules library, powertrain and module performance constraints from the powertrain and module (propulsor, generator, stored energy) models. The optimization process requires simulation of aircraft and powertrain performance, provided by the Aircraft and Powertrain performance models.

Hybrid power manager (element 1134 of FIG. 11):

Determines real-time control strategy to optimize energy distribution, described via variables such as the Generator power setting or Power ratio, across onboard sources to deliver the power demanded, based on the overall Energy path for the flight. This is determined by minimizing a non-linear objective for the flight segment subject to Module performance constraints and Operating rules, including the provided Energy path;

Optimization may be performed by a relatively simple method, such as determining the Generator power setting (or Power ratio) from a look-up table of optimal values by flight leg and discrete range of operating conditions, or by a more complicated method, such as determining the optimal value using one of several algorithms such as Pontryagin's minimum principle (PMP) or the Equivalent consumption minimization strategy (ECMS). Alignment with the provided Energy plan is driven by an outer control loop, e.g., proportional plus integral;

The objective function defines the quantity to the minimized over the course of the Air path by the Hybrid energy planner. For example, the objective function may include one or several of the terms below, with parameters defined by the operator: Objective function=Cost of fuel+Cost of stored energy+Cost of engine maintenance and reserves (amortized)+Cost of battery packs (amortized)+Cost of passenger and crew time+Cost of aircraft+Cost of emissions; and The objective function is minimized based on provided departure and arrival Energy states, Operating rules from the Operating rules library, powertrain and module performance constraints from the powertrain and module (propulsor, generator, stored energy) models. The optimization process requires simulation of aircraft and powertrain performance, provided by the Aircraft and Powertrain performance models.

Propulsor optimizer (element 1136 of FIG. 11):

Determines real-time control strategy for each of the propulsors based on power requested, airspeed and environmental conditions. Translates power requested to propulsor settings for optimal efficiency. The optimal settings are then used to direct the lower-level module controllers (e.g., variable pitch fan controller, motor controller) via Module Interfaces (elements 1050 of FIG. 10 and/or elements 1150 of FIG. 11) within the POCS platform. The optimal settings may be further modified via a fine control loop for improved performance. This may include a peak seeking loop to fine-tune the operating point, and a smoothing loop to moderate abrupt changes in settings over intervals determined by ride comfort, aircraft structural or powertrain performance constraints;

Settings optimized may include the attitude of the propulsors, e.g., variable pitch fan angles, position of the exhaust plugs, and the output of the propulsor motor-inverters, e.g., torque, speed. The optimizer regulates propulsor setting over the range of aircraft operations including standard thrust, neutral thrust, regenerative braking, reverse thrust and recovery thrust;

For standard thrust control, the optimizer is driven by requested power for each propulsor, airspeed and environmental conditions, and determines propulsor settings that maximize the thrust delivered. This is done by performing a staged or coupled optimization across the Motor and the Propulsor performance models (element 1040 of FIG. 10 and/or element 1140 of FIG. 11). In the staged approach, motor and propulsor settings are optimized in turn. For instance, motor settings to maximize efficiency may be determined first, by optimization using the Motor performance model within operating constraints defined for the motor. Following this, the propulsor attitude is determined, e.g., fan pitch angle or position of exhaust plug, to maximize propulsor thrust by optimization using the Propulsor performance model within operating constraints defined for propulsor attitude. These settings are then used to direct the operation of the lower level controllers via the Module Interfaces within POCS;

In some implementations, a look-up table may be used to determine near-optimal values, followed by an optional optimization step to refine estimates along the lines of those described above;

For reverse thrust, the optimizer is driven by requested reverse power for each propulsor, and determines propulsor settings that maximize the reverse thrust delivered. This is done by process similar to that for standard thrust. In the case of a staged approach, the motor settings are determined to maximize efficiency, by optimization using the Motor performance model, or by look-up in the Motor performance table. Then the matching propulsor attitude is determined by optimization using the Propulsor performance model or by look-up in the Propulsor performance table;

For regenerative braking thrust control, the optimizer is driven by requested reverse power for each propulsor, airspeed and environmental conditions, and determines propulsor settings that maximize the thrust delivered. This is done by performing a staged or coupled optimization across the Motor and the Propulsor performance models. In the staged approach, motor and propulsor settings are optimized in turn. For instance, motor settings to maximize efficiency may be determined first, by optimization using the Motor performance model within operating constraints defined for the motor. Following this, the propulsor attitude is determined, e.g., fan pitch angle or position of exhaust plug, to maximize propulsor reverse thrust by optimization using the Propulsor performance model within operating constraints defined for propulsor attitude. These settings are then used to direct the operation of the lower level controllers via the Module Interfaces within POCS; and For neutral thrust, the optimizer directs the lower-level controllers to cut off power to the motors, and set the propulsor attitude to minimal drag, e.g., variable pitch fans set to feathering or pin-wheeling, exhaust plug set to maximum extension.

Stored energy optimizer (element 1138 of FIG. 11):

Monitors performance and state of the rechargeable storage units via the Module Interfaces 1150 within POCS, to help ensure operation within long life ranges defined by performance constraints. If the storage units are outside of their long life ranges, the optimizer adjusts the hybrid energy planner and hybrid power manager settings to redistribute power to the generators, e.g., by increasing the effective cost of the storage units;

Generator optimizer (element 1140 of FIG. 11):

Determines real-time control strategy for each of the generators based on power requested, airspeed and environmental conditions. Translates power requested to generator settings for optimal efficiency. The optimal settings are then used to direct the lower-level module controllers (e.g., engine control unit, motor controller, fuel system controller) via Module Interfaces 1150 within the POCS platform. The optimal settings may be further modified via a fine control loop for improved performance. This may include a peak seeking loop to fine-tune the operating point, and a smoothing loop to moderate abrupt changes in settings over intervals determined by ride comfort, aircraft structural or powertrain performance constraints;

Settings optimized may include the output of the internal combustion engines, e.g., speed, torque, and the draw of the generator motor-inverters, e.g., torque, speed;

The optimizer is driven by requested power for each generator, airspeed and environmental conditions, and determines generator settings that maximize efficiency. This is done by performing a staged or coupled optimization across the Engine and Motor performance models (or the integrated Generator model). In the staged approach, engine and motor settings are optimized in turn. For instance, engine settings to maximize efficiency may be determined first, by optimization using the Engine performance model within operating constraints defined for the engines. Following this, the motor settings to maximize efficiency are determined by optimization using the Motor performance model within operating constraints defined for the motors. These settings are then used to direct the operation of the lower level controllers via the Module Interfaces within POCS;

In some implementations, a look-up table may be used to determine near-optimal values, followed by an optional optimization step to refine estimates along the lines of those described above; and Includes strategy to route excess power (above that requested) from the generators to charge the storage units to insulate generators from transients, or when power requested is outside of generator optimal range.

Powertrain and Controls manager (element 1142 of FIG. 11):

Driven by input from the pilot or the Powertrain and Controls redesign function, executes diagnostics or resolution processes, reconfigures the powertrain or changes the control laws;

Receives resolution or diagnostic process steps, powertrain reconfiguration instructions, control laws from the pilot and the Powertrain and Controls redesign function;

Resolves conflicting commands and follows safety procedures defined in the operating rules function;

Executes the rationalized set of changes in a safe sequence by directing the lower-level controllers via Module interfaces, and by modifying the optimization modules, aircraft and powertrain models; and For instance, in event of an impending emergency landing, a "secure and isolate" sequence triggered by the pilot immediately before touchdown would direct the Powertrain and Controls redesign function to shut down or isolate all high-voltage or flammable systems of the powertrain to protect passengers and cargo.

Alternately, the Fault detection and identification function may trigger the sequence based on assessment of a crash from the aircraft state variables.

Power allocator (element 1144 of FIG. 11):

Determines power distribution across on-board propulsors based on pilot direction and powertrain capabilities. This may include:

Power allocation to coordinate multiple propulsors, for instance balanced power to eliminate yaw moment, e.g., propulsors powered for zero moment about the aircraft center of gravity, or propulsor power determined by power setting of a master propulsor;

Power allocation to accommodate propulsor faults optimally, preserving normal or gracefully degraded performance aligned with requested power. For instance, allocation may boost power to healthy propulsors to compensate for faults, while limiting yaw moment, ensuring power is above minimum needed to maintain safe flight for that flight leg, and does not exceed constraints on the propulsors; and Power allocation for directional control, by distributing power to create a requested yaw moment.

Aircraft and Powertrain Models (element 1040 of FIG. 10 and/or element 1150 of FIG. 11)

Aircraft performance model (element 1152 of FIG. 11):

a flight test calibrated, single degree of freedom, physics based performance simulation model which calculates the expected power required for the current phase of flight given the aircraft weight, velocity, air temperature, and pressure, and rate of climb or descent (a further description of this aspect is found in the discussion of the FPOP system).

Powertrain and Propulsor model(s) (elements 1153 and 1154 of FIG. 11):

Performance models, look-up tables and performance constraints that enable optimization of propulsor settings based on power requested, airspeed and environmental conditions. These may include one or more of the following:

Motor performance model, for instance, describing the efficiency of the motor as a function of motor torque, speed and voltage;

Propulsor performance model, for instance, defining propulsor thrust as a function of the fan pitch angle, torque, airspeed, fan speed, and setting, standard, reverse or regenerative braking;

Motor and propulsor performance look-up tables defining performance relationship at discrete points, as replacement for optimization, or for use to generate starting approximations; and Performance constraints on motor and propulsor settings. For instance, fan pitch angle ranges for standard operation, regenerative braking and reverse thrust.

Generator model (element 1156 of FIG. 11):

Performance models, look-up tables and performance constraints that enable optimization of generator settings based on the power requested, airspeed and environmental conditions. These may Include one or more of the following:

Engine performance model, for instance, defining engine efficiency as a function of the engine torque, speed, and ambient conditions;

Motor performance model, for instance, describing the efficiency of the motor as a function of motor torque, speed and voltage;

Engine and motor performance look-up tables defining performance relationships at discrete points, as replacement for a performance model, or for use as starting approximations;

Alternately, a generator motor for integrated engine-motor performance, for instance, describing generator efficiency as a function of torque, speed, voltage and ambient conditions. Similar to above, the generator motor could be replaced by or supplemented with generator performance look-up tables defining performance relationships at discrete points; and Performance constraints on engine and motor, or integrated generator settings. For instance, engine power ranges to full power, boost and peak, motor power ranges to full power, boost and peak, along with safe durations for boost and peak.

Stored energy model (element 1158 of FIG. 11):

Performance models, look-up tables and performance constraints to enable optimization of power distribution across the rechargeable stored energy units and generators, based on power requested, current state of charge, environmental conditions. These may include the following:

Drawdown model for the stored energy units, which relates the state of charge of the units to the current drawn, for example, via generic Coulomb counting;

Stored energy performance model, that determines operating efficiency of the units based on the power drawn, state of charge, ambient conditions, and other factors. For instance, a Rint type equivalent circuit model coupled with models for key parameters, such as for the open circuit voltage as a function of the state of charge and temperature;

Stored energy performance look-up tables defining performance relationship at discrete points, as replacement for optimization, or for use as starting approximations; and Performance constraints on stored energy units, including limits on the state of charge and power drawn from the units.

Fault Detection and Recovery (element 1042 of FIG. 10 and/or element 1160 of FIG. 11)

Fault detection and identification (element 1162 of FIG. 11):

Continually monitor the health of the powertrain by combination of signal-based and model-based methods to detect sensor, actuator, component or module faults;

Periodically sample signals from a range of sources, control signals from POCS to the lower-level controllers, output signals from the lower-level controllers, powertrain and module sensors, aircraft state variables;

Monitor signals to ensure powertrain is operating within safe limits defined by performance constraints. If safe limits are exceeded, monitor the extent and duration of the spike to assess severity of the issue;

Trigger powertrain alerts (element 1164 of FIG. 11) to notify the pilot, via the in-cockpit interface (element 1170, and more specifically, Pilot Alerts element 1172);

Leverage a variety of methods to detect faulty signals, e.g., Fourier analysis, limit checking;

Compare the performance of the powertrain, modules and sub-systems with internal models for components or processes to identify potential faults, via methods such as parameter estimation or neural networks;

Determine the location and nature of the fault, via signals and models using analytic and/or heuristic methods. Classify faults based on location, type and severity; and Trigger the Powertrain and Controls Redesign function/process (element 1166 of FIG. 11) to initiate corrective action.

Note that for purposes of management of the aircraft and transportation system, a powertrain configuration and control law library may include the following information, data, or processes:

A resolution process that describes the process steps to be followed to resolve a fault with the powertrain;

Each powertrain configuration describes settings, e.g., switches, connectors, contactors, that collectively need to be set to implement the architecture, along with process steps to execute a safe reconfiguration, and the control law to operate the reconfigured powertrain; and Each control law describes optimization and control procedures for the powertrain, including objective functions, operating rules, powertrain and module performance constraints, and aircraft and powertrain performance models.

Powertrain and Controls Redesign (element 1166 of FIG. 11):

Determine powertrain and controls redesign required to accommodate active faults such that normal or gracefully degraded performance is preserved, by combining pre-defined designs with in-flight synthesis;

Determine if corrective action is required based on location, type and severity of faults;

Select resolution processes, powertrain configurations and control laws to optimally accommodate a fault via an expert system (or other decision process) that combines look-up within libraries of pre-defined resolution processes, powertrain configurations and control laws, with synthesis to tailor a response to the specific condition. For example:

Isolation of faulty modules or circuits. For instance, in the case of a short-switch fault in a converter, a fast-acting fuse connected to the switch can be used: clearing the fuse isolates the switch when faulted;

Redistribution of power to accommodate faults. For instance, in a powertrain with twin propulsors, left and right, each powered by a stored energy unit and generator, faults in a propulsor or source may require allowing left-right transfers to optimize output. A left to right transfer would help compensate for faults in the left propulsor, by allowing the right to be boosted. Similarly, a left to right transfer would help accommodate faults in the right power sources, so both can be powered equally;

Activation of redundant modules or circuits. For instance, in the powertrain with twin propulsors, left and right, each powered by a bus, failures in either of the buses can be accommodated by a single redundant bus. Moreover, the redundant bus can also be used to create a path for left-right transfers; and Isolation of high voltage circuits.

Initiate alerts and corrective action by triggering the Powertrain Alerts (element 1164 of FIG. 11) and Powertrain and Controls Manager (element 1142 of FIG. 11) functions, operations, or processes.

Figure 14:
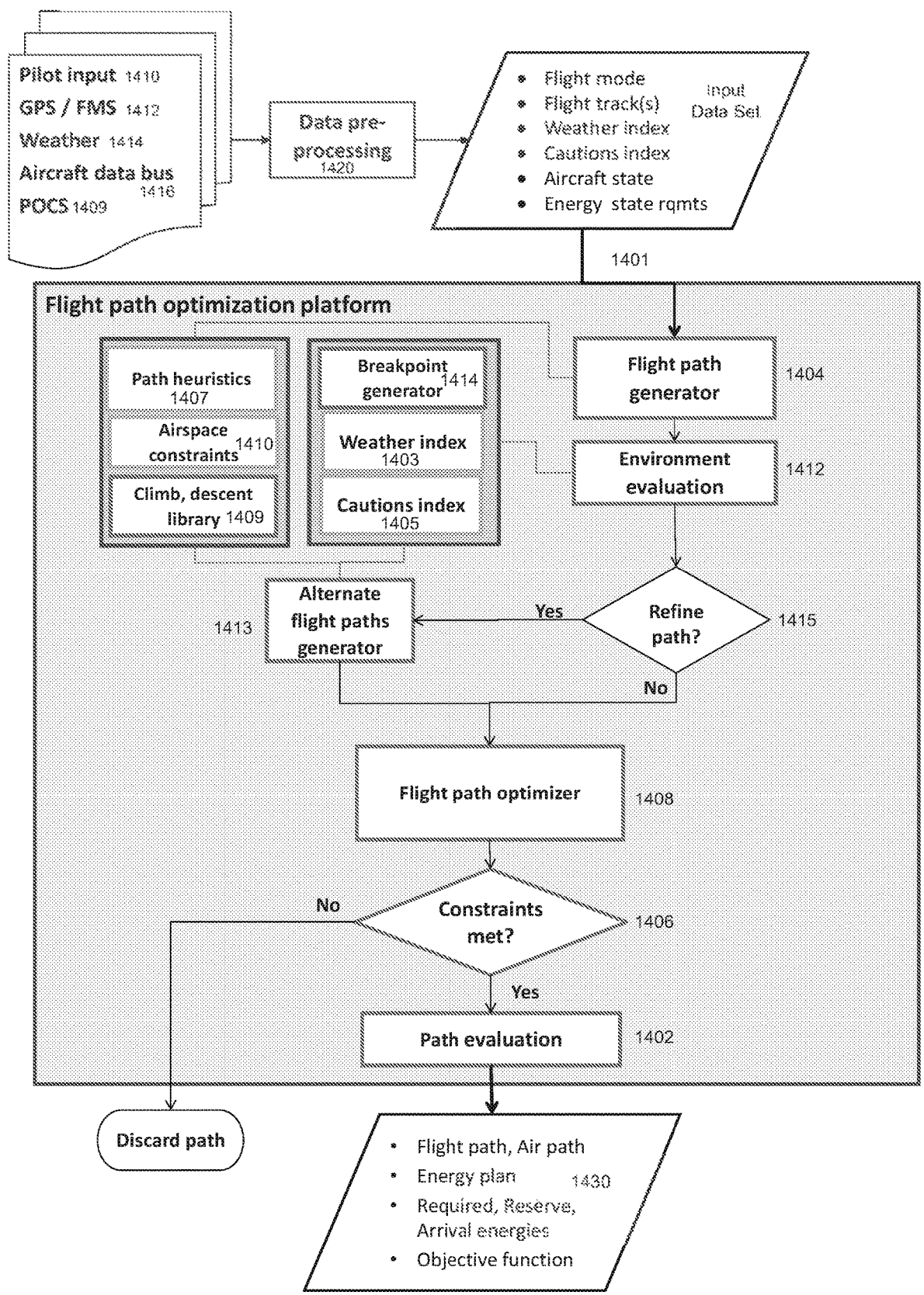
FIG. 14 is a flowchart or flow diagram illustrating certain of the inputs, functions, and outputs of a Flight Path Optimization Platform (the FPOP) that may be used to determine or revise a flight path for an electric-hybrid aircraft that may be used as part of the inventive air transportation system.

FIG. 14 is a flowchart or flow diagram illustrating certain of the inputs, functions, and outputs of a Flight Path Optimization Platform (the FPOP) that may be used to determine or revise a flight path for an electric-hybrid aircraft that may be used as part of the inventive air transportation system. Each or a combination of the functions, operations, or processes performed by or under the control of the elements or modules shown in the figure may be performed by the execution of a set of instructions by a properly programmed processing element (such as a controller, state system, microcontroller, CPU, microprocessor, etc.).

An implementation of the Flight Path Optimization Platform may be used to determine the optimal flight path(s) for a hybrid-electric aircraft. This includes defining speeds and altitudes, and an Energy plan for each of a series of flight segments while satisfying the performance and cost objectives defined by the Flight Mode. The FPOP determines optimal paths across one or multiple flight tracks; in doing so, it takes into account aircraft and powertrain characteristics, weather conditions, ATC restrictions, hazards, etc.

Note that flight planning for a regional hybrid-electric aircraft with multiple power sources requires a more complex set of trade-offs than a conventional aircraft being piloted over long ranges. For instance, for a hybrid-electric aircraft the optimal flight altitude is determined by a combination of speed versus efficiency objective, flight distance, weather aloft, aircraft aerodynamics, available energy and power, and relative stored energy versus generator usage. In contrast, the designated flight altitude for a long distance commercial passenger or cargo flight may be set by one or more of FAA requirements, government policies, and coarse aircraft characteristics. This is a much simpler manner of determining a segment (or segments) of a conventional long range flight. Because of the complexity of the flight planning process required for the inventive aircraft and regional air transportation system, the FPOP is used to execute the required optimization processes both pre-flight and during flight (as conditions change) to determine an optimal flight path.

In addition to primary flight path planning, FPOP may also be utilized on a periodic basis in flight to update the flight path to the destination (given changes in winds, ATC routing etc.), and provide alternate destinations or flight paths in case of failures within the powertrain, or other inflight emergencies:

During flight, periodically identifies all airports within range of the aircraft given current energy state. Results may be displayed to the pilot in any manner of formats including a range ring on a map, an airport highlight on a map, a simple text list etc.;

In case of any emergency situation, immediately provides the flight path to the nearest acceptable alternate airport; and In case of a partial failure in the powertrain, FPOP will identify alternate destinations available with the degraded condition of the powertrain. Examples of partial failures would include failure one or more energy storage units, generation modules, propulsion motors etc.

In some embodiments or implementations of the FPOP platform or data processing system, an optimization process may be performed on two levels:

Level 1: A simple rule-based calculation using standard libraries to set altitudes and speeds based on Flight mode and distance; and Level 2: Optimization across a range of viable altitude and speed alternatives, building on Level 1 output.

In some embodiments, the FPOP platform may include or be configured to access one or more of the following functions, operations, or processes:

Path generation (element or process 1404 in FIG. 14). This defines the Level 1 Flight path for each Flight track. This module Constructs a 3D Flight path, defined by waypoints (latitude, longitude, and altitude) connected by flight segments (for example, cruise, climb, descent), with a speed and Energy plan assigned to each segment. Cruise may consist of one or more segments as required by altitude constraints and ATC routing. In the case of Level 2 optimization, builds alternate Flight paths for each track using the Path alternatives generation rules module (1413). For each Flight path, determines target speeds by leg using the Speed rules library, and determines the Weather and Caution indexes by interpolating across provided conditions. In general, the path generation process or element utilizes a core sequence which draws from libraries of performance heuristics and airspace constraints, such as the following:

Path generation sequence first sets cruise altitude(s) and flight speeds from heuristics. Climb and descent distances are calculated to set intermediate waypoints, airspace constraints are calculated as waypoints with altitude constraints. Lastly, Power ratio (range extending generator state) is set for each segment;

Path heuristics (element 1407 in FIG. 14) A library of altitudes, speeds and energy source utilization based on a database from extensive flight path optimization. For a given range, weight and Flight mode, returns the optimal climb and descent rates, cruise altitudes and speeds, and range extending generator utilization times for a no-wind, simple flight profile. Heuristics may be generated using the process described herein;

Airspace constraints. (element 1410 in FIG. 14) Utilizes the navigation database of airspace and terrain, combined with the flight track, to determine minimum or maximum altitude constraints, imposes the constraints along the Flight track as start and end (latitude, longitude, and altitude) waypoints;

Climb, descent library. (element 1409 in FIG. 14) A library which returns time and distance to climb or descend between two altitudes at the current weight, and speed provided by the Path heuristics. Library may contain table look-ups with interpolative smoothing, or compiled performance calculations;

Environment Evaluation. (element or process 1412 in FIG. 14) Determines whether environmental conditions warrant a level of path optimization beyond the baseline heuristic path. Applies weather and cautions data to the route of flight; any cautions, significant wind, or significant changes in wind on the flight path will require the L2 Path refinement.

Alternate flight paths generator (element or process 1413 in FIG. 14). Builds a set of alternate Flight paths by altering segment altitudes from the initial Flight path. Uses the Breakpoint generator to further divide existing flight segments with additional waypoints if warranted, and then generates the set of all possible paths. The maximum number of paths (order 10) is limited by altitude constraints (minimum, maximum), and airspace rules which require cruise at incremental altitudes (eg: over the US, eastbound flights cruise at odd-thousand feet, 9000, 13000 etc.);

Break point generator (element or process 1414 in FIG. 14). This routine compares the existing cruise segments against the Cautions and Weather index data (elements 1403 and 1405). Typically, waypoints are inserted at the boundaries of any caution, and are also inserted at any location with significant wind velocity change. Each additional waypoint increases the degrees of freedom available to the optimizer;

Flight path optimizer (element or process 1408 in FIG. 14). This varies the cruise speed(s) and Power ratio over a Flight path to minimize an objective function while meeting constraints. Optimization is performed for the current aircraft state, which may include weight, stored energy, and range extending generator fuel available, and environmental conditions which may include winds, precipitation, temperatures etc. Results of the optimization process may include the optimized Flight path, Air path, Energy plan, and value of the objective function. The flight path optimizer may include one or more of the following processes, operations, functions, elements, etc.:

Objective function. Set by Flight mode, the Objective function will affect the cruise speed and energy utilization strategy. Example objective functions which "bracket" the performance space would typically be maximum speed (minimum time), or minimum energy. A more comprehensive objective function may include one or several of the terms below, with parameters defined by the operator: Objective function=Cost of fuel+Cost of stored energy+Cost of engine maintenance and reserves (amortized)+Cost of battery packs (amortized)+Cost of passenger and crew time+Cost of aircraft+Cost of emissions;

Optimization variables. Optimizer varies cruise speed (s) and Power ratio. For example, a maximum speed optimization would result in a high level of range extending generator usage, while a minimum energy optimization would result in a level of range extending generator usage dependent on flight range, sufficiently short flights would not use range extending generators at all;

Optimization constraints. May include one or several constraints on the powertrain for performance and safety including maximum discharge rate of stored energy, minimum state of charge at any point during the flight, minimum energy reserves at end of flight (note that optimization occurs on a fixed Flight path; any altitude constraints have been satisfied by the Flight path generator);

Optimization process. The optimization space is nonlinear and may contain discontinuities with power generator state, both of which preclude a closed-form solution. Optimization requires modelling the aircraft and powertrain performance over the defined Flight path in a time dependent manner, using the current aircraft configuration and in the expected flight environment. Performance models result in time integrated totals which are used to calculate the objective function (for example: fuel and stored energy consumed);

Flight modelling may be accomplished with dynamic programming, for example a flight simulation including representative aircraft and powertrain models (described in greater detail below), or by simplified methods, such as reduced order models (so long as discontinuous, time integrated properties are correctly modelled). The method described herein utilizes a flight simulator process with representative aircraft and powertrain models, and incorporates the impact of the current operating environment;

Optimization algorithms. A flight profile, with a single cruise speed variable may be optimized with a gradient descent, or Newton's method. A multi-segment flight with discontinuities in Power ratio may require more advanced nonlinear algorithms, such as NPSOL;

Constraints Check (element or process 1406 of FIG. 14) checks the results of the optimized flight path against required end of flight energy reserves or other constraints which may be used to shape the optimization space. Any path which could not be optimized to meet constraints is discarded at this point as non-viable; Path evaluation (element or process 1402 of FIG. 14). This sorts all valid Flight paths by objective function, returns the default Flight path (as initially requested), and the optimized (i.e., that having the minimum objective function) Flight path with all relevant information;

Flight simulation models and modules. The flight simulation model may be utilized by the Flight path optimizer (element or process 1408 of FIG. 14) and is a flight test calibrated, single degree of freedom, physics based performance simulation model which calculates the expected power required for the current phase of flight given the aircraft weight, velocity, air temperature, and pressure, and rate of climb or descent. The model utilizes Aircraft and Powertrain models in time stepping and empirical routines to continuously calculate performance along the Flight path in the presence of forecast weather. The results are integrated totals for time, distance, and energy. The integrated distance totals are the Air path. These models may include one or more of the following:

Flight modules. Performance is calculated for each flight segment by the corresponding flight module (e.g., takeoff, climb, cruise, descent, landing, etc.). The modules are initiated with aircraft and segment information, and return the integrated performance for the complete flight segment. A Table provides the details on inputs and outputs for each module, where the modules utilize the Aircraft and Powertrain models to calculate aircraft performance;

Aircraft model. The model may be initiated with the aircraft state (altitude, velocity, power level, weight, turn rate etc.), and operating environment (altitude, air temperature, pressure, density) and returns the corresponding instantaneous performance (energy usage, fuel burn, acceleration, climb or descent rate etc.). The model may utilize a combination of force and moment equations ($C_L$, $C_D$, $C_{Di}$, $C_M$, F, and $N_ZW$), and comprehensive table look-ups to determine instantaneous aircraft performance, where:

$C_L$—Standard calculation of $C_L=N_ZW/q/S$;

$C_D$—Drag build-up through a Reynolds based skin friction methodology with form drag factors, corrected to test drag. Additional factors for cooling drag, flap and landing gear drags (if needed), excrescence and interference drags;

$C_{Di}$—Induced drag with baseline $C_L^2/(\pi\ AR\ e)$, e provided by table look-up, function of $C_L$, flap setting. Trim drag added as lift increment to main wing, and $C_{Di}$ from the HT;

$C_M$—Pitching moment, from aircraft weight, CG, and neutral point (speed dependent, from table look-up);

F—Thrust, both available and required. Powertrain and propulsor models called to determine SHP available, converted to thrust with aerodynamic propulsor model (table look-up of efficiency Vs. Speed). Thrust required calculated to balance drag (in case of non-maximum thrust), and used for energy/fuel burn; and $N_ZW$—Load factor, expressed in fractions of (g), due to accelerated flight (turning, or pitch rate);

Powertrain model. Represents the physics of hybrid-electric powertrain modules and propulsors. In response to a thrust requirement from the aircraft, powertrain module distributes power between range extending generators and energy storage units, returns thrust available, range extending generator state(s), fuel burn rate, and storage discharge rate. The aircraft simulation tracks range extending generator run time, total fuel burned, and kWh of storage used. Additional information on the powertrain models is provided in the powertrain section (e.g., elements 1153 and 1154 of FIG. 11).

As noted, the FPOP flowchart or flow control diagram shows the sequence of steps in an exemplary implementation of the FPOP process. These typically include:

1. The FPOP is initialized from the POCS (1409); data needed for the flight path generation/optimization may be gathered from several sources:
   a. Pilot input Flight mode information (1410) is provided by the POCS, which also includes energy state requirements (e.g., level of reserve needed on landing)
   b. The GPS/FMS provides the initial, pilot-input flight track to be optimized (1412)—there may be more than one flight track option (e.g: multiple routes around, or over, terrain);
   c. Weather information (1414) is uploaded over data link (ADS-B in);
   d. The aircraft data bus provides current operating or environmental parameters (1416) including temperature, air pressure, and if this is an in-flight update, aircraft position and speed.
2. Data pre-processing (1420) converts the wide-area weather information into a Weather index (1403) of interpolated weather at the locations along the flight track (based on latitude, longitude, and available altitudes). Similarly, sources of caution (e.g., icing or precipitation) are pre-processed to check for their possible effect on the intended route of flight; data are provided in the Cautions index (1405).
3. The FPOP platform is called with the fully assembled set of input data (step or stage 1401).
4. The Flight path generator (1404) creates a three dimensional flight path from the provided 2D Flight track. The generated path is defined by a set of waypoints (defined by latitude, longitude, and altitude), that are connected by segments (climb, cruise, descent) with speeds specified for each segment:
   a. A library of path/performance heuristics (1407) provides optimal climb rates, cruise altitudes, and descent rates. Heuristics are corrected for aircraft current weight and energy state;
   b. The climb and descent library (1409) uses the rates (from the heuristics) to provide climb and descent distances, which determine intermediate waypoint locations;
   c. Intermediate waypoints may be added to match airspace constraints (1410), including constraints due to terrain; and
   d. Waypoints are connected with flight segments; speeds and range extending generator state are assigned to all segments from the heuristics.
5. Environment evaluation (1412) examines the Flight path in combination with the Weather and Hazards data to determine if the path would benefit from optimization under real world conditions:
   a. If no additional optimization is necessary or would be beneficial, then the path is provided to the Flight path optimizer (1408);
   b. If further optimization has potential benefits, then the Alternate flight paths generator (1413) is invoked;
      i. The Breakpoint generator (1414) may add additional intermediate waypoints to the cruise segments based on sources of cautions and/or winds aloft; this provides more degrees of freedom in the optimization space;
      ii. The altitude of each cruise segment is varied up to the maximum (set by performance limits) and down to the minimum (set by constraints). Speeds and energy source utilization are again set by using the heuristics;
      iii. The full set of possible paths is provided to the flight path optimizer (1408).
6. Flight path optimizer (1408) varies the cruise speed and Power ratio over the flight path to minimize an objective function within any specified constraints. For each Flight path, the optimizer generates an Air path, Energy plan, and objective function. Note that a path may be discarded if no viable Energy plan can be found.
7. All viable paths are sorted by objective function, and the optimum path is identified and returned. Final outputs (1430) are the Flight and Air paths, Energy plan, Required, Reserve, and Arrival energies, and a value of the specified objective function.

| Flight Simulation Modules (note that these represent examples of a possible implementation) | | | |
| --- | --- | --- | --- |
| Module | Inputs | Procedure | Outputs |
| ALL | Aircraft weight, CG, starting, ending altitudes, atmospheric conditions (pressure, temperature), wind velocity | | |
| Takeoff | Flap angle, runway information (slope, surface type) | Calculate speeds for VCLmax, VLO, V1, V2, calculate acceleration distances, times, and balanced field requirement per FAA regulations, terminates on obstacle clearance | Take off speeds, distances for ground roll, obstacle clearance, normal, engine out, balanced field, initial climb rates and gradients, normal, engine out, take off time, energy used, and generator run time |

| Flight Simulation Modules (note that these represent examples of a possible implementation) | | | |
| --- | --- | --- | --- |
| Module | Inputs | Procedure | Outputs |
| Climb | Climb type (energy/fixed speed) Speed (KIAS) Climb power | Calculates acceleration to climb speed, then executes a time stepping iterative calculation of either a fixed speed climb, or maximum specific energy climb ($P_S$), with climb rate determined by excess power available. Terminates at final altitude. Integrates energy, time and distance for segment totals | Initial, climb rate, total time, energy, fuel, and distance to climb, final altitude, final speed, generator run time |
| Cruise | Speed or Mach, Termination criteria: range, or final waypoint, or minimum weight/energy, energy reserve required at end | Calculates acceleration to cruise speed, followed by steady state cruise until meeting termination criteria. Single DOF. iterative time stepping calculation of flight physics with a Shuts down the range extending generator once sufficient stored energy remains to complete flight with required reserves. | Total time, distance, energy, fuel burn, and generator run time |
| Descent | Descent rate (ft/sec) Final speed | Calculates either a closed form solution for a "best glide" descent (L/D max) at zero net thrust, or a time stepping, iterative descent with fixed power, and linear deceleration from initial to final airspeed. Terminates on final altitude | Total time, distance, energy, fuel burn, and generator ran time |
| Landing | Flap angle, runway information (slope and surface type), approach angle, obstacle height, braking μ, residual thrust | Calculate landing speeds, VCLmax, Vref, $V_{TD}$ Calculate four distances; initial descent from obstacle clearance to start of round-out, round-out, flare, and ground roll. Round-out uses an $N_Z$ value to determine vertical, and horizontal round-out distance. | Approach, round-out, flare, and braking (ground roll) distances. Time, energy, and fuel used. generator run time. |

Note that the flight path optimization (such as that performed by the FPOP, and as described herein) depends on parameters which affect aircraft efficiency and cost; these vary significantly between conventional and hybrid platforms as shown in the table below.

In some embodiments, an optimization process may be conducted in order to generate path or other heuristics for the FPOP Flight path generator, as described herein. Below is a table containing information regarding differences in the optimization process between that which might be per-

| Parameter | Hybrid-Electric | Conventional |
| --- | --- | --- |
| Cost of fuel | Cost of fuel + battery depreciation + charging energy | Linear function of fuel consumed |
| Total flight energy | Fuel (kWh equivalent) + battery charging energy (kWh) | Fuel consumed (kWh equivalent) |
| Propulsion energy efficiency | Range extending generator efficiency may depend on altitude, speed, or may be independent of both. Stored energy efficiency may depend on state of charge, and discharge rate Propulsor efficiency function primarily of speed | Engine efficiency coupled tightly with propulsor efficiency Combination are function of speed, altitude |
| Cost of engine maintenance | Linear function of run time (constant power output, and not equal to flight time) | Varies from simple function of operating time (same as flight time), to comprehensive function of number of power cycles and time weighted by hot section temperature. |
| Optimum cruise speed for a fixed altitude | Function of two distinct operating parameters: Aerodynamic and propulsor efficiency Total energy required, P*t (where t = d/V) and total energy available ($P_{gen}*t + E_{storage}$) The first is a function of weight and speed and easily calculable for any given weight. The second however is specific to the exact energy state and range requirement of the current flight. For any given weight, and altitude, optimum speed changes with energy state and range. | Function of Velocity and/or Mach, and weight. For a given weight, and altitude, there is a single, minimum energy cruise speed |
| Optimal cruise altitude | Function of range, stored energy, flight mode, and range extending generator power with altitude | Highest altitude which can be reached given the range | formed for the inventive hybrid-electric regional air transportation system and that which might be used for a conventional aircraft and transportation system.

tion, total weight, etc.). The figure shows a graphical example of the flight path optimization process in cross section, and thus only an altitude profile as a function of

| Optimization Process | Hybrid-Electric | Conventional |
|---|---|---|
| Objective function | Objective function may be based around the "cost function" $C_E/C_T$ (cost of energy/cost of time) Cost of Energy includes fuel burned in range extending generators, battery charging energy and battery depreciation. "Cost of Time" includes all non-fuel costs including maintenance (engine, airframe), crew, depreciation (airframe), and any other costs directly related to flight time (e.g: insurance). May also include externalities such as emissions costs | Objective function is based around the "cost function" typically $C_F/C_T$ (cost of fuel/cost of time) "Cost of Time" includes all non-fuel costs including maintenance (engine, airframe), crew, depreciation (airframe), and any other costs directly related to flight time (e.g: insurance). |
| Altitude Vs. efficiency in optimization | Efficiency weak function of altitude. Typical altitudes 6,000-25,000 ft Optimizer selecting altitude for speed, not efficiency. Climb speeds default to higher values (shallower climb) regardless of Flight mode ($C_F/C_T$) to improve average speed w/out efficiency penalty; Optimizer balances cost of time with efficiency of stored energy utilization (which decreases at high discharge rates), and any sensitivity of range extending generator efficiency to altitude. Maximum altitude limited either by range, range extending generator power available, or aircraft ceiling Optimizing for minimum energy will result in a flight at speeds close to aerodynamic best Lift/Drag, with minimum possible range extending generator usage. Optimizing for maximum speed will result in a low angle climb to the maximum altitude at which full generation is available, with continuous range extending generator usage from takeoff through end of cruise. | Efficiency strong function of altitude (increases with altitude). Typical operating altitudes from 25,000 to 40,000 ft (turboprop, regional jet). Over regional ranges, optimizer is forced to trade efficiency (lower fuel burn) for speed depending on value of $C_F/C_T$ A high $C_F/C_T$ minimizes fuel burn, results in a steeper climb at a slower speed to the highest altitude possible for the given range to minimize fuel burn, and a flight idle descent to maximize time spent at cruise altitude. A low value for $C_F/C_T$ minimizes total time, results in a higher climb speed, lower climb angle, lower cruise altitude, and earlier, powered descent to maximize average speed. |
| Calculation of best speeds | For a given altitude, weight, and range, best efficiency results in full depletion of the stored energy sources by the end of cruise. Increasing $C_T$ increases range extending generator usage time up to the full cruise segment (maximum cruise speed) For a given altitude, cruise speed is a function aerodynamic efficiency, energy and power available, and objective function. Range extending generator power is typically constant up to a limit altitude, and then decreases; this may reduce the altitude for maximum speed in cruise This combination of weak altitude sensitivity to efficiency, multiple energy sources of varying properties and utilization rates, and discontinuous range extending generator properties with respect to time and/or altitude results in highly coupled, discontinuous optimization space which is not compatible with closed form integration or linear optimization solvers, requiring instead a nonlinear method (e.g: Neldor-Mead) coupled with flight simulation This level of optimization would be prohibitive as a standard flight function Instead, heuristics are generated prior to flight, which determines an optimal path and energy plan starting point for no-wind operations. | For a given altitude and weight, best efficiency cruise speed is an easily calculated, single value minimum between aerodynamic and engine efficiencies Aircraft total energy is a continuous function of aircraft state (potential + kinetic) and fuel burned. This combination of first order, continuous dependencies allow optimization for best cruise altitude with a range constraint with standard optimization techniques, such as energy minimization. Cruise altitude then determines best cruise speed and total energy required (fuel burn). |

Figure 13:
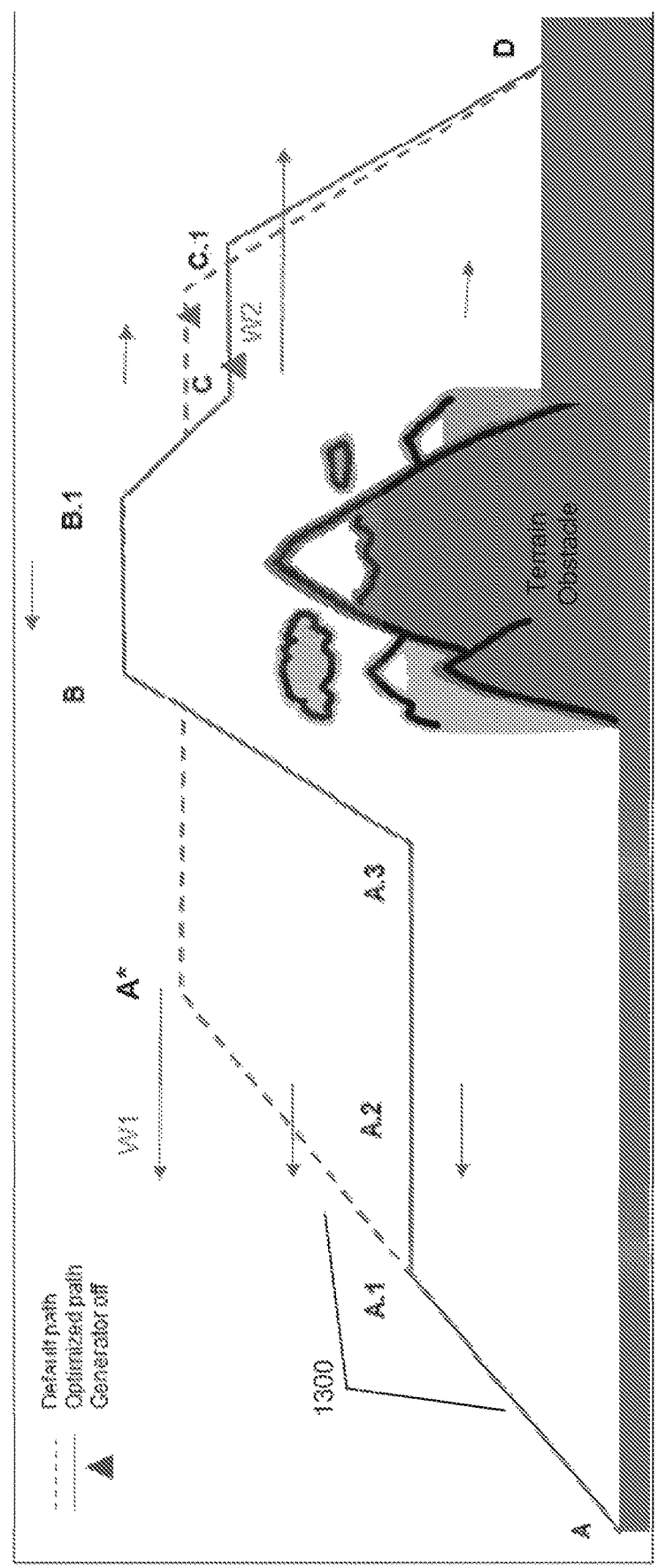
FIG. 13 is a diagram illustrating an example flight path optimization for an aircraft that may be generated by the Flight Path Optimization Platform (FPOP) and used at least in part to control the operation of the aircraft in an embodiment of the inventive regional air transportation system.

FIG. 13 is a diagram illustrating an example flight path optimization for an aircraft that may be generated by the Flight Path Optimization Platform (FPOP) and used at least in part to control the operation of the aircraft in an embodiment of the inventive regional air transportation system. As shown in the figure, a flight path 1300 may be composed of one or more segments (such as those identified by "A", "A.1", "B", "C", "D", etc. in the figure), where each segment may require a specific configuration of the aircraft and control systems in order to be properly implemented (e.g., subject to the constraints placed on the operation of the aircraft by travel distance, fuel (energy) level, fuel consumption, total weight, etc.). The figure shows a graphical example of the flight path optimization process in cross section, and thus only an altitude profile as a function of distance. In this example, the default flight path 1300 is a single origin, single destination path, which is broken into multiple segments by the Path Generation module/function of the FPOP.

The initial path (represented by the dashed line) produced by the Path Generation process of the FPOP module is based on the origin (A), destination (D), and the altitude constraint for the terrain obstacle. This default path results in an initial climb (the segment A to A*), a cruise mode (the segment A* to B) at an optimal no-wind altitude, a segment at higher altitude to clear the obstacle (B to B.1), a return to optimal cruise altitude when the obstacle constraint is removed (the segment B.1 to C) and cruise until the top of the descent point (the segment C to C.1), followed by the descent to landing (the segment C.1 to D). The path generation process uses the climb and descent rates to determine the intermediate points of the flight path (i.e., A.1, B.1, and C.1). Note that optimal climb and descent rates, cruise altitudes and speeds, and the generator off point (indicated by the triangle between points C and C.1) are determined by the Flight Mode and range. For example, a "high speed" mode over a medium range results in a best rate climb to the maximum altitude which allows peak generation power, with range extending generators on for all cruise, whereas an economy mode, over the same distance, may cruise more slowly, at a lower altitude, and range extending generator shuts down partway through cruise, completing the flight on stored energy alone. This path is provided to the Energy Optimization module, and then to the Path Evaluation module of the FPOP.

Returning to the example optimization process illustrated in FIG. 13, in some embodiments (and as suggested by FIG. 14), in a typical optimization process, an Environment Evaluation module/function 1412 checks the Weather Index 1403 and Caution Index 1405 for the potential cruise segments and determines whether further optimization should be performed based on the wind velocities, changes in wind direction or speed, etc. (as indicated by the "Yes" or "No" branch of the "Refine Path?" decision step 1415 of FIG. 14):

Breakpoint Generator 1414 first determines whether the existing cruise legs (i.e., A, B and C), need additional subdivision based on wind gradients; in this case, the answer is no, as the wind is consistent on each leg (as suggested by the wind speeds W1 and W2 shown in FIG. 13);

Alternate flight paths generator module 1413 varies the altitudes at A.1, B, and C, which modifies the locations of points A.3, B.1, C and C.1 of the flight path; note that there are a limited number of feasible variations because aircraft regulations require cruise to occur at incremental altitudes (e.g., every 2,000 ft in the US). The lower bound for a cruising altitude is set by the minimum route altitude (the MEA, defined by the terrain and airspace), while the upper bound is set by aircraft performance capabilities. The result of this variation process is a set of potential flight paths;

Each potential flight path is analyzed by the Flight Path Optimization module 1408 by implementing a flight simulation process to find the lowest energy usage for that path; and Path Evaluation module 1402 is used to rank the paths and return both the default path(s) and the path(s) which minimized the objective function.

In this example (as compared to the default flight path 1300 shown in FIG. 13), Path Optimization module 1408 decreases the initial altitude to the lower limit to avoid the head wind, moving back the location of A.3 to ensure sufficient distance to climb to B for clearance of the terrain obstacle. The altitude at B doesn't change, but after the obstacle is cleared, a lower cruise altitude at C takes advantage of a tailwind, and the top of descent point (C.1) is delayed as long as possible to utilize the tailwind. The reduced energy usage on the initial segment allows the generator to be shut down earlier (as suggested by the triangle nearer to point C in the figure).

The Table below shows each waypoint in the optimized path, the source of the intermediate waypoints, the desired altitudes and speed(s) for each leg, and how the optimization process modified the original default flight path. In the table, the speed and/or altitude of the A.2, B, B.1, and C waypoints have been optimized. The table also lists how the speeds are determined for each leg; note that legs which have been optimized for altitude have also been optimized for speed.

| ID | Name | Source | Speed | Constraint | Altitude |
|---|---|---|---|---|---|
| A | Departure point | Flight Track | n/a | Fixed | Fixed |
| A.1 | Top of initial climb | Calculated | Calculated by rule | Minimum | A.2 |
| A.2 | First cruise leg | Calculated | Optimized for Flight mode | Minimum | Optimized to lower altitude to avoid the strong headwind (W1) |
| A.3 | Start of second climb | Calculated from constraint at (B) | Calculated by rule | Minimum | A.2 |
| B | Cruise waypoint | Flight Track | Optimized for Flight mode | Minimum | Constrained by minimum altitude required to clear terrain |
| B.1 | Cruise waypoint | Flight Track | (B) | Minimum | (B) |
| C | Start 3$^{rd}$ cruise leg | Calculated from descent distance | Optimized for Flight mode | Minimum | Optimized to altitude that delivers best combination of tail wind (W2) and range extending generator efficiency. |
| C.1 | Start of descent | Calculated from based on zero net-thrust (D) | Calculated by rule for zero-thrust descent | Minimum | (C) |
| D | Arrival point | Flight Track | n/a | Fixed | Fixed |

As noted, flight path planning for a regional hybrid-electric aircraft with multiple power sources requires more complex trade-offs than a conventional aircraft over long ranges. For instance, optimal flight altitude is determined by a combination of speed versus efficiency objective, flight distance, weather aloft, aircraft aerodynamics, available energy and relative energy storage versus range extending generator or alternate power source usage. The FPOP processes enable this optimization both pre-flight and during flight as conditions change, to determine the optimal flight path or paths.

As described herein, in some embodiments the FPOP platform or system for a hybrid-electric aircraft may have the following characteristics and/or perform the indicated functions:

Generates one or more Flight path(s), optimized for the Flight mode, and which meet both aircraft and environmental constraints (e.g., final energy state, and airspace limitations). A determined or revised Flight path may be uploaded to the FMS (shown in FIGS. 3 and 4) to be executed by a pilot or autopilot;

Flight planning for a regional hybrid-electric aircraft with multiple energy sources requires more complex trade-offs than a conventional aircraft, and is also more critical to flight safety due to the complexity of using multi-source energy reserves. Aircraft performance over a mission is inherently nonlinear and typically approached with some level of dynamic programming (e.g. simulation), coupled with an optimization method, for example an energy method to minimize total flight energy. Hybrid-electric performance entails additional levels of complexity in that energy contributions are from multiple sources, which are physically distinct (either an energy source, or a power source), which may not be continuous with respect to time, or cost over the flight. This results in a complex optimization process not addressed by conventional flight path planning;

As described, the Flight Path Optimization Platform (FPOP) for hybrid-electric powertrains typically uses a two-step process; (1) Flight path definition to set the overall flight profile including cruise altitudes, followed by (2) optimization in the current operating environment.

Flight path definition may occur on one or two levels depending on the environmental conditions:

Level 1: Initial definition of a 3D Flight path using heuristics which provide the optimal altitudes, cruise speeds, and Energy plan for the desired range and Flight mode. If the flight environment is relatively simple (low winds, no cautions or hazards), then Level 1 is typically sufficient;

Level 2: Invoked to generate alternate paths when wind or cautions adversely affect the Level 1 path. Varies the altitude(s) of the Level 1 Flight path cruise segment(s) to generate a set of modified paths.

An optimization is performed on each Flight path by adjusting cruise speeds and the Energy plan (Power ratio) to minimize an objective function within constraints, while taking into account the current operating environment (weather, and aircraft state). Results are the Air path, Energy plan, and value of the objective function. In the case of multiple Flight paths, the path with the minimum objective function is returned as optimum.

Compared to conventional aircraft operating on long haul flights, the regional, hybrid-electric aircraft flight profile has many more options for speeds and altitudes, and is significantly more complicated due to the use of multiple energy sources which respond differently to altitude and power demands, and have different costs. As part of this innovation the inventors recognized that conventional aircraft flight planning is inadequate to provide safe, efficient flight paths for hybrid-electric aircraft, and that this capability must be provided to ensure flight safety and reduce pilot workload. The implementation of the inventive FPOP platform/system is based on the recognition by the inventors of the differences between operating and optimizing hybrid-electric powertrains and those of conventional aircraft. These differences or distinguishing characteristics include:

Conventional, long haul aircraft use a limited set of prescribed climb and descent profiles and cruise at altitudes between 31,000 and 40,000 ft. Cruise altitude is easily determined from winds aloft and air traffic requirements, and "optimization" is generally little more than an adjustment to speeds to adjust for the price of fuel;

Regional aircraft spend a much higher fraction of the flight path/time in climb and descent, and cruise altitudes vary widely depending on range, weather, terrain, and air traffic control. Even so, for conventional aircraft in regional operations, the best cruise efficiency typically relies on climbing to the highest altitude practical given the cruise range;

Energy planning in conventional aircraft is typically the process of ensuring that more fuel is available than is required for the flight. Fuel burn is calculated from the planned flight segments and the required reserves (expressed as time, or time+diversion to alternate). Calculations are made by the pilot or FMS using a system of table lookups accounting for aircraft weight, cruise altitude and speed;

Cruise speed is chosen between a high speed cruise (maximum power), or a long range cruise (best economy) depending on cost of time and fuel available;

Conventional aircraft engines lose power with altitude, and even a "full-power" (i.e. full throttle) flight will not exhaust fuel reserves too quickly; and Conventional flight path optimization is typically based on a simple ratio of Fuel Cost to operating costs. For example, some aircraft manufacturers call this the "cost index", a single number set by the operator, which the aircraft FMS uses to set the climb speed, cruise speed, and top of descent point.

In contrast, hybrid-electric regional aircraft are efficient across a wide range of altitudes, have cruise speeds determined by energy, not power available, and have a more complicated total cost vs. energy cost:

Cruise altitude primarily affects speed, and power source/range extending generator power available (which affects range for a given speed). With much smaller changes in efficiency; an optimizer will choose higher altitudes for speed (minimize total cost), over energy efficiency (the opposite of conventional flight planning).

Energy planning is significantly complicated by dual/multiple energy sources with different operating properties:

a. Stored energy provides a wide range of power, independent of altitude or speed, but with relatively limited amounts of energy. Stored energy may suffer efficiency losses as a function of power output, effectively reducing the amount of stored energy when operating at high discharge rates;

b. Range extending generator provides constant power, with total energy limited by fuel available. Range extending generator power and efficiency may change with altitude; and c. Reserve energy must be specified for each source, sufficient to ensure that safe flight can be maintained at all times.

Cruise speeds range from maximum energy (total of stored energy available for cruise+generation*time), which is a function of range, and minimum energy; cruise speed is set to match a target future energy state.

Electric propulsion does not lose power with altitude; a pilot continuing to fly at maximum power at high altitude will incur a much more rapid depletion of stored energy than a conventional pilot would expect.

Flight path optimization trades total costs of energy and power (stored energy costs+generation costs) against operating costs. Differences in cost of stored vs. generated energy extends the basic optimization to include energy sourcing optimization (e.g., the POCS Hybrid energy planner function).

As part of creating the inventive aircraft and regional transportation system, the inventors have developed a process or set of processes for the design and optimization of forward compatible hybrid-electric aircraft. The design process includes sizing of powertrain components, propulsion integration, wing sizing, and noise reduction which collectively result in an aircraft with 60-80% reductions in direct operating costs, 20-30% shorter runway capabilities, and 15-25 EPNdB lower noise than conventional aircraft. Moreover, forward compatibility ensures the aircraft can accommodate future EV/Hybrid technologies via relatively simple upgrades of specific powertrain modules. As a result, an embodiment of the inventive aircraft is expected to remain competitive over the target life of the airframe, offering improved performance and decreasing costs with module upgrades. In addition, the same or similar process can be used to develop aircraft variants with varying performance tailored to specific markets (via a choice of powertrain modules without any change to the external airframe or propulsors). This enables the development of aircraft optimized to specific markets with minimal engineering and re-certification requirements. This set of design and optimization concepts and processes for aircraft that may be utilized as part of the inventive regional air transport system will be described in further detail with reference to FIGS. 15 and 16. Note that conventional aircraft design processes are not able to size the hybrid-electric powertrain components, ensure the aircraft and powertrain stays abreast of rapidly improving EV/Hybrid technologies, or fully leverage the unique benefits of electric propulsion, including breakthrough efficiency, short take-off and landing capabilities and low noise operation.

Figure 15:
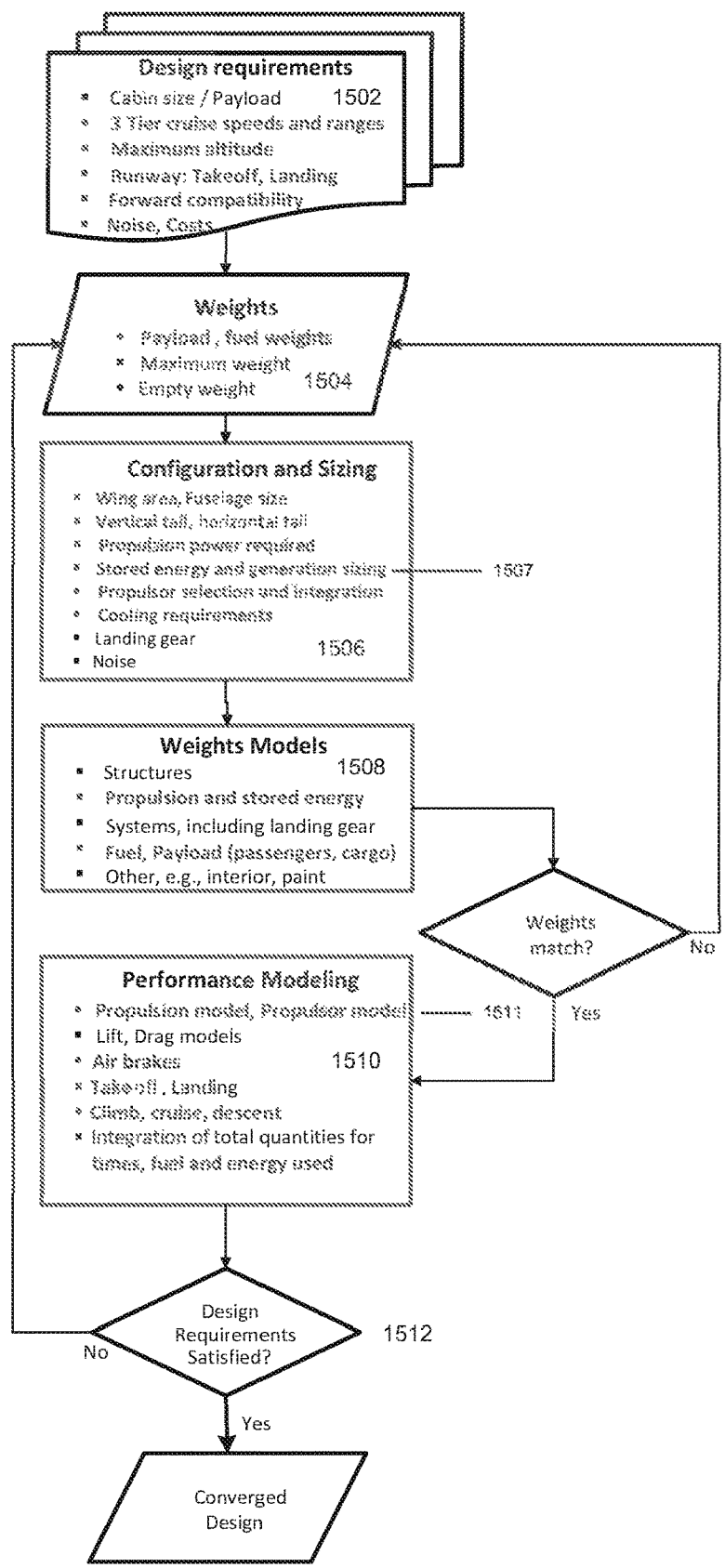
FIG. 15 is a flow chart or flow diagram illustrating a hybrid-electric aircraft design process that may be used in implementing an embodiment of the inventive air transportation system.

FIG. 15 is a flow chart or flow diagram illustrating a hybrid-electric aircraft design process that may be used in implementing an embodiment of the inventive air transportation system. In some ways, the overall flow is similar to conventional aircraft design, but certain steps (those shown bolded) are either modified or entirely unique to the hybrid-electric design process. A table below provides a description of each of these changed steps, with a comparison to the conventional process.

The flow chart of FIG. 15 illustrates the primary components in the inventive aircraft design cycle. Aircraft design is a highly iterative process because of the interdependence of the key design parameters of weights (payload, fuel and aircraft), propulsion power, and key structural sizing (wing, empennage, landing gear, etc.). Note that the operations or processes shown bolded are those significantly impacted by the hybrid-electric powertrain and its use as part of the inventive regional air transportation system:

1. The design process starts with top level design requirements including payload, cabin size, the cruise speed and range, maximum altitude, the takeoff and landing runway performance, and, the noise and cost requirements (step or stage 1502);
2. Weight is the single most important driver in aircraft design. Maximum weight directly affects required engine power, wing size, and structural weight, as well as cruise power (energy) required. Each design cycle starts with an update to weights (step or stage 1504);
3. Based on maximum weight, the aircraft wing and tail areas are sized, and a rough performance analysis is used to determine required propulsion power, and energy capacity to meet range and speed requirements. The aircraft configuration is also laid out for location of major components, wing, tail, landing gear etc. (step or stage 1506);
   a. Unique to the hybrid vehicle is powertrain component sizing, taking into account the amount of stored energy and generation power capacity (step or stage 1507). The 3-tier design process described herein uses ranges and speeds, in combination with cost, to provide the requirements and constraints needed for this function;
4. From the sizing and configuration, weights can be built up from a series of models and component weights (step or stage 1508). For example, wing parametric weights take into account thickness, span, area, sweep, and taper to estimate typical weights from the geometry, while engines and landing gear are typically fixed, component weights provided by the supplier;
5. The sum of all aircraft weights results in the empty weight; if empty+payload+fuel+stored energy weight exceeds the maximum weight, then the relevant portions of the design process will be performed again with updated weights;
6. Performance modeling (step or stage 1510) is now used to estimate aircraft performance; this involves application of the representative aerodynamic and propulsion models using the weights, configuration, and powertrain information developed from the sizing steps;
7. Note that hybrid-electric propulsion requires two independent models; one for the propulsor, one for the powertrain (step or stage 1511);
   a. The propulsor model combines the motor sized in step (3), with the aerodynamic characteristics of the propulsor (e.g, the propeller) to calculate power required for a specified thrust level; and
   b. The propulsor model determines the thrust available based on the powertrain model and includes the stored energy units and generator. The powertrain model determines maximum power available, and, for a given power requirement, the ratio of storage to generation, storage discharge rate and range extending generator fuel burn.
8. Lift and drag models are based on the geometry of the configuration (step 3) and enable performance calculations in various configurations, including cruise, take off, landing, flaps up, and down, landing gear up, and down, speed brake deployed, etc. Note that electric propulsors may be used with regenerative braking to replace conventional spoilers;
9. Performance modeling employs physics based models which may include numerical approximations, and time stepping methods to calculate the time, fuel, energy, distance, and altitude change for each step;
   a. The performance models may be modified from conventional versions to control and track both propulsor and powertrain models. This includes controlling generator on/off, and tracking fuel burn and run time, and stored energy usage; and
   b. Costs may be calculated by applying the performance model to a representative flight path, and applying cost values to the integrated totals of times, fuel burn, and stored energy used.
10. Performance is now checked against design requirements; deficiencies will require design changes, and another design cycle (step or stage 1512).

The table below provides a description of certain of the changes to a conventional aircraft design process that were developed by the inventors for a hybrid-electric design process, along with a comparison to the conventional process.

| Area | Hybrid-Electric process | Conventional process |
|---|---|---|
| Cruise range, and speed | Define a three tiered set of ranges and speeds:<br>A: range and speed the aircraft can fly on stored energy alone, range extending generator needed only to meet reserve requirements.<br>B: Optimal speed hybrid range which fully depletes stored energy in combination with range extending generators. Also defines minimum cruise speed when flying to the full distance.<br>C: extended range primarily using range extending generators and flown at lower speeds<br>Define maximum cruise speed | Define a maximum range requirement to be met at long range cruise speed.<br>Define maximum cruise speed |
| Forward compatibility | Define a set of expected changes in powertrain components over the aircraft lifespan. Includes improvements in energy storage, power generation, and propulsion motors.<br>Three tier range and speed requirements re-defined at these future technology levels<br>Net result is an "envelope" of design requirements covering current and future ranges and speeds. | Not considered. |
| Cost | Cost requirements specified in the 3-tier process used for speeds and ranges including forward compatibility, for example:<br>A: minimum cost, up to 80% reduction over conventional.<br>B: 60-70% lower DOC than conventional aircraft<br>C: 30-60% lower DOC<br>DOC reduction is maximized on shorter flights, the opposite of conventional | Cost requirements based on evolutionary improvement over existing aircraft with small changes in several areas<br>Costs increase at shorter ranges. |
| Range Vs. Payload | High fixed mass for energy storage, and low fuel burn in hybrid mode results in minimal range payload trade; instead these values were already captured:<br>Range with maximum payload is maximum hybrid range (B)<br>Absolute maximum range is the requirement for range (C). | The maximum sum of fuel weight and payload weight is a constant; this results in two cruise range requirements:<br>Range with maximum payload<br>Absolute maximum range as limited by fuel volume |
| Maximum altitude | Conventional propulsion limits do not apply since motor power available is not affected by altitude. Other physics limits may apply; for example voltage breakdown (corona) limits maximum voltage as a function of altitude<br>Barring physical limit, the designer must pick a rational ceiling based on intended cruise altitudes, and level of pressurization. | Maximum operating altitude limited by thrust lapse in conventional aircraft engines |
| Runway lengths | The selection of length is same as conventional. However, motor peak power capabilities substantially alter the takeoff design process allowing a shorter runway requirement than an equivalent conventional aircraft without compromise | Minimum runway length is selected to be the longest runway which still meets the target market requirements. |
| Weight Estimation | Same as conventional, however, for the payload fraction to be representative, payload weight includes all passengers, cargo, fuel, and energy storage weight | Top level estimation uses a representative payload mass fraction (PLF), typically between 0.55 and 0.6 for regional aircraft<br>W_total = W_Payload/(1-PLF)<br>Payload weight includes all passengers, cargo, and fuel<br>Initial fuel requirements are estimated from cruise range and average fuel burn per mile. |

-continued

| Area | Hybrid-Electric process | Conventional process |
| --- | --- | --- |
| Wing sizing, planform | Weighted multi-point optimization with constraints. Operating points are:<br>Hybrid cruise (multiple points for full range of time variant speeds)<br>C Cruise (generation only speed)<br>Constraints are:<br>Takeoff and landing distances (incl. balanced field requirements)<br>Continued flight on only energy storage or range extending generators alone. | Wing design optimized for cruise condition with constraints<br>Constraints: takeoff and landing distances (incl. balanced field requirements) |
| Vertical tail sizing | For a single propulsor, there is no change.<br>For a multiple-propulsor aircraft, vertical tail sized to meet directional control requirements during maximum motor emergency power after propulsor failure; this may be more rigorous than a standard engine-out failure due to the very high emergency power capability. The designer may need to trade emergency peak power benefits vs. vertical tail sizing. | For a multi-engine aircraft, vertical tail sized by engine out yaw requirement. Yaw moment depends on moment arm and drag coefficient of the failed engine in combination with thrust on the remaining engine(s). |
| Propulsion power required | Propulsion motors are sized independently of the powertrain. Minimum power output determined by:<br>Take off distance with maximum (routine) peak power<br>For a multi-engine aircraft: balanced field length, with benefit of emergency peak power.<br>Maximum cruise speed<br>Minimum climb rate<br>Power for systems is delivered by the powertrain, and does not affect thrust power available. | Engine(s) sized by the most demanding of three conditions:<br>Take off distance; and in case of a multi-engine aircraft, balanced field length.<br>Top of climb thrust sufficient to accelerate to cruise<br>Maximum cruise speed<br>The engines must be able to meet these conditions while providing the additional power needed for aircraft systems. |
| Powertrain component sizing | Range extending generator capacity (kW), and stored energy capacity (kWh) are sized as a system to meet the 3-Tier range and speed requirements including forward compatibility envelope. Performance analysis over standard flight profiles is needed to determine mission energy requirements for stored and range extending generator sources.<br>Minimum all-electric range (A)<br>Criteria may set stored energy minimum, and must be specified in conjunction with some minimum level of kW/kg storage density.<br>Minimum cruise speed to full hybrid range (B)<br>Jointly sizes range extending generator power and stored energy capacity to meet the speed-range requirements across forward compatible envelope. Ratio of storage to generation will either be sized by constraints or cost optimization.<br>Minimum cruise speed on range extending generators only (C)<br>Provides a minimum sizing constraint on power generation.<br>An additional safety constraint may also be applied as a requirement to be able to continue flight, including climbs, on either range extending generators, or energy storage units alone in case of partial system failure.<br>In all cases, the powertrain must supply not only the required propulsion energy, but also the energy for all aircraft systems including ECS, flight controls, landing gear, avionics, etc. | N/A; fuel volume set by range requirements. |
| Propulsion integration | High power density and high efficiency over a large range of power output levels allow the designer to potentially utilize numerous smaller motors as easily as one or two large ones. | Maximum efficiency requires using the minimum number and maximum size engines possible.<br>The monolithic nature of the engines results in an aircraft design and integration very tightly coupled to a specific engine with very few viable engine locations on the airframe. |
| Powertrain and energy storage integration | The hybrid electric powertrain is distributed and modular which requires sufficient space for energy storage devices, range extending generators, fuel tank(s), and all related power electronics. | Fuel system typically comprised of multiple wing tanks, and related plumbing to interconnect and cross feed tanks such that any engine can draw from any fuel tank. |

-continued

| Area | Hybrid-Electric process | Conventional process |
|---|---|---|
| Cooling | Batteries, power electronics, motors, and generation all generate significant levels of heat, which must be removed.<br>Heat generating systems may be embedded in the fuselage without ready access to cooling flow.<br>These heat loads vary dramatically by power output levels from near zero to over 7% of power output.<br>Cooling system should be designed to produce little or no drag across full range of thermal load | Engines and accessories are primary areas needing cooling, and are typically located in engine nacelles which have ready access to cooling flow. |
| Noise reduction | Electric motors, batteries inherently very quiet<br>Range extending generators integrated for noise reduction with compartment insulation, muffling etc.<br>Electric motors ideal for integration into a ducted fan specifically designed for low noise operation<br>Flexibility in propulsor integration allows more opportunities for noise reduction, by shielding propulsors over airframe structure, and/or keeping propulsor tip speeds low through gearing and/or motor design | Noise reduction options primarily rest with propulsion provider (including propeller if turboprop). |
| | Performance modeling assumes that a designer experienced in the art is using one or more performance methods to calculate aircraft performance in takeoff, climb, cruise, descent, landing, hold, etc. These methods may be empirical approximations, or may be time stepping integrations of the aircraft flight path. The following are changes required to a standard aircraft performance model to properly utilize, control, and track a hybrid-electric powertrain with electric propulsors. | |
| Propulsor and powertrain models | Separate models for thrust generation and power generation<br>Motor power available is only a function of electrical power available (I V) and is independent of altitude and airspeed. A simplified model may assume that the motor will put out full power when commanded, regardless of flight condition.<br>Thrust available is calculated from the combination of motor power available and the aerodynamic model for the propulsor (e.g. propeller or ducted fan).<br>Range extending generator power available may be function of altitude and/or speed. Fuel burn is function of range extending generators only.<br>Stored energy discharge rate calculated from power required less generation power.<br>Stored energy available is not a function of altitude or speed.<br>Stored energy model may need to address effect of discharge rate on energy discharge efficiency<br>Aircraft systems power is provided by the powertrain in addition to propulsion requirements.<br>Total power required is then the sum of propulsion power, systems power, and losses in transmission which are implementation specific and may be modelled as a set of efficiencies between power sources and motors.<br>Powertrain control includes range extending generator state (on/off/power level) either commanded or determined by rales of operation | Power and thrust generation typically unified in a single "engine model"<br>Engine power is a function of altitude, airspeed, temperature, and usually provided in large tabulated decks or compiled subroutines<br>Systems powers is pulled from the engines and usually included as part of the engine deck with no additional accounting needed. This includes overhead needed to run the engines such as fuel pumps.<br>No additional losses are incurred due to fuel distribution |
| Air Brakes | Regenerative braking provided by propulsors, no separate surface used, no thrust produced during regeneration.<br>Drag is a function of regeneration power extracted and aerodynamics of the propulsor in this mode. | Drag is produced by spoilers (aerodynamic surface) which may be used regardless of engine thrust.<br>Drag is a function of spoiler deflection angle and Mach number |
| Take off | Standard takeoff calculation is modified to include peak power (standard takeoff), and the very rapid application of emergency peak power following a detected propulsor failure. | For balanced field calculations on a multi-engine aircraft, there is limited or no thrust increase available on remaining engine(s) |
| Climb | Power commanded as % maximum (continuous), which doesn't change with altitude. Range extending generators may be used for any fraction of climb from 0-100%, including shutdown of generator at a specified energy state. | Power commanded as % available (continuous), which is a function of speed, altitude and temperature. |
| Cruise | Speed selected to provide desired level of energy storage depletion by end of cruise. Range extending generators may be used for any fraction of climb from 0-100%, including shutdown of generator at a specified energy state. | Speed selected cost and range requirements |

| Area | Hybrid-Electric process | Conventional process |
|---|---|---|
| Descent | Range extending generators off, propulsion thrust (and power) may be zero, or negative providing regeneration | Engines always on with minimum fuel burn and thrust, even at idle power |
| Flight totals | In addition to standard time and distance integration, hybrid-electric propulsion system requires tracking and integration of additional time and energy quantities<br>Energy storage units: discharge rate, total discharge, and remaining capacity. Also track energy from regeneration or charging from generator.<br>Range extending generators: fuel burn, run time, and power generated<br>Total energy consumed (including systems and propulsion)<br>Times to track include block time, flight time, range extending generator run time, and motor peak power application times. | Track time, distance, and fuel burn Engine time not usually tracked separately - same as block time. Total energy is the same as total fuel burn |

Figure 17:
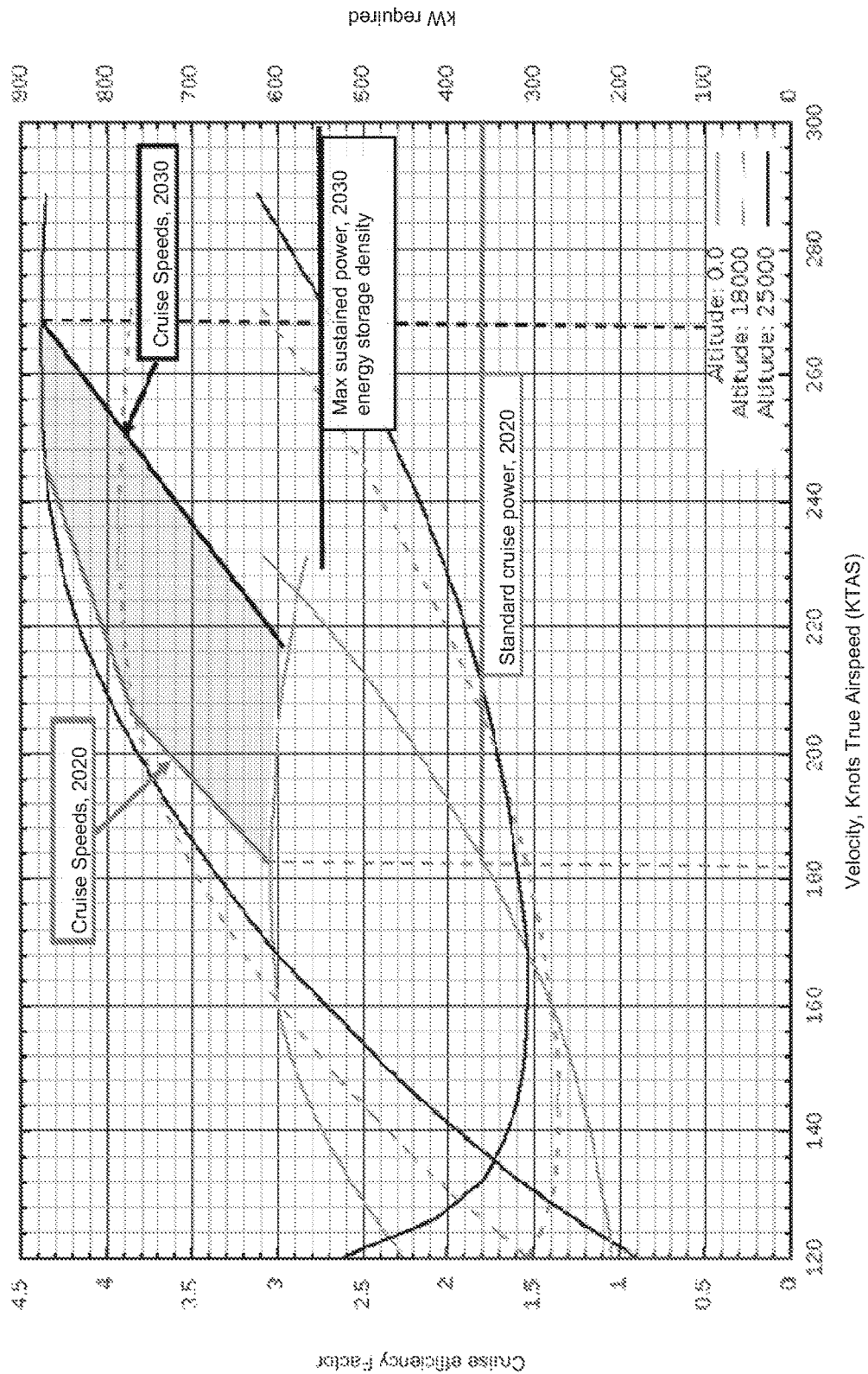
FIG. 17 is a diagram illustrating the efficiency of a certain aircraft and propulsor configuration as a function of flight altitude and required power.

Note that at least the following represent changes to a conventional aircraft design process that were developed by the inventors for a hybrid-electric design process:

Design requirements extended to enable sizing of key powertrain components in a way that ensures compatibility with EV technologies over the target life of the aircraft. This is accomplished with the mentioned 3-tier set of ranges and speeds for electric, hybrid, and extended cruise flight, specified across a range of future EV technologies. An example of this approach is shown in FIG. 17, with ranges and speeds for regional operations and three levels of powertrain technology, representing forecast performance 15-20 years into the future;

In contrast, conventional design requirements are typically for maximum speed and range targets, using a specific engine which will remain fixed for the life of the aircraft;

Wing design conditions and constraints extended to match the 3-tier ranges and speeds;

Wing design is a weighted multi-point optimization to account for variation across the 3-tier set of ranges and speeds, with maximum cruise efficiency at the optimal hybrid speed, and very good efficiency for climb, electric only, and extended range cruise speeds. Conventional wing design is typically focused on a narrowly defined long-range cruise condition;

Take-off performance is typically the constraint for minimum wing size, and this is somewhat mitigated by high peak power capacity from electric propulsion motors. Peak power may be applied to the balanced field sizing requirement, restoring much of the thrust lost after a propulsor failure, and dramatically reducing the "engine out" distance to climb. This results in a smaller, more efficient wing in cruise for a given runway requirement, and is not available with conventional engines which are limited to, at most, a 10% peak power increase for emergencies;

An additional minimum wing size constraint unique to hybrid-electric propulsion may be added to the design process, which is to ensure that flight operations may be safely continued after any one energy source failure, reducing powertrain output capacity;

Propulsion system sizing includes both thrust generation (propulsion motors) and hybrid-electric power generation (stored energy and generation power), whereas conventional approaches only size thrust generation;

Propulsion motors are typically sized by single-point performance criteria, the common three are take-off distance, top of climb performance, and maximum cruise speed. Electric motors affect these sizing points;

Take-off power can use a peak power significantly above maximum continuous for a limited period of time. This allows a smaller motor to meet the same take-off requirement;

Motors don't lapse (lose thrust) with increasing altitude; as a result, electric aircraft are rarely power limited at top of climb or in cruise; and This combination of features allows selection of a smaller motor, but this may leave the aircraft with less sustained climb rate than expected, leading to an additional sizing point of minimum sustained rate of climb.

Figure 16:
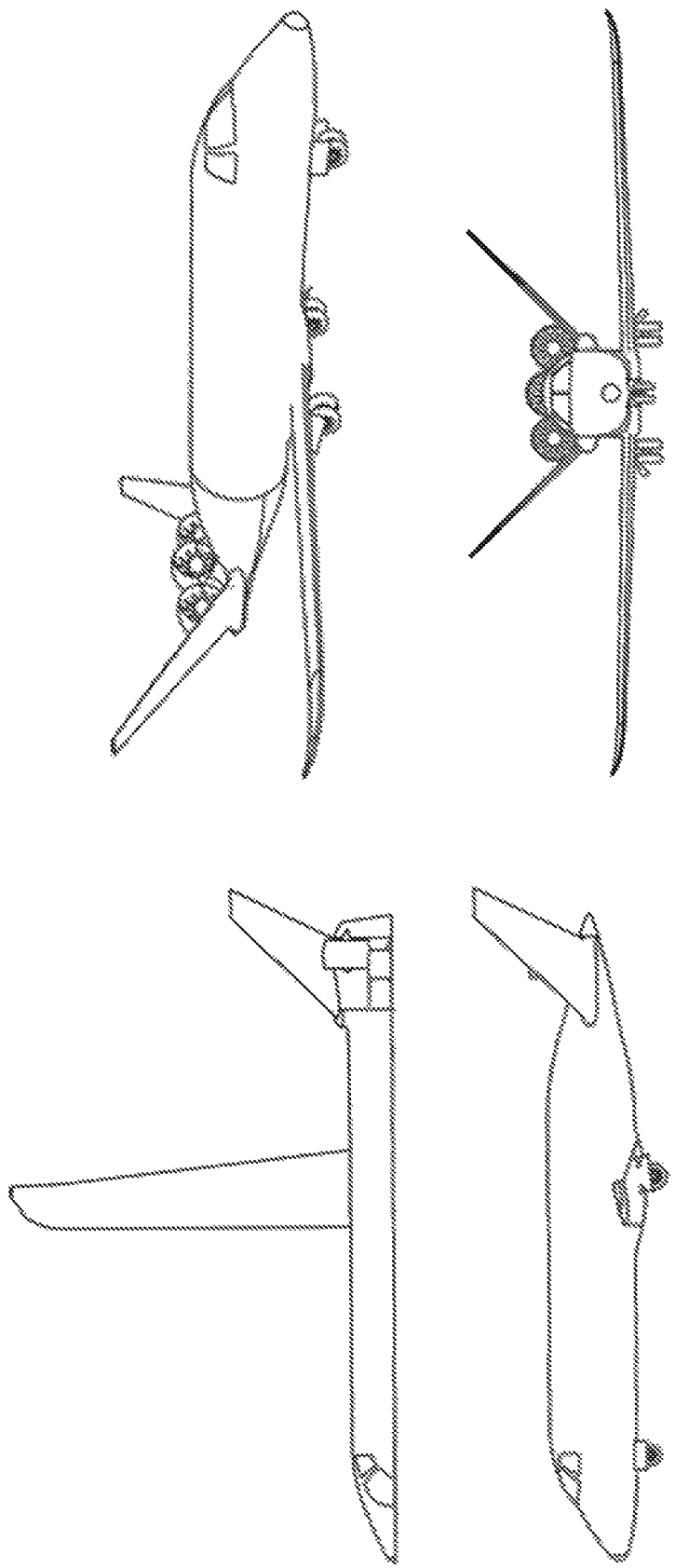
FIG. 16 is a diagram of an example of a hybrid-electric aircraft designed in accordance with the principles and processes described herein.

Hybrid powertrain output component sizing for stored energy and generation power cannot be performed based on point performance conditions. Instead, these are sized using performance modelling over a set of mission profiles defined by the 3-tier range and speed requirements, including future technology levels. Sizing is determined by minimizing an objective function, within constraints of system weight, volume, and minimum power available from either source for safety;

The objective function may include one or several of the terms below, with parameters defined by the operator: Example Objective function=Cost of fuel+Cost of stored energy+Cost of engine maintenance and reserves (amortized)+Cost of battery packs (amortized)+Cost of passenger and crew time+Cost of aircraft+Cost of emissions Electric propulsion integration separates the propulsion power available (motor) from the thrust producing propulsor (fan, propeller). The designer sizes motor power levels with an assumed efficiency, and then propulsors are designed to spec. This functional separation is enabled by electric motors operating at high efficiency regardless of size, and being easily integrated with propellers, rotors, ducted fans etc. In contrast, conventional propulsion engines are monolithic units of power and thrust generation combined, and once chosen, channel the aircraft design along the few viable paths for integration (e.g., commercial jets always have engines under the wings);

As an example, the embodiment shown in FIG. 16 features three ducted fans for low noise and enhanced take-off performance, with noise further reduced by shielding from fuselage and tail. Enhanced drag reduction is accomplished through clean, laminar wing, fuselage boundary layer ingestion, and shorter, lighter fuselage with wake fill-in from the ducted fans;

Propulsion models used in performance modelling are enhanced for the hybrid-electric design process to represent propulsion power and thrust, power generation from multiple sources, system efficiency losses, non-propulsive power being used, and the ability to store energy from regenerative braking. In contrast, conventional propulsion models are simpler, and typically represent an engine by providing thrust and fuel burn for the current flight condition;

Motor models used in the inventive system and methods provide power consumption as a function of torque, rpm, and controller losses. Models also represent motor capabilities for time limited peak power outputs;

Power generation models used in the inventive system and methods represent the properties of each source, and losses due to transmission and conversion. For example:
 Stored energy is not dependent on altitude or speed, and can put out a wide range of power levels; however, high discharge rates are inefficient, reducing the total energy available, and peak power output decreases as the stored energy level drops;
 Generated energy consumes fuel to provide power at a fixed level; in contrast, power and fuel efficiency are typically altitude dependent in conventional models; and
 Efficiency factors are specified for losses in power electronics and wiring;

A propulsion model may include the availability of regenerative braking, using the propulsors to recharge stored energy on descent, including the losses from motor and controller efficiency, power transmission and conversion, and stored energy charging efficiency;

Performance modelling methods are enhanced to separately control and track power output (and power generation). Conventional performance methods control engine power, and track fuel burn. With the hybrid-electric powertrain, the model controls motor power, range extending generator state (on/off/power output), stored energy power (charge or discharge), and tracks stored energy used, fuel burn, and range extending generator run time (which is different from flight time). These changes to the methods are needed to analyze hybrid-electric aircraft performance, and to use performance modelling for powertrain component sizing and optimization; and Performance modelling methods may be further enhanced to incorporate rules of powertrain operation such as "stored energy first", and "generation-off during descents".

The inventive range-optimized hybrid-electric aircraft which is designed for maximum efficiency in regional operation may incorporate one or more of the following features, techniques, aspects, or elements, which collectively enable a 60-80% lower DOC than conventional aircraft:
 Capacity of the energy storage units and the output of the range-extending generator are optimized for maximum efficiency over regional ranges. This results in 60-80% lower DOC than conventional aircraft, via stored energy units at 12-20% of maximum weight of the aircraft, and range-extending generators operating at less than 70% of maximum continuous output of the powertrain. This is in contrast to less efficient or practical designs for hybrid aircraft that are focused on longer ranges, and yield <30% reductions in DOC over conventional, based on lower stored energy capacities, and higher generator outputs;

Aircraft designed to minimize an objective function across the 3-tier requirements, primarily weighted for hybrid cruise requirements (B);
 the objective function may include one or several of the following terms, with parameters defined by the operator: Objective function=Cost of fuel+Cost of stored energy+Cost of engine maintenance and reserves (amortized)+Cost of battery packs (amortized)+Cost of passenger and crew time+Cost of aircraft+Cost of emissions;

The previously mentioned 3-tier set of speed and range design requirements is used for powertrain and aircraft design, an example of which is shown in FIG. 17. In one embodiment, these tiers are defined by:
 Range A: Highest efficiency (80+% lower DOC than conventional aircraft) and optimal speed over electric-only range.
 Range B: Intermediate efficiency (60-70% lower DOC than conventional aircraft) and optimal speed over larger hybrid range.
 Range C: Good efficiency (30-60% lower DOC than conventional aircraft) and lower speeds beyond to maximum range determined by onboard stored energy and fuel less safety reserves.

Figure 20:
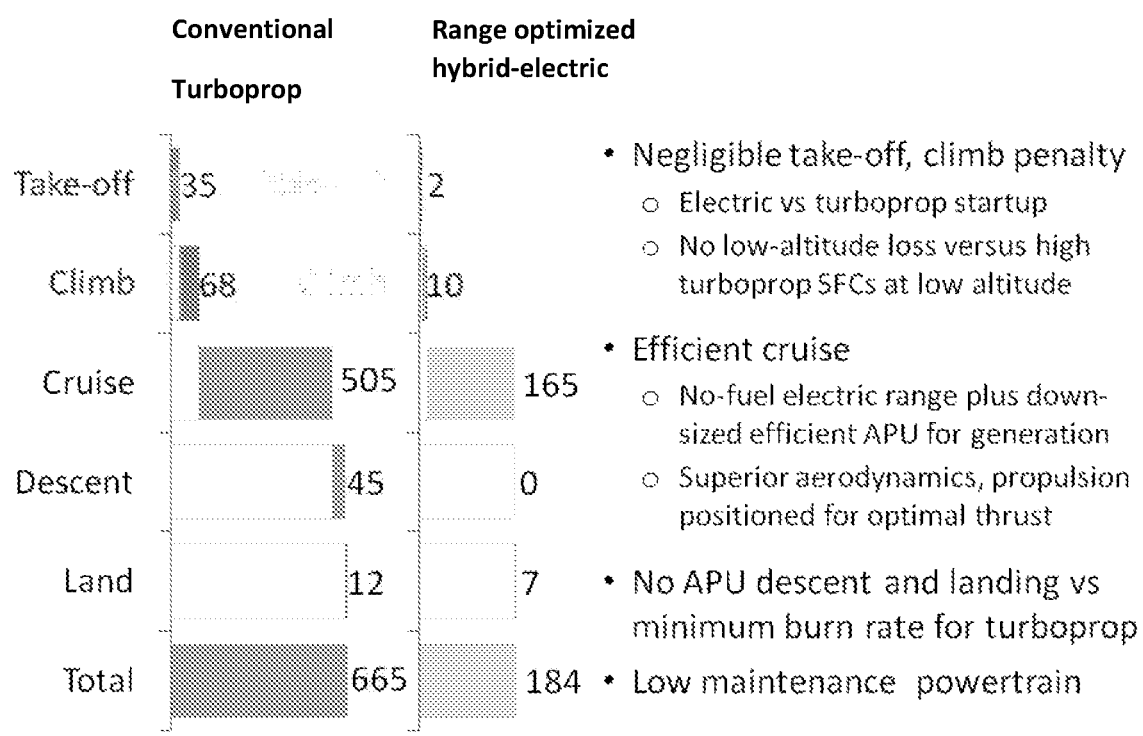
FIG. 20 is a diagram illustrating fuel burn by flight stage comparing a conventional turboprop with a hybrid-electric aircraft.

As an example of the inventive design process, FIG. 20 compares fuel burn between a conventional turboprop and a range optimized hybrid-electric for each phase of a regional flight. Note that the hybrid fuel burn is 72% lower than the turboprop for the full flight, with reductions of nearly 90% in take-off and climb, 67% in cruise, and 88% in descent and landing;

The inventive aircraft is designed for efficient operation at lower altitudes, with a target of a 50-90% lower fuel burn than conventional aircraft. As noted, regional operations typically involve a higher fraction of the flight time in climb or descent and low altitude cruise compared to conventional long range aircraft. This imposes a much greater emphasis on operational efficiency during these phases. Accordingly, the inventive hybrid-electric aircraft are designed for a 70-90% lower fuel burn in climbs and descents than conventional aircraft, and a 50-80% lower fuel burn in cruise at altitudes of 4,000 to 30,000 ft. and speeds of 150 to 400 mph, than conventional aircraft. In some embodiments, this is accomplished by one or more of the following:
 Propulsion by electric motors which deliver high efficiency independent of altitude or speed, and do not consume energy when not under load. In contrast, aircraft gas turbines suffer from 30-50% lower efficiency at lower altitudes and speeds, and require a minimal fuel burn even at flight idle;
 The aircraft is designed to maximize flight on stored energy units to extent possible, given the lower total cost relative to the range-extending generators. This translates into outstanding low altitude, low speed performance given stored energy units, e.g., battery packs, which offer very high conversion efficiencies that are independent of altitude or speed. This is in contrast to aircraft engines wherein fuel efficiency is highly altitude and speed dependent;

The pairing of the propulsion motors with low pressure variable-pitch propellers or ducted fans that are designed for high efficiency across a range of low and intermediate speeds (e.g., 150-300 mph) typical of regional operations. In particular, these provide far greater efficiency in climb, or low altitude cruise than a conventional turbofan;

The aircraft is designed for very high efficiency during near airport operations, e.g., taxi, takeoff, approach, landing, with a target of a >90% reduction in fuel burn compared to conventional aircraft operating in these modes;

Taxi, approach and landing are designed to be electric-only, utilizing the highly efficient stored energy units. Unlike the necessary minimum fuel burn of aircraft gas turbines, hybrid-electric aircraft consume no fuel in these phases given that the generator is switched off;

Descents designed to be flown at zero energy, with generators turned off, unlike conventional aircraft engines which require sustaining fuel burn at idle;

Steeper descents are enabled by regenerative braking of the electric propulsors, enabling energy recovery, unlike the use of drag producing devices such as spoilers in conventional aircraft; and Take-off uses a combination of stored energy units and generators, translating to much lower fuel burn than conventional aircraft;

The aircraft is designed for quiet, short take-off and landing (STOL) operations with 15-25 EPNdB lower noise of operation, and requiring runways 20-30% shorter than conventional aircraft, both with minimal impact on cruise efficiency;

The aircraft is designed for 15-25 EPNdB lower noise as measured by standard CFR 14 part 36 criteria. This is accomplished by design to limit and suppress noise generation across the three primary sources of aircraft noise; power generation, thrust generation, and airframe:

Power generation noise is reduced significantly given the use of electric propulsion motors, and energy storage units which produce no significant noise. Meanwhile, the range-extending generator is down-sized to <70% of maximum continuous power and integrated in a noise insulated chamber within the airframe, e.g., embedded in the rear fuselage;

Thrust generation noise is reduced significantly by the use of low-noise variable-pitch propulsors, such as low RPM, quiet propellers, or variable-pitch ducted fans. In addition, propulsors may be integrated in the airframe in ways that shield noise from propagating to the ground, e.g., using aircraft wings, fuselage, or empennage flight surfaces; and Airframe noise is reduced significantly via regenerative braking with the low-noise propulsors instead of conventional spoilers;

Aircraft operations may be optimized for further noise reduction by leveraging unique features of the hybrid-electric powertrain:

Quiet taxi, descent and landing on energy storage units, with generator switched off;

Take-off noise reduced with a shorter ground roll and steep angle climb-out over noise sensitive areas. This is enabled by the high peak power capability of the electric propulsion motors, and by use of a low-noise ducted fan for high static thrust; and Approach and landing noise are reduced by steep, controlled descents with regenerative braking, using the variable pitch electric propulsors;

The aircraft and associated flight operations are designed for use with 20-30% shorter runways than conventional aircraft by leveraging features of the hybrid-electric powertrain to accomplish this without the typical performance penalties. Similar STOL performance in conventional aircraft would require larger wings and engines, resulting in reduced efficiency and payload;

The design achieves a thrust boost during take-off by leveraging peak output capability of the electric propulsion motors, thereby enabling STOL operations without a need to upsize motors (e.g., a 20% boost over continuous output for 2-4 minutes during takeoff and initial climb);

The design achieves a shorter balanced field without larger wings or engines. "Balanced field" calculates maximum runway required following an engine failure during takeoff, and balances the distance required to either stop on the runway, or continue the takeoff on the remaining engines up to an obstacle clearance height (FAA standards are 35 or 50 ft). Balanced field (and hence required runway) is dominated by rate of climb on the remaining engine(s); as part of the innovative system, climb distance following a failure is dramatically reduced by boosting surviving propulsors up to 200% in the event of a partial or complete failure, and stopping distance is reduced by rapidly dropping thrust to zero or negative (thrust reverse). Detection of failures and the boosting of thrust to compensate are managed automatically by the inventive powertrain optimization and control system (POCS). Similar thrust over-boost systems in conventional aircraft are limited to <10% boost, while stopping distances are hindered by spool-down time and thrust residuals on surviving engines;

In the event of a partial or complete failure of a propulsor, e.g., due to a bird strike, or loss of one or more propulsor motors in flight, the POCS boosts power to the surviving propulsors to compensate for a limited period, thereby enabling an extended reaction time window for the pilot to take corrective action, and providing safe descent to a nearby airport or landing area;

Unlike the limited boost capabilities of conventional aircraft engines, electric propulsion motors can boost up to 200% of continuous power for limited time periods, typically determined by the system's thermal limits; and Variable-pitch propulsors coupled with electric motors enable very quick reduction of thrust to zero, translating to shorter stopping distances than aircraft gas turbines given spool-down time and thrust residual effects.

As mentioned herein, the inventive aircraft and design process are intended to provide forward compatibility across the airframe, powertrain and propulsion system(s). This is accomplished by incorporation of several underlying principles or design guidelines:

The aircraft is designed to accommodate upgrades to future EV technologies over the life of the airframe, including improved flight performance enabled by the upgrades. Given the rapid evolution of EV technologies, this feature ensures the aircraft remains competitive over time as technologies improve (e.g., batteries, supercapacitors, electric motors, internal combustion engines, fuel cells, etc.). In addition, this feature enables the aircraft to transition smoothly from hybrid-electric to all-electric once energy storage technologies improve to the point where range-extending generators are no longer required. The ability to upgrade components of a hybrid-electric powertrain for step-change performance improvement is unique to the inventive hybrid-electric aircraft, and a contrast to conventional aircraft which have largely monolithic engines;

To ensure forward compatibility, the inventive hybrid-electric aircraft are designed at multiple points, with a powertrain sized for speed and the 3-tier range requirements (A), (B) and (C) noted, but are based on technologies available at aircraft launch and forecast to be available over its target life (including a potential transition from hybrid-electric to all-electric for some designs). This leads to a forecast for the onboard powertrain, and in turn, determines performance characteristics over time, such as speeds, electric and hybrid-ranges and operating costs (with the expectation of electric-ranges increasing and operating costs decreasing as technologies improve);

Aircraft are designed for multiple discrete powertrains, reflecting forecast upgrades to improved EV technologies over the target design. For instance, these could include energy storage densities changing from 300 to 1,200 Wh/kg, motor power densities from 4.5 to 10 kW/kg, and internal combustion engine power densities from 1 to 5 kW/kg. The aircraft design cycle is repeated for each of the discrete powertrains, by adjusting the 3-tier range and speed requirements for the progressively improving EV technologies;

In the example shown in the table below, each row represents a discrete powertrain based on EV technologies available at a point in the future. For each discrete powertrain, the speed and range design requirements (A), (B) and (C) may be determined by minimizing an objective function, for example (DOC+I+COT). These individual requirements define a lifetime envelope of design points including speeds, ranges, altitudes, that the aircraft must be designed for over its target lifetime;

|  |  |  |  | Range: | | | | |
| --- | --- | --- | --- | --- | --- | --- | --- | --- |
| Storage Density (Wh/kg) | Motor Density (kW/kg) | ICE Density (kW/kg) | ICE efficiency (BSFC) | A electric (miles) | B Hybrid (miles) | B min speed (mph) | C Range (miles) | C min speed (mph) |
| 350 | 5 | 1.1 | 0.35 | 80 | 400 | 220 | 700 | 205 |
| 600 | 7 | 1.4 | 0.33 | 140 | 500 | 250 | 750 | 220 |
| 1000 | 8 | 1.4 | 0.33 | 235 | 550 | 270 | 850 | 225 |

The airframe and propulsor are designed to operate efficiently across this lifetime flight envelope, typically translating to faster and higher flight over time (as shown in FIG. 17), as energy storage technologies improve; and One outcome of the design process described herein is the recognition that forward compatibility typically limits the weight of the rechargeable energy storage units to 12-20% of the aircraft weight, so that payload capacity is roughly uniform as EV technologies improve. Higher weight fractions would lead to aircraft that are larger and heavier than aircraft of similar payload in the initial years, with payload increasing over time, while lower fractions lead to suboptimal efficiencies given much higher use of range-extending generators.

As described, in some embodiments, the inventive hybrid-electric aircraft are designed to integrate with a modular hybrid-electric powertrain, including features to ensure the powertrain can accommodate a range of EV technologies by relatively simple replacement of compatible modules (such as rechargeable storage units, range-extending generators and electric motors). This may be accomplished by designing the airframe with bays that accommodate a range of current and forecast modules, along with access for module replacement. Compatible modules are those that are designed for operation with the powertrain platform, and that are supported by the design of the aircraft. These may include standard and extended energy storage units, high and low power range extending generators, and alternative energy storage technologies. Such features may include:

Multiple bays designed to accommodate rechargeable energy storage units, standard or extended, not all of which may be utilized on any particular flight, and some of which may be multi-use space (e.g., generator, storage unit, fuel tank, or cargo). Each bay provides structure, wiring, and access to enable quick install or removal of the storage units. These could include combinations of the following (some of which are shown in FIG. 5):
Internal to the wing; standard and extended;
External to the wing in aerodynamic pods;
In mid fuselage, positioned under main cabin; and
In the rear fuselage, in addition to, or replacing generators or cargo;

The modular energy storage bays may be integrated directly into the primary aircraft structure, for example the wing spar box, such that the modules serve a dual purpose of energy storage containment and primary load path. Presence of energy storage units within the modules may further enhance the strength of the primary structure for increased structural efficiency and reduced weight;

Energy storage units or other systems which require cooling may utilize the aircraft skin for heat rejection. This cooling may occur through passive contact, or may be enhanced through circulation of coolant between heat sources and heat rejection coils in contact with the skin;

The range extending generators may be integrated in modular bays designed to accommodate generator alternatives, upgrade and removal of the generators, and use of the bay to house energy storage units instead or in addition to the generators. This may be accomplished by sizing the bay, providing access, structural support, and supporting infrastructure (e.g., fuel lines, cooling, wiring, etc.). Generators bays may be positioned in one or more of several locations:
Fuselage bay aft of the main cabin;
Wing mounted nacelles; or
Non-structural fairings; and Propulsors are designed for upgrades to higher efficiency, or higher power motors, which may include a new fan. Unlike conventional engines, this is accomplished with minimal (re) engineering.

Note that aircraft variants with performance tailored to different markets are readily enabled by the modularity of the hybrid-electric powertrain. The separation of thrust generation (by the electric propulsors) and power generation (by the hybrid-electric powertrain) enables development of aircraft variants with widely varying performance via tailoring of powertrain modules to the application, coupled in some cases with a change in the propulsors. This enables development of aircraft with widely varying performance, speeds, ranges and operating costs, based on the choice of powertrain modules and propulsors. Given the resulting limited impact on aircraft handling and maximum weights, the (re) engineering and certification required is modest. This is in contrast to conventional aircraft where variants require significant engineering and certification re-work. In some embodiments, the development of aircraft variants may occur by the following process:

Hybrid-electric aircraft variants may be developed by modifying the baseline aircraft via a compressed aircraft design process, focused on access, interior layout, pressurization, cockpit, and performance. In such a case, the following steps/stages may be used to design a variant:

Define interior configuration and payload requirements;

Define the cockpit configuration, for example, a manned system with provisions for unmanned operation in the future. The following types of aircraft control may be supported:

Fully piloted;

Piloted with remote backup-primary control by one or more pilots onboard the aircraft, and equipped for secondary control by a remote pilot;

Remotely piloted-equipped for primary control by a remote pilot, with or without assistance onboard; or Fully autonomous-equipped for primary flight without human control, and may be equipped for secondary control by a remote or onboard pilot; and Specify the performance requirements for the target market ranges and operating conditions (such as the 3-tier (A), (B) and (C) ranges/design requirements described herein), including variance with technology level, and optimize the powertrain to meet these requirements using mission analysis with the aerodynamics and propulsion of the baseline aircraft.

The following represent examples of aircraft variants that may be designed and implemented using the described methodology:

Example 1: Commercial Variant

Cabin configured for economy seating, passenger baggage allocation in line with standard for commercial carriers. Baggage space in interior of cabin and in hold;

Control system configured for minimum of single pilot with remote pilot as backup, with option for second pilot, if required or trainee;

Upper range limit is point where passenger would switch to commercial jet travel as more time and cost efficient. Infrequent extended range operations;

Market segment highly sensitive to (DOC+I), less sensitive to COT; therefore matched with lower cost range-extending generator (e.g., TDI) aligned with slower design speeds. Pressurization to lower altitudes, except on variants for use on very short legs (<200 miles); and The sample speeds, ranges, and resulting powertrain configuration shown in FIG. 17 are representative of this class of aircraft.

Example 2: Business Variant

Cabin configured for business seating, baggage allocation above standard for commercial carriers. Baggage space in interior of cabin and in hold;

Control system configured for minimum of single pilot with remote pilot as backup, with option for second pilot, if required or trainee;

Less predictable routes, more frequent use of extended range;

Highly sensitive to COT, less sensitive to (DOC+I); variant may be matched with a higher power range-extending generator (e.g., aircraft gas turbine) aligned with higher design speeds and altitudes for extended range cruise; pressurization to intermediate altitudes; and

Example 3: Cargo Variant

No pressurization, or cabin furnishings;

Control system configured for pilot optional flight, with control by remote pilot on unmanned legs;

Speeds and ranges specified to target niche between ground transport and commercial aircraft, typically 200-700 miles, intermediate speeds;

Market segment highly sensitive to (DOC+I), least sensitive to COT; therefore matched with lower cost range-extending generator (e.g., TDI) aligned with slower design speeds unless required by longer range requirements; and As described herein, the inventive aircraft are designed for safety and fault tolerance exceeding stringent aviation requirements (FAA and EASA) via a powertrain architected for graceful degradation. This includes the ability to tolerate failures in power sources (energy storage units, generators), motors (propulsion, generator), convertors (inverters, rectifiers, DC-DC convertors), distribution (buses, wiring), controls (sensors, communication), as well as safety in the event of moderate or severe impact on the system.

The inventive aircraft and powertrain operation are designed for optimal efficiency over regional ranges; this is due in part to the flight path optimization process implemented by the FPOP and the operation of the powertrain for optimal efficiency, and may further include energy recovery through regenerative braking, and center of gravity adjustment through stored energy positioning for drag reduction. These aspects are described further in the following:

Flight efficiency is improved by flight path optimization capabilities unique to the hybrid-electric aircraft, including efficient flight at low altitudes, and stored-energy first utilization. Optimization is accomplished through the Flight Path Optimization Platform (FPOP), described herein. This contrasts with conventional flight path optimization in which efficiency is strongly dependent on altitude and there is little opportunity for flight path modifications other than to fly as high as possible;

Within the optimized flight path, powertrain is operated for optimal efficiency as described herein;

The powertrain is designed for energy recovery via regenerative braking of the propulsors, as described herein. Conventional aircraft have no way to recover energy from drag producing devices such as spoilers; and The stored energy units in the fuselage may be used to adjust the aircraft center of gravity (CG) to simplify loading, and to reduce drag in cruise mode. The aircraft payload weight should be distributed such that the CG is within an established envelope close to the center of lift, and within the envelope, aircraft drag is reduced by moving the CG aft. Being able to relatively quickly adjust CG location allows the operator efficiency gains by speeding the loading process, and reducing drag;

CG movement with stored energy units may be accomplished by providing a series of bays along the fuselage, and selectively utilizing only a fore or aft location. Another implementation has energy storage units mounted on tracks allowing fore and aft translation as commanded by the pilot or flight control system;

Conventional aircraft may have some capability to move CG with selective utilization of different tanks in the fuel system, but once the fuel is burned off in flight, the benefit is reduced and typically lost.

The Table below contains certain parameters for an example of a hybrid-electric aircraft designed in accordance with the principles and processes described herein. The 4-view of FIG. 16 shows a concept 40 person/seat regional hybrid-electric aircraft designed using the inventive HEV aircraft design process. Overall size and weight are similar to the conventional ATR-42-500 (48 seats, twin engine turboprop). Given energy requirements, design of the aircraft is based on battery energy densities ranging from 600 Wh/kg to 900 Wh/kg. These enables an electric range of 170-280 nm, hybrid of 425-500+ nm, at minimum cruise speed of 380 KTAS, and cruise altitudes between 18,000 and 25,000 ft.

Note that the aircraft illustrated in FIG. 16 is pictured in one possible configuration for an aircraft meeting the general requirements stated. In this example, three integrated electric ducted fan propulsors are used to provide thrust, and the position over the aft fuselage reduces drag through boundary layer ingestion and wake momentum deficit restoration. Pods at the base of the vertical tails house the gas turbine generators; the inlet and exhaust are faired over when the generators are not running to reduce drag. The subcritical cruise Mach value allows use of a light weight, straight wing, and the propulsor location on the tail allows short, lighter weight landing gear. Noise reduction may be achieved through quiet ducted fans with additional reductions due to mounting above the fuselage and between the tails, blocking much of the fan tonal noise. The weights, sizes and performance of the aircraft designed are below, including improvements enabled by future higher energy-density batteries.

| Size | | | Propulsion and powertrain | | |
|---|---|---|---|---|---|
| Wing span | 75.15 | ft | Powertrain type | hybrid-electric | |
| Wing area | 520 | ft^2 | Propulsion motor | 3 × 1600 | SHP |
| Overall length | 62 | ft | Power loading | 7.92 | lbs/hp |
| Overall height | 20 | ft | Ducted fan | Variable-pitch fan | |
| Cabin length | 34.8 | Ft | Fan blades | 16 | |
| Cabin height | 74 | In | Range extending generators | 2400 | SHP |
| Cabin width | 98 | In | Generator | 1800 | kW cont |
| Number of passenger seats | 40 | | Maximum cruise fuel burn | 1080 | pph |
| Pilots | 2 | | | | |
| Weights | | | Stored energy | | |
| Maximum take-off weight | 38000 | lbs | Battery mass, Cell weight | 2500 | Kg |
| Maximum useful load | 11500 | lbs | Battery mass, Pack weight | 3000 | Kg |
| Maximum fuel capacity | 2500 | lbs | Total stored energy, new | 2250 | kWh |
| Wing loading | 73 | PSF | Total stored energy, 1000 cycles | 1912.5 | kWh |
| Take-off and Landing | | | Cruise performance | | |
| Take off ground roll | 1100 | ft | Stored energy density | 600 | 900 | Wh/kg |
| Clear 50' obstacle | 1500 | ft | Energy Capacity | 1500 | 2250 | kWh |
| | | | Standard cruise | 335 | 355 | KTAS |
| Max rate of climb, SL | 2400 | fpm | Maximum cruise | 380 | 380 | KTAS |
| | | | Long range cruise | 320 | 340 | KTAS |
| Stall speed, Clean | 120 | KIAS | Hybrid range | 425 | 500+ | Nm |
| Stall speed, Full flaps | 65 | KIAS | Electric range | 170 | 280 | Nm |
| Landing distance over 50 ft | 1300 | ft | | | |
| Flap system | Active high lift | | | | |

The table indicates several of the unique aspects of the hybrid-electric design. Fuel burn and fuel capacity are less than half of the conventional equivalent. Cruise performance is given for two levels of stored energy, 600 and 900 Wh/kg; this level of improvement would be expected over 4-8 years of aircraft operating life depending on advances in energy storage technology. Lastly, the maximum cruise speed is much higher than might be expected, with propulsion motors retaining full power at altitude.

As mentioned, FIG. 17 is a diagram illustrating the efficiency of a certain aircraft and propulsor configuration as a function of flight altitude and required power. The curves illustrate how an aircraft which is energy (not power) limited will be able to cruise at successively higher speeds and altitudes as the energy limits are increased. The envelope extends from an initial cruise speed on the order of 200 KTAS with initial energy storage density on the order of 350 Wh/kg, increasing to over 260 KTAS as storage density improves to 900 Wh/kg, a 2.6× change which is expected to occur over about 10 years given current rates of energy storage technology improvement. As part of this innovation, it is recognized that this performance improvement will only be available to the operator if the higher speeds and altitudes are included as design points from the beginning of the design process (rather than limit to initial performance, as would be done with conventional propulsion).

Figure 18:
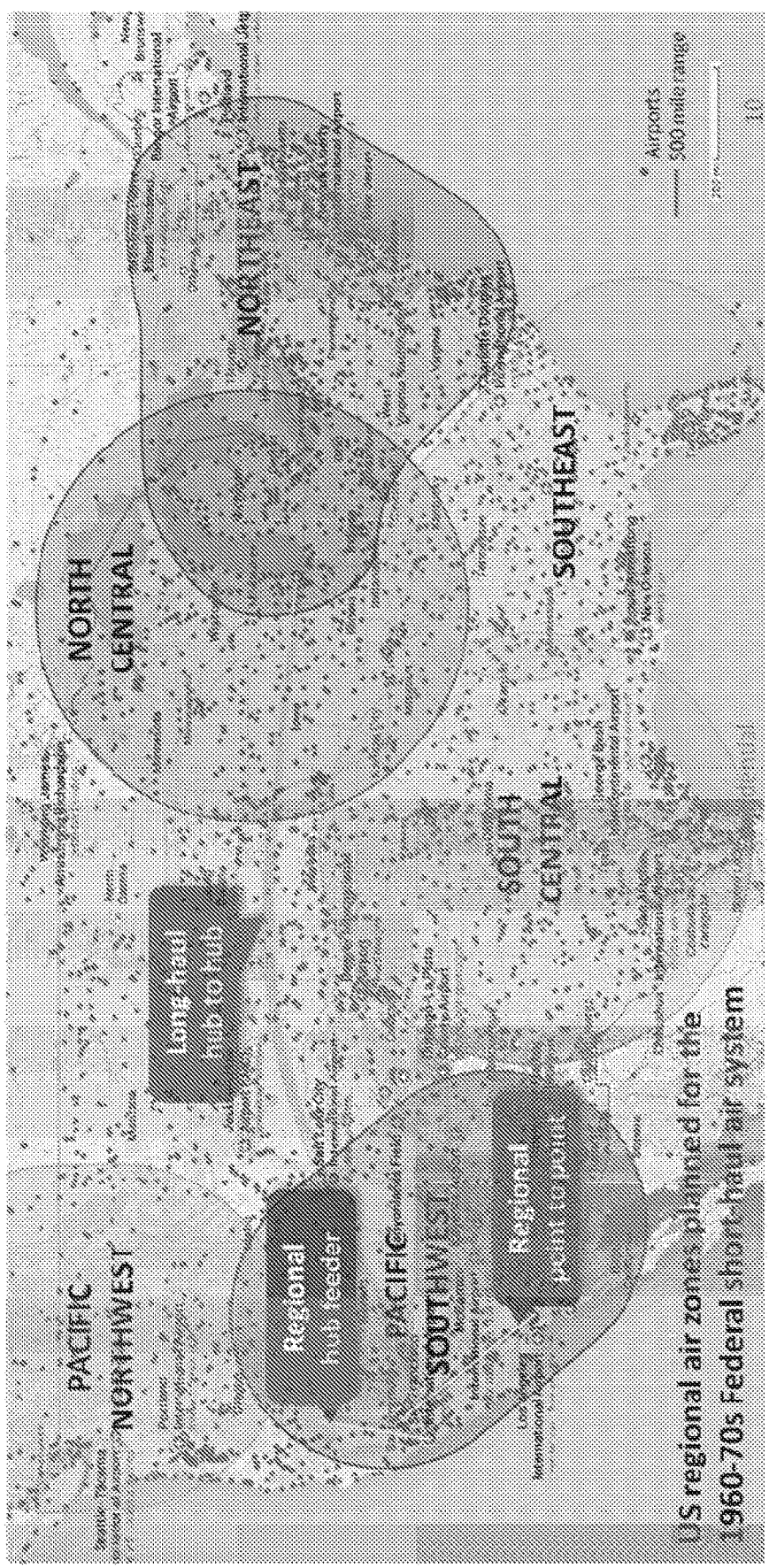
FIG. 18 is a diagram illustrating several regional zones and the associated airports or landing areas that may be used as part of implementing an embodiment of the inventive regional air transportation system.

FIG. 18 is a diagram illustrating several regional zones and the associated airports or landing areas that may be used as part of implementing an embodiment of the inventive regional air transportation system. As shown in the figure, each regional zone (e.g., "Pacific Northwest", "Pacific Southwest", etc.) may contain multiple landing strips and/or formalized airports (as indicated by the dots within the regions). Note that each regional zone may contain tens to hundreds of potential airports or take-off/landing sites for the inventive aircraft, and may contain a regional hub or other form of centralized location. Aspects of the control of the regional air transportation system may be located at one of several data centers or scheduling/flight monitoring facilities. Such facilities may operate to individually and/or in aggregate to schedule flights at multiple airports, generate flight plans/paths and the corresponding instructions for one or more aircraft, communicate such instructions to one or more aircraft, and monitor the flight and its flight data for one or more aircraft.

The inventive hybrid-electric air transportation system offers significantly lower door-to-door travel times and lower total costs per mile than alternate regional travel modes such as highways, rail or high-speed rail, or conventional air. This is achieved via convenient high-frequency "close-in" flights to a large number of regional airports near communities and population centers, using quiet range-optimized hybrid-electric aircraft. Additional beneficial features of the system include:

The availability of airport onsite electric energy generation and storage. Many of the airports may be equipped with onsite electricity generation and storage facilities to minimize electricity costs. Onsite generation, e.g., solar, wind, etc. may be used to recharge aircraft batteries and power the airport, delivering excess to onsite storage or to the electrical grid. Onsite electric storage will enable optimal purchases of electricity from the grid (e.g., at off-peak rates) and storage of electricity generated onsite for later use. Retired aircraft batteries could be used in onsite storage through late-life prior to disposal; and A variety of cost-effective last-mile ground travel options at the airports, from origin and to destination. The regional airports may offer passengers a greater variety of ground travels options than are offered at non-hub airports today. Several powerful trends playing out currently will encourage this: electric and autonomous vehicles (e.g., Tesla, Google, Uber, Apple), ride sharing (e.g., Lyft, Uber, Sidecar, RelayRides), fractional car rentals (ZipCar, Hertz-on-demand). Some regional airports today are already connected to local mass transit; over the next 5-10 years, electric and autonomous shuttles will enable a larger fraction of airports to offer inexpensive connectivity to mass transit. This will be supplemented by multiple personal auto and taxi alternatives enabled by the trends above, for example, pick-up by autonomous cars, fractional rentals, and various forms of ride sharing.

Figure 19:
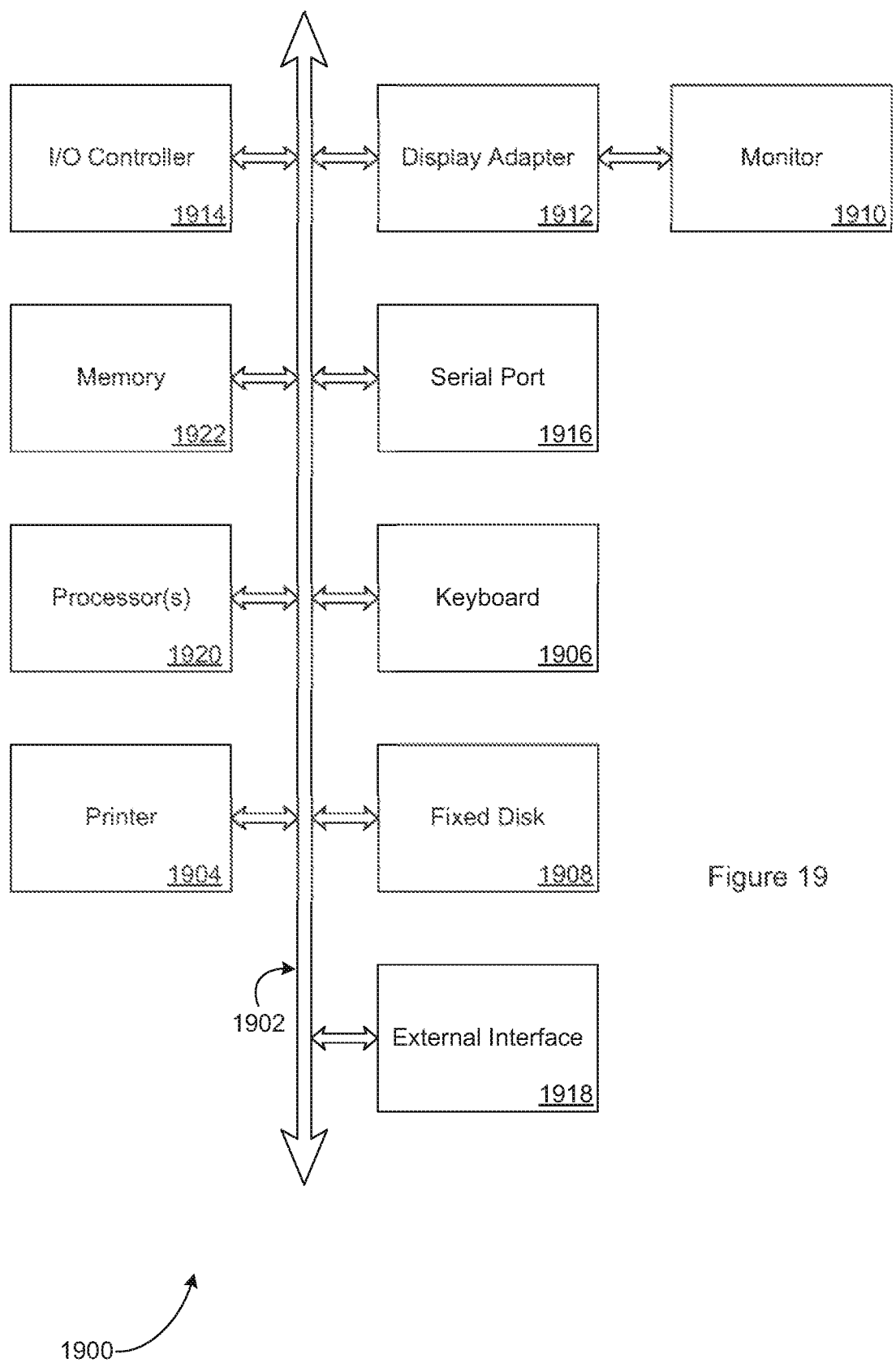
FIG. 19 is a diagram illustrating elements or components that may be present in a computer device or system 1900 configured to implement a method, process, function, or operation in accordance with an embodiment of the invention.

In accordance with one embodiment of the invention, the system, apparatus, methods, elements, processes, functions, and/or operations for enabling the inventive aircraft, transportation system, and aircraft control system or transportation system control system may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 19 is a diagram illustrating elements or components that may be present in a computer device or system 1900 configured to implement a method, process, function, or operation in accordance with an embodiment of the invention. The subsystems shown in FIG. 19 are interconnected via a system bus 1902 (as may also be one or more of the subsystems illustrated in FIGS. 4 and 5). Additional subsystems include a printer 1904, a keyboard 1906, a fixed disk 1908, and a monitor 1910, which is coupled to a display adapter 1912. Peripherals and input/output (I/O) devices, which couple to an I/O controller 1914, can be connected to the computer system by any number of means known in the art, such as a serial port 1916. For example, the serial port 1916 or an external interface 1918 can be utilized to connect the computer device 1900 to further devices and/or systems including a wide area network such as the Internet, a mouse input device, and/or a scanner. The interconnection via the system bus 1902 allows one or more processors 1920 to communicate with each subsystem and to control the execution of instructions that may be stored in a system memory 1922 and/or the fixed disk 1908, as well as the exchange of information between subsystems. The system memory 1922 and/or the fixed disk 1908 may embody a tangible computer-readable medium.

Note the following variables, parameters, and units are understood as being used in the description of embodiments of the inventive regional air transportation system.

| Variable | Units | | Definition |
| --- | --- | --- | --- |
| | Stored | Fuel | |
| Usable energy | kWh | kg | Usable stored electrical energy and fuel onboard the aircraft |
| Available energy | kWh | kg | Usable energy less Reserve energy |
| Required energy | kWh | kg | Energy needed to fly a defined Flight path |
| Arrival energy | kWh | kg | Predicted Available energy after landing at the destination |
| Safety reserve | kWh | kg | Energy which should remain at arrival to provide safe and legal reserves |
| Contingency reserve | kWh | kg | Additional reserve to account for flight uncertainty |
| Reserve energy | kWh | kg | Sum of Safety reserve and Contingency reserve |
| Airspeed | | m/s | Indicated airspeed |

-continued

| Variable | Units Stored | Fuel | Definition |
|---|---|---|---|
| Aircraft CG | m | | Location of the longitudinal center of gravity from reference datum |
| Aircraft speed | m/s | | Inertial speed |
| Aircraft weight | kg | | Total weight of the aircraft |
| Ambient pressure | Pascals | | Atmospheric air pressure |
| Ambient temperature | Degrees Celsius | | Atmospheric air temperature |
| APU Generator power | kW | | Instantaneous power output from all generation sources |
| Battery power | kW | | Instantaneous power output from all battery sources |
| Caution index | integer | | Index to table look up of potential flight hazards (eg: turbulence) |
| Constraint type | integer | | Altitude constraint, options are: fixed, min, max |
| Display mode | | | Calibration, Flight prep, Inflight control, Diagnostics |
| Duct exit area | % | | Percent adjustable duct exit area reduction: 100% min, 0% max |
| Flight duration | s | | Time from start of take-off roll to end of landing roll |
| Flight mode | | | Optimal, High speed, Economy,. |
| Fuel flow rate | liters/s | | Rate of fuel consumption by the generators(s) |
| Hazard | | | Potential en route flight hazards, e.g., icing, turbulence, precipitation |
| KCAS | nm/hour | | Knots Calibrated Airspeed: the corrected airspeed read out to the pilot |
| KTAS | nm/hour | | Knots True Airspeed: inertial speed, equals ground speed in no wind |
| Motor power | kW | | Power delivered to the propulsor at the shaft of the electric drive motor(s) |
| Motor regen RPM | RPM | | Rotational speed of the motor(s) when in regeneration mode |
| Motor regen torque | Nm | | Torque delivered by the propulsor to shaft of the electric drive motor(s) |
| Motor RPM | RPM | | Motor rotational speed |
| Motor torque | Nm | | Torque delivered to the propulsor at shaft of the electric drive motor(s) |
| Nautical mile or Nm | 1,852 meters | | |
| Pilot generator on-off | integer | | Generator state request from direct pilot control: On or Off |
| Pilot generator power | kW | | Generator power delivery, as requested by pilot control |
| Pilot power | % | | Propulsor power output via pilot movement of the Power lever |
| Pilot regen braking | % | | Pilot commanded regen braking, with brake pedals (ground operation) |
| Pilot reverse power | % | | Pilot commanded reverse thrust (ground operation) |
| Propeller blade pitch angl | degrees | | Propeller blade angle, automatically adjusted |
| Segment type | integer | | Flight segment type: take off, climb, cruise etc. |
| Uncertainty factor | % | | Pilot confidence in flight plan and conditions (eg. weather forecast) |
| Weather index | integer | | Index to table look up of weather conditions |

40

| | | | Flight track | | | |
|---|---|---|---|---|---|---|
| | Latitude | Longitude | Altitude | Alt min | Alt max | Constraint type |
| Way point 1-N | degrees | degrees | m | m | m | Integer |

| | | | Flight Path | | |
|---|---|---|---|---|---|
| | Latitude | Longitude | Altitude | Speed | Segment type |
| Waypoint 1-N | degrees | degrees | m | m/s | integer |

| | | Air path | | |
|---|---|---|---|---|
| | Distance | Altitude | Speed | Segment type |
| Waypoint 1-N | m | m | m/s | Integer |

-continued

| | Energy plan | | | |
|---|---|---|---|---|
| | Stored Energy available | Fuel available | Power ratio (Storage/ generation) | Generator power |
| Waypoint 1-N | % full | kW % full | kW % | kW |

| | Weather index | | | | | |
|---|---|---|---|---|---|---|
| | Latitude | Longitude | Altitude | Direction | Speed | Temperature |
| Way point 1-N | degrees | degrees | m | degrees | m/s | Celsius |

| | Cautions index | | | | |
|---|---|---|---|---|---|
| | Latitude | Longitude | Alt min | Alt max | Hazard |
| Waypoint 1-N | degrees | degrees | m | m | integer |

| | Aircraft state | | | | | |
|---|---|---|---|---|---|---|
| | Available energy | Safety reserve | Contingency reserve | Weight | Aircraft CG | Flight mode | Uncertainty factor |
| Current | kW, kg | kW, kg | kW, kg | kg | Aircraft CG | Integer | % |

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A vehicle comprising:
a first power source and a second power source;
a propulsion system;
a power distribution system to selectively provide power to the propulsion system from the first power source or the second power source, or a combination thereof; and
a powertrain optimization and control system, the powertrain optimization and control system comprising:
a pre-mission hybrid energy planner to compute parameters of an energy management plan subject to a cost objective relating at least to expected operating costs for the vehicle to complete a mission; and
a hybrid power manager to, during the mission, generate one or more signals to control operation of the first power source and the second power source, the power distribution system and the propulsion system during the mission such that contributions of the first power source and the second power source for powering the propulsion system are in accordance with the computed parameters of the energy management plan.

2. The vehicle of claim 1, wherein in which the energy management plan specifies selection of an amount of power to be drawn from a stored energy source, and an amount of power to be drawn from a generation power source over portions of the mission.

3. The vehicle of claim 1, wherein the first power source comprises at least one energy storage unit, and the second power source comprises at least one range extending generator.

4. The vehicle of claim 1, wherein the cost objective is determined based, at least in part, on an operating mode for the vehicle.

5. The vehicle of claim 1, wherein the pre-mission hybrid energy planner is utilized further to compute the parameters of an energy management plan which define an energy path for the mission that minimizes a non-linear cost objective, the non-linear cost objective to be defined, at least in part, by a cost of fuel, a cost of stored energy, a cost of maintenance, a cost of crew, a cost of vehicle or cost of emissions, or a combination thereof.

6. The vehicle of claim 3, wherein the hybrid power manager is communicatively coupled to the at least one range extending generator and the at least one energy storage unit.

7. The vehicle of claim 3, wherein the hybrid power manager is further to generate one or more signals to control a mix of power to be supplied to the propulsion system from the at least one energy storage unit and at least one range extending generator.

8. The vehicle of claim 1, wherein the vehicle comprises an aircraft.

9. The vehicle of claim 3, wherein the parameters of the energy management plan determine an optimized distribution of energy to be supplied by the at least one range extending generator and the at least one energy storage unit over the mission.

10. The vehicle of claim 3, wherein the powertrain optimization and control system is further to generate signals to at least in part define a unified interface to a pilot for controlling the at least one range extending generator and the at least one energy storage unit.

11. The vehicle of claim 1, wherein the hybrid power manager is further to modify an initial energy plan during flight to account for a real time energy usage and flight progress based, at least in part, on the computed parameters and parameters obtained from a flight management system.

12. The vehicle of claim 3, wherein:
the pre-mission hybrid energy planner is communicatively coupled to the range extending generator and the energy storage unit;
the pre-mission hybrid energy planner is further to determine an energy plan for a flight path that expresses an amount of energy drawn from the energy storage unit and the range extending generator for one or more segments of the mission;
the energy plan is determined based, at least in part, on a quantity of energy stored within the energy storage unit;

the energy plan to provide for sufficient fuel to the range extending generator to complete the mission with a set energy reserve; and
the energy plan sets forth depletion of energy stored within the energy storage unit over fuel for the range extending generator over a course of the mission.

13. The vehicle of claim 3, wherein:
the range extending generator comprises a gas turbine mechanically coupled to an electric generator; and
the at least one energy storage unit comprises a battery.

14. The vehicle of claim 3, wherein the at least one range extending generator comprises a fuel cell.

15. A method, at a vehicle comprising: a first power source and a second power source; a propulsion system; a power distribution system to selectively provide power to the propulsion system from the first power source or the second power source, or a combination thereof; and a powertrain optimization and control system, the method comprising:
at a pre-mission hybrid energy planner of the powertrain optimization and control system, computing parameters of an energy management plan subject to a cost objective relating at least to expected operating costs for the vehicle to complete a mission; and
at a hybrid power manager of the powertrain optimization and control system, generate, during the mission, one or more signals to control operation of the first power source and the second power source, the power distribution system and the propulsion system during the mission such that contributions of the first power source and the second power source for powering the propulsion system are in accordance with the computed parameters of the energy management plan.

16. The method of claim 15, wherein the first power source comprises at least one energy storage unit, and the second power source comprises at least one range extending generator.

17. The method of claim 16, and further comprising, at the hybrid power manager, generating control signals to determine a mix of power to be supplied to the propulsion system from the at least one energy storage unit and at least one range extending generator.

18. The method of claim 16, wherein the parameters of the energy management plan determine an optimized distribution of energy to be supplied by the at least one range extending generator and the at least one energy storage unit over the mission.

19. The method of claim 16, wherein:
the pre-mission hybrid energy planner is communicatively coupled to the range extending generator and the energy storage unit; and
the method further comprises:
determining, at the pre-mission hybrid energy planner, an energy plan for a flight path that expresses an amount of energy drawn from the energy storage unit and the range extending generator for one or more segments of the mission, further wherein:
the energy plan is determined based, at least in part, on a quantity of energy stored within the energy storage unit; and
the energy plan sets forth depletion of energy stored within the energy storage unit over fuel for the range extending generator over a course of the mission.

20. The method of claim 16, wherein the powertrain optimization and control system is further to generate signals to at least in part define a unified interface to a pilot for controlling the at least one range extending generator and the at least one energy storage unit.

21. The method of claim 15, and further comprising, at the hybrid power manager, modifying an initial energy plan during flight to account for a real time energy usage and flight progress based, at least in part, on the computed parameters and parameters obtained from a flight management system.

* * * * *